(12) United States Patent
Kikinis et al.

(10) Patent No.: US 11,475,420 B2
(45) Date of Patent: Oct. 18, 2022

(54) SYSTEM AND METHOD FOR TRUE PEER-TO-PEER AUTOMATIC TELLER MACHINE TRANSACTIONS USING MOBILE DEVICE PAYMENT SYSTEMS

(71) Applicant: Liquineq AG, Zug (CH)

(72) Inventors: Dan Kikinis, Los Altos, CA (US); Ari Birger, Palo Alto, CA (US); Sree Iyer, San Jose, CA (US)

(73) Assignee: LIQUINEQ AG, Zug (CH)

( * ) Notice: Subject to any disclaimer, the term of this patent is extended or adjusted under 35 U.S.C. 154(b) by 247 days.

(21) Appl. No.: 16/862,419

(22) Filed: Apr. 29, 2020

(65) Prior Publication Data
US 2020/0394626 A1  Dec. 17, 2020

Related U.S. Application Data

(63) Continuation-in-part of application No. 16/747,429, filed on Jan. 20, 2020, which is a continuation-in-part of application No. 16/696,352, filed on Nov. 26, 2019, now abandoned, which is a continuation-in-part of application No. 16/684,517, filed on Nov. 14, 2019, now abandoned, which is a continuation-in-part of application No. 16/660,695, filed on Oct. 22, 2019, now abandoned, which is a continuation-in-part of application No. PCT/US2019/041500, filed on Jul. 11, 2019, application No. 16/862,419, which is a
(Continued)

(51) Int. Cl.
*G06Q 20/00* (2012.01)
*G06Q 20/10* (2012.01)
*G06Q 20/22* (2012.01)
*G06Q 20/36* (2012.01)
*G06Q 20/40* (2012.01)
*H04L 9/06* (2006.01)

(52) U.S. Cl.
CPC ....... *G06Q 20/1085* (2013.01); *G06Q 20/223* (2013.01); *G06Q 20/3674* (2013.01); *G06Q 20/40145* (2013.01); *H04L 9/0637* (2013.01)

(58) Field of Classification Search
USPC .................. 705/16, 21, 59; 380/44, 262
See application file for complete search history.

(56) References Cited

U.S. PATENT DOCUMENTS 9,849,364 B2   12/2017   Tran et al.
9,876,775 B2    1/2018   Mossbarger
(Continued)

FOREIGN PATENT DOCUMENTS

CN   107222482 A   9/2017
CN   108323232 B   1/2020
KR   20170137388 A  12/2017

*Primary Examiner* — Dante Ravetti
(74) *Attorney, Agent, or Firm* — Galvin Patent Law LLC; Brian R. Galvin

(57) ABSTRACT

A system and method for true peer-to-peer automatic teller machine transactions using mobile device payment systems, where a user may receive physical cash in exchange for digital currency from another user, without either one of them having to have a merchant account or a credit/debit card clearing system through a payment processor, comprising a smartphone with an associate peer-to-peer ATM application, blockchain datastore, GPS satellite, cellular tower, and smart wallet application.

6 Claims, 31 Drawing Sheets

Related U.S. Application Data continuation-in-part of application No. 16/747,429, filed on Jan. 20, 2020, which is a continuation-in-part of application No. 16/696,352, filed on Nov. 26, 2019, now abandoned, which is a continuation-in-part of application No. 16/684,517, filed on Nov. 14, 2019, now abandoned, which is a continuation-in-part of application No. 16/660,695, filed on Oct. 22, 2019, now abandoned, which is a continuation-in-part of application No. PCT/US2019/028812, filed on Apr. 23, 2019, application No. 16/862,419, which is a continuation-in-part of application No. 16/747,429, filed on Jan. 20, 2020, which is a continuation-in-part of application No. 16/696,352, filed on Nov. 26, 2019, now abandoned, which is a continuation-in-part of application No. 16/684,517, filed on Nov. 14, 2019, now abandoned, which is a continuation-in-part of application No. 16/660,695, filed on Oct. 22, 2019, now abandoned, which is a continuation-in-part of application No. PCT/US2019/013272, filed on Jan. 11, 2019, which is a continuation-in-part of application No. 16/208,853, filed on Dec. 4, 2018, now Pat. No. 10,552,556, application No. 16/862,419, which is a continuation-in-part of application No. 16/747,429, filed on Jan. 20, 2020, which is a continuation-in-part of application No. 16/696,352, filed on Nov. 26, 2019, now abandoned, which is a continuation-in-part of application No. 16/684,517, filed on Nov. 14, 2019, now abandoned, which is a continuation-in-part of application No. 16/660,695, filed on Oct. 22, 2019, now abandoned, which is a continuation-in-part of application No. 16/208,853, filed on Dec. 4, 2018, now Pat. No. 10,552,556, which is a continuation-in-part of application No. 16/152,090, filed on Oct. 4, 2018, which is a continuation-in-part of application No. 16/122,870, filed on Sep. 5, 2018, now abandoned, application No. 16/862,419, which is a continuation-in-part of application No. 16/796,159, filed on Feb. 20, 2020, now Pat. No. 11,042,804, which is a continuation-in-part of application No. 16/747,982, filed on Jan. 21, 2020, now Pat. No. 10,997,551, which is a continuation-in-part of application No. 16/684,517, filed on Nov. 14, 2019, now abandoned, application No. 16/862,419, which is a continuation-in-part of application No. 16/796,159, filed on Feb. 20, 2020, now Pat. No. 11,042,804, which is a continuation-in-part of application No. 16/696,352, filed on Nov. 26, 2019, now abandoned, which is a continuation-in-part of application No. 16/684,517, filed on Nov. 14, 2019, now abandoned, application No. 16/862,419, which is a continuation-in-part of application No. 16/748,213, filed on Jan. 21, 2020, now Pat. No. 11,403,627, which is a continuation-in-part of application No. 16/747,982, filed on Jan. 21, 2020, now Pat. No. 10,997,551, application No. 16/862,419, which is a continuation-in-part of application No. 16/162,066, filed on Oct. 16, 2018, now abandoned, which is a continuation-in-part of application No. 16/122,870, filed on Sep. 5, 2018, now abandoned.

(60) Provisional application No. 62/841,020, filed on Apr. 30, 2019, provisional application No. 62/794,913, filed on Jan. 21, 2019, provisional application No. 62/772,527, filed on Nov. 28, 2018, provisional application No. 62/767,757, filed on Nov. 15, 2018, provisional application No. 62/749,665, filed on Oct. 23, 2018, provisional application No. 62/697,377, filed on Jul. 12, 2018, provisional application No. 62/696,793, filed on Jul. 11, 2018, provisional application No. 62/667,153, filed on May 4, 2018, provisional application No. 62/661,595, filed on Apr. 23, 2018, provisional application No. 62/616,060, filed on Jan. 11, 2018, provisional application No. 62/594,519, filed on Dec. 4, 2017, provisional application No. 62/570,064, filed on Oct. 9, 2017, provisional application No. 62/554,546, filed on Sep. 5, 2017.

(56) References Cited

U.S. PATENT DOCUMENTS

| | | |
|---|---|---|
| 2013/0268437 A1 | 10/2013 | Desai et al. |
| 2014/0324615 A1 | 10/2014 | Kulkarni et al. |
| 2014/0325220 A1* | 10/2014 | Tunnell ................. H04L 9/3215 713/168 |
| 2015/0170112 A1 | 6/2015 | Decastro |
| 2016/0260091 A1 | 9/2016 | Tobias |
| 2017/0098291 A1 | 4/2017 | Code et al. |

* cited by examiner

SYSTEM AND METHOD FOR TRUE PEER-TO-PEER AUTOMATIC TELLER MACHINE TRANSACTIONS USING MOBILE DEVICE PAYMENT SYSTEMS

CROSS-REFERENCE TO RELATED APPLICATIONS

| application No. | Date Filed | Title |
|---|---|---|
| Current application | Herewith | SECURITY GATEWAY FOR HIGH SECURITY BLOCKCHAIN SYSTEMS Claims benefit of, and priority to: |
| 62/841,020 | Apr. 30, 2019 | TRUE PEER-TO-PEER ATM SYSTEM AND METHOD USING MOBILE DEVICE BASED PAYMENT SYSTEMS and is also a continuation-in-part of: |
| 16/747,429 | Jan. 20, 2020 | SECURITY GATEWAY FOR HIGH SECURITY BLOCKCHAIN SYSTEMS which claims benefit of, and priority to: |
| 62/794,913 | Jan. 21, 2019 | Security GateWay for High Security Blockchain Systems and is also a continuation-in-part of: |
| 16/696,352 | Nov. 26, 2019 | SYSTEM AND METHOD FOR SECURITY GATEWAY FOR HIGH SECURITY BLOCKCHAIN SYSTEMS which claims benefit of, and priority to: |
| 62/772,527 | Nov. 28, 2018 | Security GateWay for High Security Blockchain Systems and is also a continuation-in-part of: |
| 16/684,517 | Nov. 14, 2019 | SYSTEM AND METHOD FOR AUTOMOTIVE INVENTORY MANAGEMENT AND RECORDKEEPING USING MULTI-TIERED DISTRIBUTED NETWORK TRANSACTIONAL DATABASE which claims benefit of, and priority to: |
| 62/767,757 | Nov. 15, 2018 | SYSTEM AND METHOD FOR AUTOMOTIVE INVENTORY MANAGEMENT AND RECORDKEEPING USING MULTI-TIERED DISTRIBUTED NETWORK TRANSACTIONAL DATABASE and is also a continuation-in-part of: |
| 16/660,695 | Oct. 22, 2019 | SYSTEM AND METHOD FOR CONDUCTING AND SECURING TRANSACTIONS WHEN BLOCKCHAIN CONNECTION IS UNRELIABLE which claims benefit of, and priority to: |
| 62/749,665 | Oct. 23, 2018 | SYSTEM AND METHOD FOR CONDUCTING AND SECURING TRANSACTIONS WHEN BLOCKCHAIN CONNECTION IS UNRELIABLE and is also a continuation-in-part of: |
| PCT/US19/41500 | Jul. 11, 2019 | SYSTEM AND METHOD FOR SECURE STORAGE OF DIGITAL ASSETS TO FACILITATE ELECTRONIC TRANSACTIONS which claims benefit of, and priority to: |
| 62/697,377 | Jul. 12, 2018 | SYSTEM AND METHOD FOR STORING, TRANSACTING AND SECURING CRYPTOCURRENCIES AT VERY HIGH SPEEDS and also claims benefit of, and priority to: |
| 62/696,793 | Jul. 11, 2018 | SYSTEM AND METHOD FOR STORING, TRANSACTING AND SECURING CRYPTOCURRENCIES AT VERY HIGH SPEEDS |
| Current application | Herewith | SECURITY GATEWAY FOR HIGH SECURITY BLOCKCHAIN SYSTEMS Is a continuation-in-part of: |
| 16/747,429 | Jan. 20, 2020 | SECURITY GATEWAY FOR HIGH SECURITY BLOCKCHAIN SYSTEMS which is a continuation-in-part of: |
| 16/696,352 | Nov. 26, 2019 | SYSTEM AND METHOD FOR SECURITY GATEWAY FOR HIGH SECURITY BLOCKCHAIN SYSTEMS which is a continuation-in-part of: |

-continued

| application No. | Date Filed | Title |
|---|---|---|
| 16/684,517 | Nov. 14, 2019 | SYSTEM AND METHOD FOR AUTOMOTIVE INVENTORY MANAGEMENT AND RECORDKEEPING USING MULTI-TIERED DISTRIBUTED NETWORK TRANSACTIONAL DATABASE |
| | | which is a continuation-in-part of: |
| 16/660,695 | Oct. 22, 2019 | SYSTEM AND METHOD FOR CONDUCTING AND SECURING TRANSACTIONS WHEN BLOCKCHAIN CONNECTION IS UNRELIABLE |
| | | which is also a continuation-in-part of: |
| PCT/US19/28812 | Apr. 23, 2019 | ENHANCED INTERNATIONAL PAYMENT TRANSACTION SYSTEM AND METHOD |
| | | which claims benefit of, and priority to: |
| 62/667,153 | May 4, 2018 | ENHANCED INTERNATIONAL PAYMENT TRANSACTION SYSTEM AND METHOD |
| | | And also claims benefit of, and priority to: |
| 62/661,595 | Apr. 23, 2018 | SYSTEM AND METHOD FOR ENHANCED REALTIME SETTLEMENT SYSTEMS |
| Current application | Herewith | SECURITY GATEWAY FOR HIGH SECURITY BLOCKCHAIN SYSTEMS |
| | | Is a continuation-in-part of: |
| 16/747,429 | Jan. 20, 2020 | SECURITY GATEWAY FOR HIGH SECURITY BLOCKCHAIN SYSTEMS |
| | | which is a continuation-in-part of: |
| 16/696,352 | Nov. 26, 2019 | SYSTEM AND METHOD FOR SECURITY GATEWAY FOR HIGH SECURITY BLOCKCHAIN SYSTEMS |
| | | which is a continuation-in-part of: |
| 16/684,517 | Nov. 14, 2019 | SYSTEM AND METHOD FOR AUTOMOTIVE INVENTORY MANAGEMENT AND RECORDKEEPING USING MULTI-TIERED DISTRIBUTED NETWORK TRANSACTIONAL DATABASE |
| | | which is a continuation-in-part of: |
| 16/660,695 | Oct. 22, 2019 | SYSTEM AND METHOD FOR CONDUCTING AND SECURING TRANSACTIONS WHEN BLOCKCHAIN CONNECTION IS UNRELIABLE |
| | | which is also a continuation-in-part of: |
| PCT/US19/13272 | Jan. 11, 2019 | MULTI-PARTNER REGIONAL OR NATIONAL BLOCKCHAIN TRANSACTION SYSTEM |
| | | which claims benefit of, and priority to: |
| 62/616,060 | Jan. 11, 2018 | SYSTEM AND METHOD FOR ORGANIZING AND MANAGING A REGIONAL OR COUNTRYWIDE BLOCKCHAIN TRANSACTION SYSTEM WITH MULTIPLE PARTNERS |
| | | and is also a PCT filing of, and claims priority to: |
| 16/208,853 | Dec. 4, 2018 | SYSTEM AND METHOD FOR PERFORMANCE TESTING OF SCALABLE DISTRIBUTED NETWORK TRANSACTIONAL DATABASES |
| Current application | Herewith | SECURITY GATEWAY FOR HIGH SECURITY BLOCKCHAIN SYSTEMS |
| | | Is a continuation-in-part of: |
| 16/747,429 | Jan. 20, 2020 | SECURITY GATEWAY FOR HIGH SECURITY BLOCKCHAIN SYSTEMS |
| | | which is a continuation-in-part of: |
| 16/696,352 | Nov. 26, 2019 | SYSTEM AND METHOD FOR SECURITY GATEWAY FOR HIGH SECURITY BLOCKCHAIN SYSTEMS |
| | | which is a continuation-in-part of: |
| 16/684,517 | Nov. 14, 2019 | SYSTEM AND METHOD FOR AUTOMOTIVE INVENTORY MANAGEMENT AND RECORDKEEPING USING MULTI-TIERED DISTRIBUTED NETWORK TRANSACTIONAL DATABASE |
| | | which is a continuation-in-part of: |

-continued

| application No. | Date Filed | Title |
|---|---|---|
| 16/660,695 | Oct. 22, 2019 | SYSTEM AND METHOD FOR CONDUCTING AND SECURING TRANSACTIONS WHEN BLOCKCHAIN CONNECTION IS UNRELIABLE |
| | | which is also a continuation-in-part of: |
| 16/208,853 | Dec. 4, 2018 | SYSTEM AND METHOD FOR PERFORMANCE TESTING OF SCALABLE DISTRIBUTED NETWORK TRANSACTIONAL DATABASES |
| | | which claims benefit of, and priority to: |
| 62/594,519 | Dec. 4, 2017 | SYSTEM AND METHOD FOR CONCEPT OF HIGH-PERFORMANCE SCALABILITY |
| | | and is also a continuation-in-part of: |
| 16/152,090 | Oct. 4, 2018 | SYSTEM AND METHOD FOR MULTI-TIERED DISTRIBUTED NETWORK TRANSACTIONAL DATABASE |
| | | which claims benefit of, and priority to: |
| 62/570,064 | Oct. 9, 2017 | MULTI-TIER BLOCKCHAIN-BASED REGIONALIZED CRYPTOCURRENCY SOLUTION |
| | | and is also a continuation-in-part of: |
| 16/122,870 | Sep. 5, 2018 | SYSTEM AND METHOD FOR MULTI-TIERED DISTRIBUTED NETWORK TRANSACTIONAL DATABASE |
| | | which claims benefit of, and priority to: |
| 62/554,546 | Sep. 5, 2017 | MULTI-TIER BLOCKCHAIN-BASED REGIONALIZED CRYPTOCURRENCY SOLUTION |
| | | and also claims benefit of, and priority to: |
| 62/549,138 | Aug. 23, 2017 | System and Method for Enhanced Cybercurrency Transactions |
| | | and also claims benefit of, and priority to: |
| 62/547,227 | Aug. 18, 2017 | System and Method for Enhanced Cybercurrency Transactions |
| | | and also claims benefit of, and priority to: |
| 62/540,943 | Aug. 3, 2017 | System and Method for Enhanced Cybercurrency Transactions |
| Current application | Herewith | SECURITY GATEWAY FOR HIGH SECURITY BLOCKCHAIN SYSTEMS |
| | | Is a continuation-in-part of: |
| 16/796,159 | Feb. 20, 2020 | SYSTEM AND METHOD FOR PROVIDING SECURITY GATEWAYS FOR HIGH SECURITY BLOCKCHAIN SYSTEMS |
| | | which is a continuation-in-part of: |
| 16/747,982 | Jan. 21, 2020 | SYSTEM AND METHOD FOR AUTOMOTIVE INVENTORY MANAGEMENT AND RECORDKEEPING USING MULTI-TIERED DISTRIBUTED NETWORK TRANSACTIONAL DATABASE |
| | | which is a continuation-in-part of: |
| 16/684,517 | Nov. 14, 2019 | SYSTEM AND METHOD FOR AUTOMOTIVE INVENTORY MANAGEMENT AND RECORDKEEPING USING MULTI-TIERED DISTRIBUTED NETWORK TRANSACTIONAL DATABASE |
| Current application | Herewith | SECURITY GATEWAY FOR HIGH SECURITY BLOCKCHAIN SYSTEMS |
| | | Is a continuation-in-part of: |
| 16/796,159 | Feb. 20, 2020 | SYSTEM AND METHOD FOR PROVIDING SECURITY GATEWAYS FOR HIGH SECURITY BLOCKCHAIN SYSTEMS |
| | | which is a continuation-in-part of: |
| 16/696,352 | Nov. 26, 2019 | SYSTEM AND METHOD FOR SECURITY GATEWAY FOR HIGH SECURITY BLOCKCHAIN SYSTEMS |
| | | which is a continuation-in-part of: |
| 16/684,517 | Nov. 14, 2019 | SYSTEM AND METHOD FOR AUTOMOTIVE INVENTORY MANAGEMENT AND RECORDKEEPING USING MULTI-TIERED DISTRIBUTED NETWORK TRANSACTIONAL DATABASE |

-continued

| application No. | Date Filed | Title |
|---|---|---|
| Current application | Herewith | SECURITY GATEWAY FOR HIGH SECURITY BLOCKCHAIN SYSTEMS Is a continuation-in-part of: |
| 16/748,213 | Jan. 21, 2020 | SYSTEM AND METHOD FOR CONDUCTING AND SECURING TRANSACTIONS WHEN BLOCKCHAIN CONNECTION IS UNRELIABLE which is a continuation-in-part of: |
| 16/747,982 | Jan. 21, 2020 | SYSTEM AND METHOD FOR AUTOMOTIVE INVENTORY MANAGEMENT AND RECORDKEEPING USING MULTI-TIERED DISTRIBUTED NETWORK TRANSACTIONAL DATABASE |
| Current application | Herewith | SECURITY GATEWAY FOR HIGH SECURITY BLOCKCHAIN SYSTEMS Is a continuation-in-part of: |
| 16/162,066 | Oct. 16, 2018 | SYSTEM AND METHOD FOR MULTI-TIERED DISTRIBUTED NETWORK TRANSACTIONAL DATABASE which is a continuation-in-part of: |
| 16/122,870 | Sep. 5, 2018 | SYSTEM AND METHOD FOR MULTI-TIERED DISTRIBUTED NETWORK TRANSACTIONAL DATABASE | the entire specification of each of which is incorporated herein by reference.

BACKGROUND

Field of the Art

The disclosure relates to the field of financial transactions, and more particularly to the field of peer-to-peer ATM transactions.

Discussion of the State of the Art

Many conceptualizations of peer-to-peer Automatic Teller Machines (ATMs) functionalities exist, to allow individuals to exchange physical cash for digital currency much like an actual ATM does. The oldest type of "peer-to-peer ATM" is when you can use your debit card to get cash back (aka fiat currency or hard cash) at the supermarket, but this is not a true peer-to-peer functionality because the supermarket has a merchant account. When using the merchant account clearing system connected to a payment processor, the merchant is protected with a card-present transaction against fraud that reduces his exposure and risk. There is also a transaction fee which is usually comped by the supermarket as a courtesy to generate more traffic.

More recently other companies have come out, such as SPARE™, that have a similar approach and offer a phone (or more generally mobile device) app that gives you cash back for merchants without having to buy something, but it only works with merchants for the same reason that they only use the merchant card system to settle. These apps, however, charge you ATM-type fees but at a lower rate, so instead of paying $4-7 (what small accounts typically have to pay between their own bank and the foreign bank), they might charge a $3 fee total to the consumer. Part of that fee gets left with the merchant. There are also other microlending services that will send you money using VENMO™ or similar, but then you have to pay VENMO™ a dollar to move the money immediately to your account so you can use it right there at the supermarket to buy something small and get the 20 cash back at the merchant, and possibly still pay ATM fees. But none of these conceptualizations are true peer-to-peer ATM-type functionality systems.

SUMMARY

What is clearly needed is a true peer-to-peer ATM system where a user can actually get money from another user without either one of them having to have a merchant account or a credit/debit card clearing system through a payment processor. Looking at the system as described throughout, there is a strong Know Your Customer (KYC) presence for every member of a financial and smart wallet network, therefore all the parties are well known throughout the network or networks, and in particular to the system operator(s), there is virtually no risk of stolen debit cards being used to get money from the merchant, or a peer. As a result, there is relatively little risk to do small transactions between members where one member gives the other member cash in exchange for tokens. For example, member A could give member B $20 in cash and member B could give member A $20 equivalent on the system. The equivalency is established by the fiat value of an asset, such as a digital token or other digital money or equivalent. It is assumed in this case that B is in need of fiat currency (which may also be referred to as "cash" or "hard cash" throughout), which has better liquidity in some situations. Depending on the situation, there may also be a transaction fee for the convenience, etc. Even the risk of a holdup is relatively small, as a strong KYC is or should be present as a deterrent, and hence a perpetrator would be easily identified and apprehended. Social rating can further help reduce such risks, although risks can never be eliminated 100%.

Two members can find each other by, for example, searching for nearby members who need or want cash or those who are able and willing to give or spare cash; the key here is a readiness to make a transaction. Depending on the amount sought and amount available, more than one transaction(s) may be necessary in order to meet the total amount sought. The amount limit may change depending on the social ranking that the person has in the system (e.g. is this person new, is this person well-known, is this person a member of the same club/church/society etc. as the person offering the money, etc.).

Accordingly, the inventor has conceived and reduced to practice, a system and method for true peer-to-peer automatic teller machine transactions using mobile device payment systems.

According to one aspect a system for true peer-to-peer automatic teller machine transactions using mobile device payment systems is disclosed, comprising: a blockchain datastore; a GPS satellite; a cellular phone; a smart wallet application, comprising at least a processor, a memory, and a first set programming instructions stored in the memory and operable on the processor, wherein the first set of programming instructions, when operating on the processor, cause the processor to: utilize a cellular phone's connection to a cellular network and at least one GPS satellite to determine the phone's approximate location; provide for smart wallet features including storage of user information, communication with devices for the transfer of digital payments, and biometric authentication; and communicate with a peer-finding server for the purposes of locating a peer device operating another smart wallet application for the purposes of transferring funds; and a peer-finding server, comprising at least a processor, a memory, and a second set programming instructions stored in the memory and operable on the processor, wherein the second set programming instructions, when operating on the processor, cause the processor to: receive requests for peer filtering and locating from a smart wallet application; filter a list of known smart wallet application users based on a received request for peer filtering, including location and transaction type and amount; return to the requesting application a location and other pertinent information for the purposes of meeting and transferring funds with the located and selected user or users for transferring of funds; and wherein the transferring of funds may take the place of a physical transfer of physical currency between the users, while an equivalent digital transfer between their smart wallet applications occurs in the opposite direction, resulting in no or minimal net transfer of wealth, and physical currency being made available to the initial requesting user.

According to another aspect, a method for true peer-to-peer automatic teller machine transactions using mobile device payment systems is disclosed, comprising the steps of: utilizing a cellular phone's connection to a cellular network and at least one GPS satellite to determine the phone's approximate location, using a smart wallet application; providing for smart wallet features including storage of user information, communication with devices for the transfer of digital payments, and biometric authentication, using a smart wallet application; communicating with a peer-finding server for the purposes of locating a peer device operating another smart wallet application for the purposes of transferring funds, using a smart wallet application; receiving requests for peer filtering and locating from a smart wallet application, using a peer-finding server; filtering a list of known smart wallet application users based on a received request for peer filtering, including location and transaction type and amount, using a peer-finding server; returning to the requesting application a location and other pertinent information for the purposes of meeting and transferring funds with the located and selected user or users for transferring of funds, using a peer-finding server; wherein the transferring of funds may take the place of a physical transfer of physical currency between the users, while an equivalent digital transfer between their smart wallet applications occurs in the opposite direction, resulting in no or minimal net transfer of wealth, and physical currency being made available to the initial requesting user, using a peer-finding server.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

DETAILED DESCRIPTION

Figure 1:
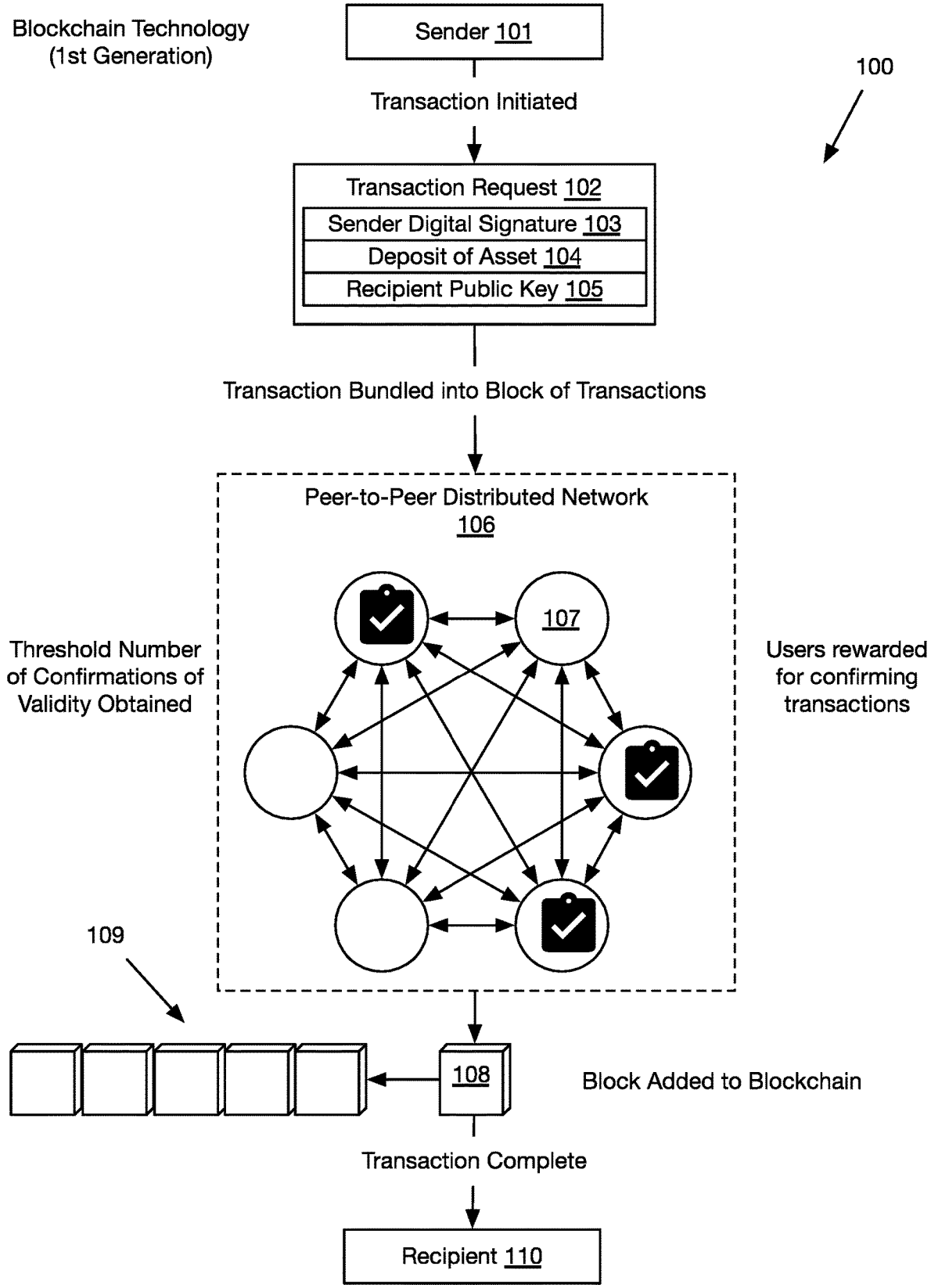
FIG. 1 (PRIOR ART) is a diagram illustrating the operation of existing cryptocurrencies using blockchain technology.

The inventor has conceived, and reduced to practice, a system and method for true peer-to-peer automatic teller machine transactions using mobile device payment systems.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

The term "cryptocurrency" as used herein includes not only its classic meaning but can also mean a representation of value in digitized form, secured by encryption, which may be transferred to others or exchanged with others for goods and services. Cryptocurrencies are typically not associated with a governmental authority, although it would be possible for a governmental authority to issue one. The definition of a cryptocurrency does not necessarily require distributed, unmanaged tracking and processing, although all major cryptocurrencies currently in use are so defined. Cryptocurrencies are often referred to a digital currencies or virtual currencies, and the valuation associated with cryptocurrencies is often referred to as coins or tokens, with fractional parts of a coin or token typically being allowed to be transferred or utilized.

The phrase "real currency" (aka fiat money) as used herein means the official currency of a country, region, or other globally-recognized governmental entity. For example, the U.S. dollar is the official currency of the country of the United States of America, the Euro is the official currency of the region of the European Union, and the Scottish bank notes are an officially recognized currency in Scotland, notwithstanding the fact that they are tied to the value of the British Pound.

The phrase "functional area" as used herein means any industry, grouping, association, political region (for example special economic zone), type of work, or other field of human endeavor, which may or may not correspond to a geographical area.

The phrase "geographical area" as used herein is used in its common meaning as any demarcated area of the Earth. Geographical areas are often, but not always, defined by agreed-upon borders such as between countries, states, counties, and cities.

The terms "mine" or "mining" as used herein mean incentivizing nodes to provide computer processing power to validate transactions by generating a small additional portion of the valuation associated with a blockchain database for each successful entry validation in that database, and giving that small portion to a node or nodes that perform(s) the successful entry validation.

The term "node" as used herein means any one of a plurality of computers that validate transactions in the blockchain database as part of a peer-to-peer network.

"Artificial intelligence" or "AI" as used herein means a computer system or component that has been programmed in such a way that it mimics some aspect or aspects of cognitive functions that humans associate with human intelligence, such as learning, problem solving, and decision-making. Examples of current AI technologies include understanding human speech, competing successfully in strategic games such as chess and Go, autonomous operation of vehicles, complex simulations, and interpretation of complex data such as images and video.

"Machine learning" as used herein is an aspect of artificial intelligence in which the computer system or component can modify its behavior or understanding without being explicitly programmed to do so. Machine learning algorithms develop models of behavior or understanding based on information fed to them as training sets, and can modify those models based on new incoming information. An example of a machine learning algorithm is AlphaGo, the first computer program to defeat a human world champion in the game of Go. AlphaGo was not explicitly programmed to play Go. It was fed millions of games of Go, and developed its own model of the game and strategies of play.

Unmanaged, distributed network, transactional databases (commonly known as "blockchain" databases) can be used to facilitate transactions in a manner that was previously not possible: they allow transactions between users without any form of centralized authority that has control over those transactions. The keys to this new technology are encryption, which allows security of the transaction, and distributed public confirmation, which allows trust in the validity of the transaction. There are innumerable uses for this new technology, such as transferring money, creating automatically-executing contracts, forming and automatically executing escrow transactions, etc. In fact, any asset that can be represented in digital form can be transferred or exchanged using blockchain databases.

The first, and still most common, use of blockchain databases was to enable the use of cryptocurrencies without a centralized controlling authority. However, while blockchain databases have significant advantages for use in cybercurrencies, they also have serious drawbacks, which continue to plague the cybercurrencies that use blockchain. As the blockchain for a given cybercurrency gets longer, transactions can take half an hour, or more, to reach a critical number of confirmations for validation of the transaction in the peer-to-peer network that manages the blockchain. This latency in concluding a transaction leads to substantial uncertainty about the value of the transaction until it is finalized. Combined with the current volatility of some cybercurrencies, this can lead to large fluctuations in value between the time that a transaction is initiated and the time that it is finalized. This valuation uncertainty is a problem for all sizes of transactions, but makes very small transactions particularly unattractive. For example, using existing blockchain-based cybercurrencies, buying a cup of coffee would be problematic. Not only would the buyer and seller need to wait on the order of half and hour for the transaction to complete, the cybercurrency equivalent of two dollars sent by the buyer could end up being the equivalent of three dollars by the time that the transaction is confirmed and finalized. Thus, each party to a transaction may gain or lose a large amount of the value of the transaction in the time required to complete the transaction.

Cybercurrencies, as they currently exist, are monolithic, which is to say that they are global, single-tier, single-unit currencies. They are global in the sense that there are no regional restrictions on transactions. Anyone with a computer anywhere in the world can make a transaction with anyone else anywhere in the world. They are single-tier in the sense that there are no higher or lower tiers of cybercurrency within the same system for which they can be traded or exchanged. They are single-unit in that there is a denominated unit (often referred to as a "coin" or "token") which is the unit of value for all transactions. Fractions of a denominated unit may be transferred, but the denominated unit never changes.

The problem with monolithic cybercurrencies is that the time for processing of transactions grows as the blockchain upon which they are built grows. In certain cybercurrencies currently in use, the processing time for transactions can half an hour, or more. This is the time required to reach a critical number of confirmations for validation of the transaction in the peer-to-peer network that manages the blockchain. The longer the cybercurrency is in operation, the larger the blockchain grows, and the longer the latency becomes between the initiation of a transaction and its finalization.

This latency makes certain transactions untenable for time reasons. This is particularly the case for small transactions where the buyer and seller would not ordinarily stand around waiting for the transaction to complete. For example, in buying a cup of coffee, the buyer and seller expect to conclude the transaction within a few seconds, or within a minute or two at the most. The buyer orders the coffee, makes the payment, and the seller hands the buyer the coffee, all within a minute or two. Having to wait half an hour or more for the transaction to complete makes this sort of small value transaction untenable.

This latency also makes certain transactions untenable for valuation reasons. A long latency creates uncertainty in concluding a transaction leads to substantial uncertainty about the value of the transaction until it is finalized. The longer the latency and the higher the volatility of the cybercurrency, the more uncertainty is created in value, and the less tenable a cybercurrency is for making that transaction. This problem exists for transactions of all values, but for larger transactions, the parties involved may be willing to take the risk of fluctuation for any number of reasons (e.g., the value to them of making an anonymous transaction may be higher than making the transaction using other types of currency). For smaller transactions, the reasons for taking the risk of value fluctuation are largely eliminated. For example, in the example of the purchase of a cup of coffee, there is little reason for either of the parties involved to care whether the transaction is anonymous. Since cybercurrencies can be extremely volatile, a half hour latency can cause the parties to a transaction to gain or lose a large amount of the value of the transaction in the time required to complete the transaction.

In one embodiment, the multi-tiered blockchain database system can be used to improve the viability of small value cybercurrency transactions. The improvement involves creating multiple tiers within the cybercurrency with characteristics that reduce the latency between the initiation and finalization of transactions, such that waiting times and risk of value fluctuation for both the buyer and seller are reduced to acceptable levels for small value transactions.

In certain embodiments, a cybercurrency system may be enhanced to reduce these latencies by including one or more tiers in which transactions are limited to those of a lesser denomination, with a limited number of ledger transacting nodes and a limited number of gateways interacting between the general area of unlimited currency and the demarcated area. In some embodiments, the tiers may represent different tiers of currency may be issued, and exchanges of cybercurrency among the tiers may be allowed. In some embodiments, the tiers may be limited to a certain geographical region, where the cybercurrency in that section may be traded at a fixed rate to another currency in the same area, which may be a real currency rather on a major cryptocurrency. In some such embodiments, a central issuer, or bank, with a reserve, may be allowed stabilize the cybercurrency or to tie the value of the cybercurrency to the local real currency. In some embodiments, so called "mixer wallets" containing more than one cryptocurrency may be blocked or confiscated to avoid misuse of funds for illegitimate purposes.

In one embodiment, lower tiers of cryptocurrency would be restricted in a number of ways. Lower tiers of cryptocurrency would be allowed to handle only fractional currency, that is, currency that is a fraction of a whole currency unit, usually equivalent to coins. The machines that process transactions in lower tiers of cryptocurrency could process only in their own region, and only fractional transactions. Also, because only fractional transactions of fractional currency occur in these lower tier currencies, no currency mining could occur, because no mining is allowed in these lower tier currencies. If a user wants to change the between tiers, the currency would be reserved via gateways and blocked into the ledger in the main region and transferred into the lower region and made available as fractional currency. A small portion of any transfer would be allocated to the operators of the ledger machines in each region to pay operating costs. With no mining occurring in the regions, and with the regions being regionally limited in range, the cost of operation would be much lower. Also, the local fractional currency could be, for example, bound to a local physical currency such as, for example, the U.S. dollar or the Euro, rather than to a cybercurrency such as Bitcoin or Ether, so there might be a local master currency available, issued by the conversion gateway, which would be paid for by currency in the upper domain and then actually converted by the gateways into a local physical currency. Those gateways might act as central banks, rather than as gateways, issuing a fractional currency only. Thus the transactions may be made faster and less vulnerable to currency fluctuations.

In some embodiments, the ledgers may be split by years, with the current ledgers containing only transaction for the current year or two, and all previous transactions kept in archived ledgers, accessed only if a user has a wallet with an old balance. In such a case, as soon as the user wants to use the old balance, the wallet is retrieved from the archive, updated, and removed from the archive. Thus archived wallets may take a little longer to transact, but current wallets are much faster, because the ledger is kept current only in the ledger currency. Because the ledgers are regionalized, they can be much smaller and thus process transactions much more quickly.

It is important to note that the regionalization of lower tier currencies does not mean a ledger is limited to one country. For example, in North America, each region could contain a piece of Canada, the United States, and Mexico. Thus, including multiple jurisdictions could avoid putting a region under the control of just one country. Wallets could simultaneously contain the physical currency of multiple regions, such as, for example, Euros, dollars, and yen. Most people spend currency in their home region, so merchants could execute transactions much more cheaply, because of the reduced risk of currency fluctuations in most cases.

Further, in some embodiments, when liquidity runs below a certain level, due to large outflow, a program or an AI module in the system can take at least one of several countermeasures: a) it can change exchange rate to reduce outflow, b) it can offer an interest for delaying a conversion, or c) it makes a cash call on certain members of a reserve group to allow a larger reserve to be built up quickly and thus maintain liquidity. This process can be triggered in an automated way by software and or an AI supervisory module (not shown) running as part of the management software of the system on at least one of the servers or as part of the EVM system (or similar) or both.

In some embodiments, enhancements to existing blockchain technology may be used to reduce the latency associated with current cryptocurrency systems. In currently existing cryptocurrencies, the blockchains used as transaction ledgers are never retired or archived, leading to increasingly-long block chains, and slow processing times in the peer-to-peer network, and increasing latencies. Two methods, in particular, may be used to retire or archive older portions of the blockchain, leaving a shorter blockchain as the active portion, and reducing latency times. First, a section closing method may be used wherein an entire blockchain for a certain period (for example, the previous year, as in year-end closing in accounting) is reconciled, the balances of each account (e.g., wallet) are moved to a new, shorter blockchain, and the old blockchain is archived. Second, an asynchronous closing method may be used wherein the old blockchain is kept open but archived. A new blockchain is created, but account balances are not automatically transferred. Whenever an activity involves an entry in the old blockchain, that particular entry is consolidated and closed out from the old blockchain, and is transferred to the new blockchain. In this manner, the old blockchain will gradually be fully consolidated and closed out.

In some cases, a multi-tiered blockchain database may be used to implement a cryptocurrency system. Such an implementation may include one or more demarcated sections, or areas, in which transactions are limited to those of a lesser denomination, with a limited number of ledger transacting nodes and a limited number of gateways interacting between the general area of unlimited currency and the demarcated area. Such areas may have a limited-time active ledger, and older transactions are moved to an archive to speed up new transactions. In such cases, old wallet entries are then transferred at the time of use to a new section of a new ledger. Also, in that demarcated area, mining could be restricted. Further, in this area, a central issuer, or bank, with a reserve, may stabilize the currency, and currency in this area may be traded at a fixed rate to another currency in the same area, which may be a real currency rather on a major cryptocurrency. Additionally, in such areas, so called mixer wallets may be blocked or confiscated to avoid misuse of funds for illegitimate purposes.

In some embodiments, the implementation will include a number of standardized smart contracts to provide baseline support of some key functionality including coupons, timed escrow (pay after N days), key-based escrow, and other related functions. Providing a set of standardized smart contracts will mitigate the problem of an exploding world of poorly-written smart contracts in the same way careful design and engineering is required to effectively use stored procedures in modern databases.

In some embodiments, support may be included for anonymous messaging in the block chain. Such messaging may used to send basic messages between both parties as well as instructions to smart contracts. Such messages would be limited to text fields only, so as to eliminate a potential security hole where links and code (such as JavaScript) could be incorporated in messages for nefarious purposes.

In some embodiments, the wallets established for holding, tracking, and transferring valuation associated with entries in a blockchain database may be restricted to holding or tracking only valuation associated with a certain tier or tiers, a certain functional area or areas, a certain geographic area or areas, or any combination of these restrictions. In other embodiments, there may be no such restriction, and wallets would be allowed to hold, track, or transfer to or from a plurality of tiers, functional areas, or geographical areas. In some embodiments, wallets will allow users to see the value of their stored coinage in their native coin value or normalized to the wallet's default currency based on current market prices for valuation.

FIG. 1 (PRIOR ART) is a diagram illustrating the operation of existing cryptocurrencies using blockchain technology 100. A sender 101 initiates a transaction request 102, which includes the sender's digital signature 103, a deposit of a digital asset 104 such as an amount of cryptocurrency, and the recipient's public encryption key 105. The transaction request 102 is placed into a peer-to-peer distributed computing network 106 associated with this cryptocurrency, where it is timestamped, bundled into a block with other transactions and a hash of all previous blocks in the chain, and broadcast to all nodes 107 in the network 106. Each node 107 that receives the block 108 subjects it to repeated encryptions until a hash is found that has a certain number of zeros at the beginning, which serves as a confirmation of validity. Once the required hash is found for the block 108, the hash is broadcast back to the network 106 for confirmation by other nodes 107 in the network 106. When a threshold number of confirmations are obtained, the block 108 is permanently added to the blockchain 109, which serves as an unchangeable ledger of transactions. The transaction is completed, and the recipient 110 now owns the digital asset 104 deposited with the transaction request 102.

The nodes 107 typically hold copies of the blockchain, which acts as the ledger of a blockchain transaction. Also, the sender 101 and recipient 110 have digital wallets (not shown) that store information about their accounts. The complete details of blockchain transactions are not shown here, but they are well known in the art. Examples of cybercurrency currently using such an approach are Bitcoin, which has the bitcoin as the principal unit of currency and the satoshi, equal to 0.00000001 bitcoin. Another cybercurrency is the Ether (ETH), one of which is currently (mid July 2017) valued at approximately one-twelfth of a Bitcoin (BTC) and has approximately one million subunits. The problem, as mentioned above, is that it can take roughly half an hour to get a sufficient number of ledgers in a blockchain to execute a simple wallet transaction. For example, when a user wants to send an amount from one wallet to another, he needs to point to the address where his wallet keeps the bitcoin that he has currently with his private pointer and take the amount in that location. He then points to the payee and indicates the amount that he wants to send to the payee, retaining the rest for himself as the payor. The amount in that wallet location is split in two, with one amount sent to the payee and the remainder sent back to the payor. Such is the transaction in the blockchain, which can be publicly inspected. When a sufficient number of nodes in the blockchain community have accepted this transaction, it is considered fulfilled and transacted. The problem is that most participants who make such transactions, often for a small amount of satoshi, use most of the capacity for mining new bitcoin, so that mining is becoming increasingly more expensive. As a result, with the growing size of the ledger, the time for this transaction, waiting in queue and then actually executing, grows exceedingly long, leaving the cybercurrency involved in the transaction vulnerable to currency fluctuations. Also, mixer service or mixer wallets are sometimes used to anonymize currency. Many approaches exist and are known in the art.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

The inventors have identified and eliminated these limits including reducing transaction latency and costs, micro payments that can be handled cost effectively, cracking the limits to growth, being a stable and localized store of value, coexisting with multiple cryptocurrencies, ease of use by the masses, and enhancing criminal deterrents.

What is clearly needed is a better system and method of securing a blockchain network without negating the ability to have code executed, as in the case with smart contracts or tokens powered by smart contracts (TPSC).

In some cases, a limited amount of crypto currency may be sent by a message in form of an attached smart contract or credentials for accessing a cloud-based bot program. Further, certain contracts can temporarily be blocked from being active, pending a dispute resolution. Additionally, as part of the right to mine the top level coins, users agree to transact for free services in the lower levels, and a third party may be tasked to inspect and audit and act as an assurance entity for one or more regions of the crypto currency in return for a transaction fee in each region inspected and assured.

In a system where payments are done using tokens representing a currency, these tokens may be transacted on a blockchain and sometimes moved among banks, possibly resulting in an imbalance of bank FIAT accounts. In such cases, from time to time one or more banks may require a transfer on an RTGS system to correct an such an imbalance. In those cases where said RTGS system is not available during hours of non-operation, banks may move the RTGS transfer to a clearing house that is operational non-stop without any breaks, thus enabling settlements at any time of any day of the year. In some cases, to avoid complicated transfers of operations, such operations may always run via a clearing house. Further, the transfers to the clearing house are operated using the block chain network, to avoid any limitation of the RTGS time of operation. Additionally, should a particular bank's available balance on its FIAT account drop below a preset threshold, either the central bank or another pre-agreed partner will automatically launch an infusion of additional FIAT funds into the bank's account to maintain sufficient liquidity. Alternatively, rather than depending on a preset threshold, an AI system may be used to calculate the level upon which such an infusion is made, and also to calculate the required size of the infusion to stabilize the bank. In all such cases, one or more persons or institutions are notified at or shortly before such an event.

Detailed Description of Exemplary Aspects

Figure 24:
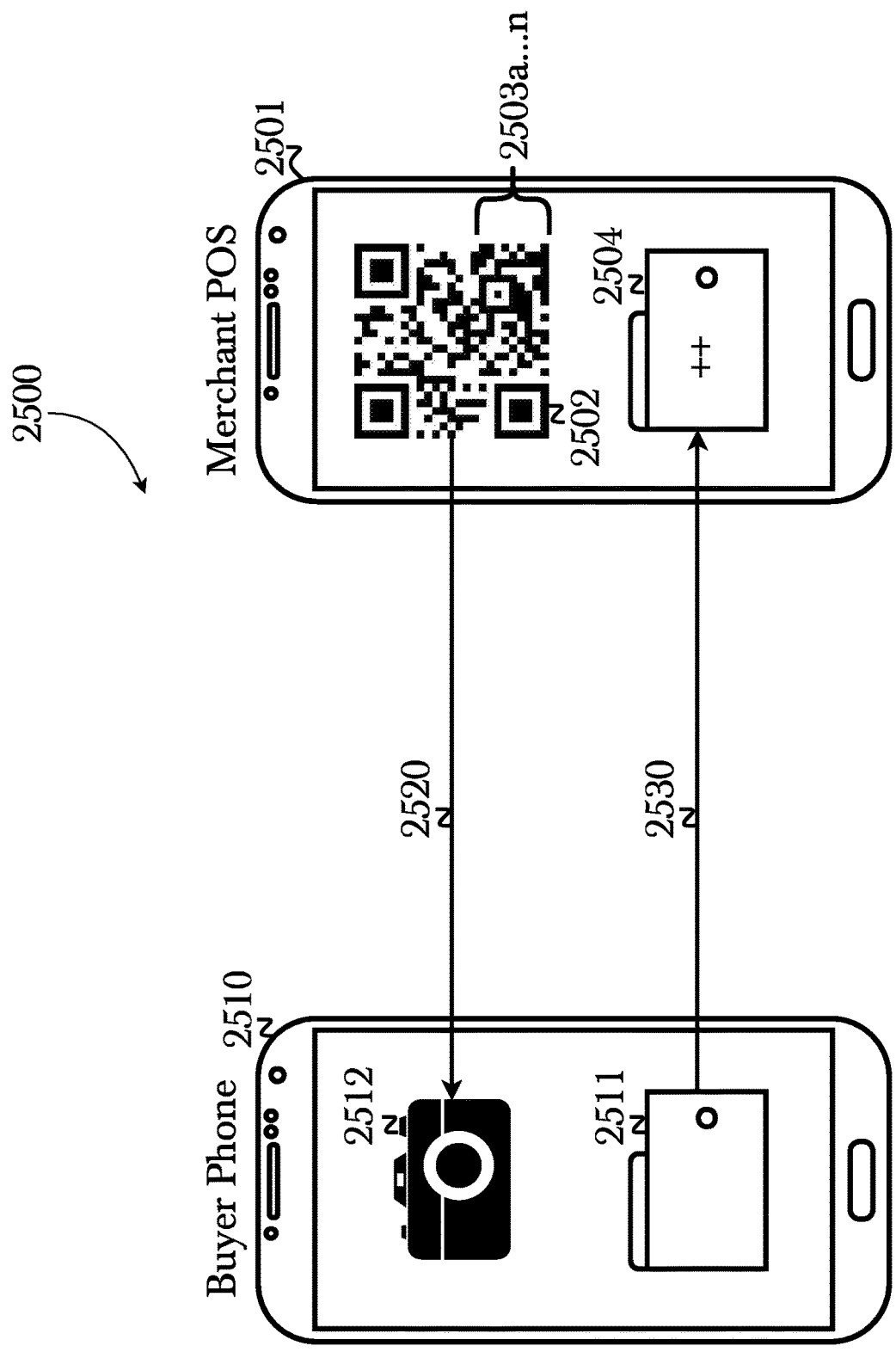
FIG. 24 shows a typical point-of-sale transaction between a merchant and a buyer.

FIG. 24 shows a point-of-sale (POS) transaction 2500 between a merchant phone (or other point of sale, or POS, device) 2501 and a buyer phone 2510, according to an aspect of the invention. Embedded in a quick response (QR) code 2502 (or in some cases other 2D barcode, or other enhanced barcodes, including but not limited to multi-dimensional or dynamic barcodes, dynamic barcodes with time signature, colored barcodes, any combination of the list etc.) are information sections 2503*a-n* comprising additional information for different networks and payment information. During the transaction, the buyer's phone camera 2512 receives 2520 QR code 2502 and sends 2530 payment information 2511 to the merchant's phone via the network. (if no carrier or Wi-Fi network is available, other network methods can be employed, as discussed below.) The transaction is complete once the payment has been sent to the merchant's phone and shows up in his/her increased balance 2504. In other cases, any kind of barcodes may be sent to the merchant phone as evidence that the transaction has been made. In yet other cases the merchant device may not be a phone but a tablet or a notebook computer, a desktop computer, a modified cash register, or any other type of suitable computing device with software installed.

Alternatively, a secured transaction can be based on three-way optical interaction (P2P barcode). In this case, the buyer reads an encrypted dynamic (that is, one that may be changed every several seconds for security purposes) barcode (or QR code) with a time signature. The barcode or QR code represents a merchant identity or the merchant identity and additional transaction details (for example detailed list of groceries and their prices, as well as in some cases network information). The buyer validates (in a closed and trusted app) the merchant identity and transaction details and approves to send the required digital money from his wallet to the merchant. In those cases where there is no network available, the buyer may present an encrypted barcode to the merchant. The merchant then reads the barcode via the merchant wallet app (closed and trusted app) and validates the correctness of the transaction. The merchant sends approval via another encrypted barcode to the buyer that summarizes the transaction, so the two sides have both evidence and a receipt that the transaction has been completed. When the receipt of the merchant or the receipt of the buyer is sent and received on appropriate servers, the transaction may be added to a blockchain ledger and the transaction declared completed.

Figure 23:
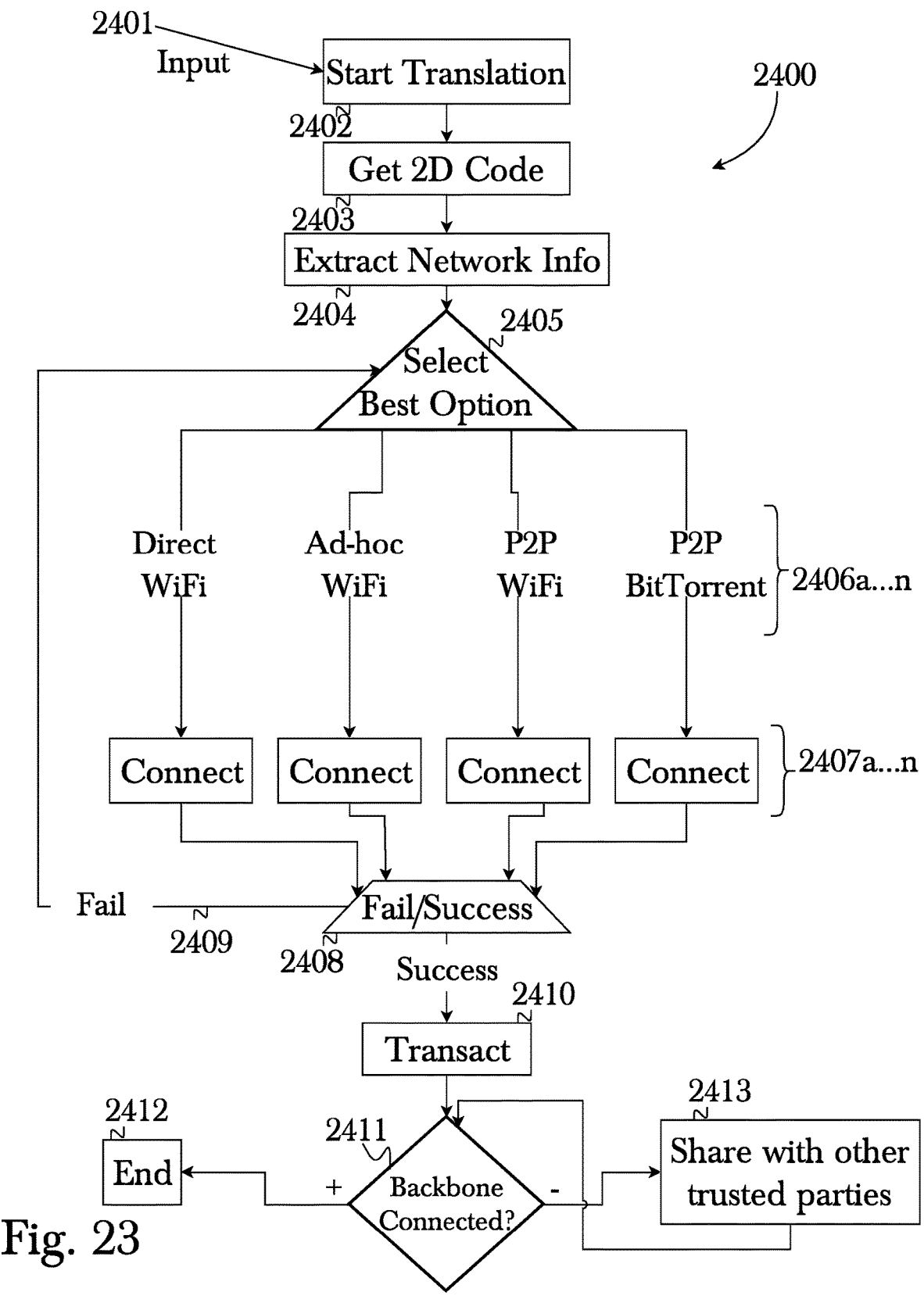
FIG. 23 shows an exemplary flow diagram of a point-of-sale transaction in which transaction information can be sent to the backbone via trusted devices on the network if buyer or merchant phones are unable to directly connect.

FIG. 23 shows an exemplary flow diagram 2400 of such a POS transaction, in which only the user side is shown. The transaction starts on the user side 2401 when he/she wants to buy a product. In the steps that follow, the user starts a transaction 2402, the camera activates to read the QR or 2D barcode 2403, and the camera extracts the payment and network information 2404.

Because there are multiple types of networking information embedded in the QR code, of interest is the specific networking information extracted in step 2404. The specific networking information may be used in step 2405, a decision tree that determines the best choice of network. For example, if the merchant and buyer have different phones (android versus iOS) a different type of network may be the appropriate choice compared to if both parties have the same phone. This is because certain types of networks only work between two phones with the same operating system versus two phones with different operating systems. Therefore, there are typically four P2P network options, including in some cases additionally near field communication or other suitable methods to choose from in step 2406a-n, depending on the situation: direct Wi-Fi, ad hoc Wi-Fi, P2P Wi-Fi, P2P barcode and P2P Bluetooth, or any other suitable option. Other factors that influence network choice are whether the location has fixed Wi-Fi or whether the merchant is willing to share its Wi-Fi. If not, an ad-hoc P2P type network may be best. For example, in some cases, rather than using a traditional wireless local network, the two devices may exchange a series of at least two 2D barcodes or QR codes with each other, having the same net effect of conducting a private local data exchange. In some aspects, such private data exchanges are conducted using closed and trusted applications (apps) on each device that create and read dynamic, time dependent and encrypted 2d barcodes or QR codes.

Step 2407a-n shows the different kinds of connection parameters necessary for each type of P2P network. If the connection fails during step 2408, the transaction loops back to step 2409 to try a different approach and select the next best connection parameter. If the connection succeeds during step 2408, the transaction continues on to step 2410. Step 2411 tests if the transaction is connected to the backbone. If not, both the merchant and buyer phones propagate the transaction (with increasing intervals) to other known, trusted devices in step 2413 until one of these devices connects to the backbone. If so, the transaction ends at step 2412.

This process 2400 protects merchants by ensuring buyers can't cheat or deny involvement in a transaction and vice versa. Buyers and sellers are accountable for their transactions because of step 2411, in which other devices can get an encrypted copy of this transaction, and any or all of them may then send this transaction to the backbone. (For example, even if the buyer throws away his device and claims to not have done the transaction, said transaction may have propagated through other devices to the backbone and still be registered.)

This process 2400 also ensures that the network can't be abused or used for personal gain. Because the network is only live for the duration of the transaction (a few seconds or minutes), and is not available after the transaction is completed, the user can't use it to download movies, for example. Also, in cases where the network only connects to the merchant's phone, instead of through to the backbone, the user won't have access to the Internet. In these cases the transaction is propagated to the backbone from the merchant's phone into the blockchain, etc.

Once a transaction has been sent to the backbone, it is added to the blockchain. Multiple copies may be added and should reconcile. If they don't, it may invoke a dispute resolution. Typically, offline transactions are limited in amount and numbers of transactions. Amount and number may vary depending on account balance and account history and offline rating and dispute history or lack thereof.

In systems where transactions are unable to connect to the backbone, the merchant phone and the buyer phone connect via an ad hoc network. Both phones keep a record of this transaction and make repeat attempts to send this information to the backbone. If neither phone can connect to the backbone, said phones will send an encrypted copy of their transaction to a known, trusted device on the network. This trusted device serves as a proxy and transmits the copied transaction to the backbone as soon as it is able to connect.

Some transactions may propagate in multiple paths from the non-connected area to the connected area, and third-party delivery may be much faster than the user's direct delivery. The multiple propagation paths may result not only from how reachable the network service originally was, but also about overloaded services and service availability. Examples of service disruption include high-service overload events such as concerts or shows (issues of service overload) and natural disasters (issues of service availability), where messages can only send from time to time instead of continuously and reliably.

In some cases a system for transacting in an environment without connectivity between a network backbone and a blockchain, a merchant device such as a phone or point of sale offers or transmits a set of credentials for an ad hoc network to close the transaction (by offering or transmitting an embedded set of optional ways to connect an ad hoc network between a buyer phone and a merchant phone or point of sale), and allows a direct exchange of multiple handshakes to secure the transaction, Both phones (or the consumer phone and the merchant phone and/or point of sale) will then keep a record of this transaction and try at the next opportunity to send this transaction over the network backbone to a blockchain. In yet other cases, each time such a client or merchant devices encounters other known, trusted devices on a P2P network, they may send an encrypted copy of their mutual transactions to the trusted devices, thereby enabling the encrypted copy to be transmitted over the network backbone to a blockchain as quickly as possible via repeated attempts by one or more trusted devices that may have better connectivity than the original sending device. A device that may or may not have been involved in the actual transaction may transmit the transaction to the network backbone and propagate it to the blockchain. Furthermore, in some cases, such client and/or merchant devices may be antitamper-hardened devices.

Figure 3:
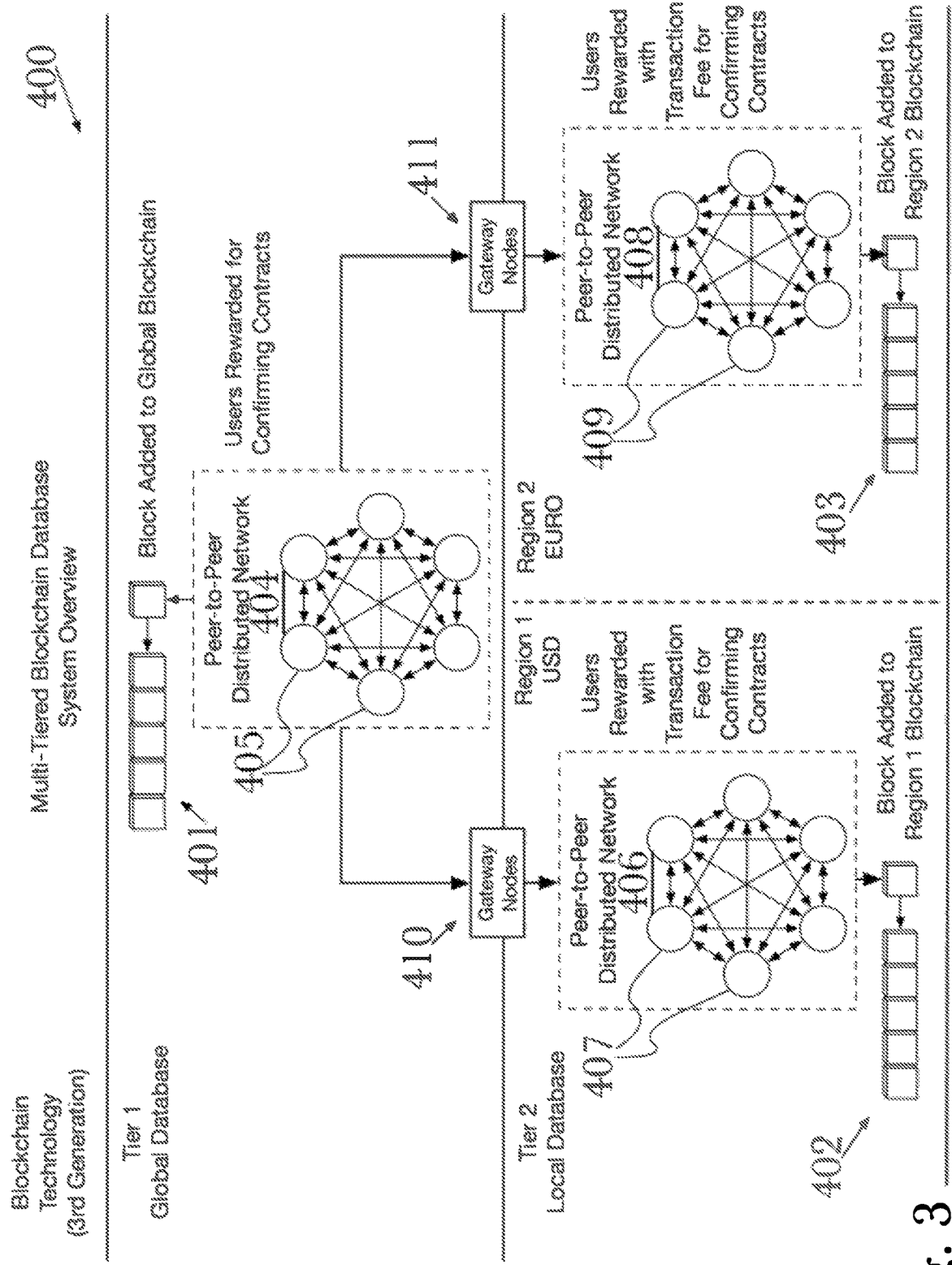
FIG. 3 is a diagram showing an exemplary system overview of a multi-tiered blockchain database.

FIG. 3 is a diagram showing an exemplary system overview 400 of a multi-tiered blockchain database. In some embodiments, the blockchain database maintained for the global database 401, and for each lower tier database 402, 403 would comprise tiers of a single blockchain, but in other embodiments, they would comprise separate blockchains. In certain embodiments, the peer-to-peer networks for the global database 404 and for each lower tier region 406, 408 might be required to be separate and distinct (i.e., share no nodes 405, 407, 409), but in other embodiments might be allowed to share nodes 405, 407, 409. In some embodiments, there may exist gateway nodes 410, 411 between the global database 401 and each lower tier regional database 402, 403 to enforce separation of transactions in each region of each tier.

The machines that process transactions in these regions can process only in their own region, and only fractional transactions. Also, because only fractional transactions of fractional currency occur in these regions, no currency mining can occur, because no mining is allowed in these regions. If a user wants to change the currency, the currency is reserved via gateways 410 and 411 and blocked into the ledger in the main region and transferred into the lower region and made available as fractional currency. A small portion of that coin is then allocated to the operators of the ledger machines in each region, to pay operating costs. With no mining occurring in the regions, and with the regions being regionally limited in range, the cost of operation is much lower. Also, the local fractional currency could be, for example, bound to a local physical currency such as, for example, the U.S. dollar or the Euro, rather than a cybercurrency such as Bitcoin or Ether, so there might be a local master currency available, issued by the conversion gateway, such as gateway 410 or 411, which would be paid for by currency in the upper domain and then actually converted by the gateways into a local physical currency. Those gateways might act as central banks, rather than as gateways, issuing a fractional currency only, and further in these regions there cannot be mining. Thus the transactions are faster and less vulnerable to currency fluctuations. Additionally, the ledgers may be split by years, with the current ledgers containing only transaction for the current year or two, and all previous transactions kept in archived ledgers, accessed only if a user has a wallet with an old balance. In such a case, as soon as the user wants to use the old balance, the wallet is retrieved from the archive, updated, and removed from the archive. Thus archived wallets may take a little longer to transact, but current wallets are much faster, because the ledger is kept current only in the ledger currency. Because the ledgers are regionalized, they can be much smaller and thus process transactions much more quickly. However, being regionalized does not mean a ledger is limited to one country. For example, in North America, each region could contain a piece of Canada, the United States, and Mexico. Thus, including multiple jurisdictions could avoid putting a region under the control of just one country. Wallets could simultaneously contain the physical currency of multiple regions, such as, for example, Euros, dollars, and yen. Most people spend currency in their home region, so merchants could execute transactions much more cheaply, because of the reduced risk of currency fluctuations in most cases.

Further, in some cases, when liquidity runs below a certain level, due to large outflow, a program or an AI module in the system can take at least one of several countermeasures: a) it can change exchange rate to reduce outflow, b) it can offer an interest for delaying a conversion, or c) it makes a cash call on certain members of a reserve group to allow a larger reserve to be built up quickly and thus maintain liquidity. This process can be triggered in an automated way by software and or an AI supervisory module (not shown) running as part of the management software of the system on at least one of the servers or as part of the EVM system (or similar) or both.

Various embodiments of the present disclosure may be implemented in computer hardware, firmware, software, and/or combinations thereof. Methods of the present disclosure can be implemented via a computer program instructions stored on one or more non-transitory computer-readable storage devices for execution by a processor. Likewise, various processes (or portions thereof) of the present disclosure can be performed by a processor executing computer program instructions. Embodiments of the present disclosure may be implemented via one or more computer programs that are executable on a computer system including at least one processor coupled to receive data and instructions from, and to transmit data and instructions to, a data storage system, at least one input device, and at least one output device. Each computer program can be implemented in any suitable manner, including via a high-level procedural or object-oriented programming language and/or via assembly or machine language. Systems of the present disclosure may include, by way of example, both general and special purpose microprocessors which may retrieve instructions and data to and from various types of volatile and/or non-volatile memory. Computer systems operating in conjunction with the embodiments of the present disclosure may include one or more mass storage devices for storing data files, which may include: magnetic disks, such as internal hard disks and removable disks; magneto-optical disks; and optical disks. Storage devices suitable for tangibly embodying computer program instructions and data (also called the "non-transitory computer-readable storage media") include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits) and other forms of hardware.

In some cases, a cryptocurrency system may include one or more demarcated sections, or areas, in which transactions are limited to those of a lesser denomination, with a limited number of ledger transacting nodes and a limited number of gateways interacting between the general area of unlimited currency and the demarcated area. Such areas may have a limited-time active ledger, and older transactions are moved to an archive to speed up new transactions. In such cases, old wallet entries are then transferred at the time of use to a new section of a new ledger. Also, in that demarcated area, no mining is allowed.

Further, in this area, a central issuer, or bank, with a reserve, may stabilize the currency, and currency in this area may be traded at a fixed rate to another currency in the same area, which may be a real currency rather on a major cryptocurrency. Additionally, in such areas, so called mixer wallets may be blocked or confiscated to avoid misuse of funds for illegitimate purposes.

Demarcated Block Sections

There are two possible methods to closing an active section of the blockchain. One is a pro-active, complete close, the other is a "on the fly, as you go" type close, performed asynchronously, as needed. Both are discussed below.

Figure 4:
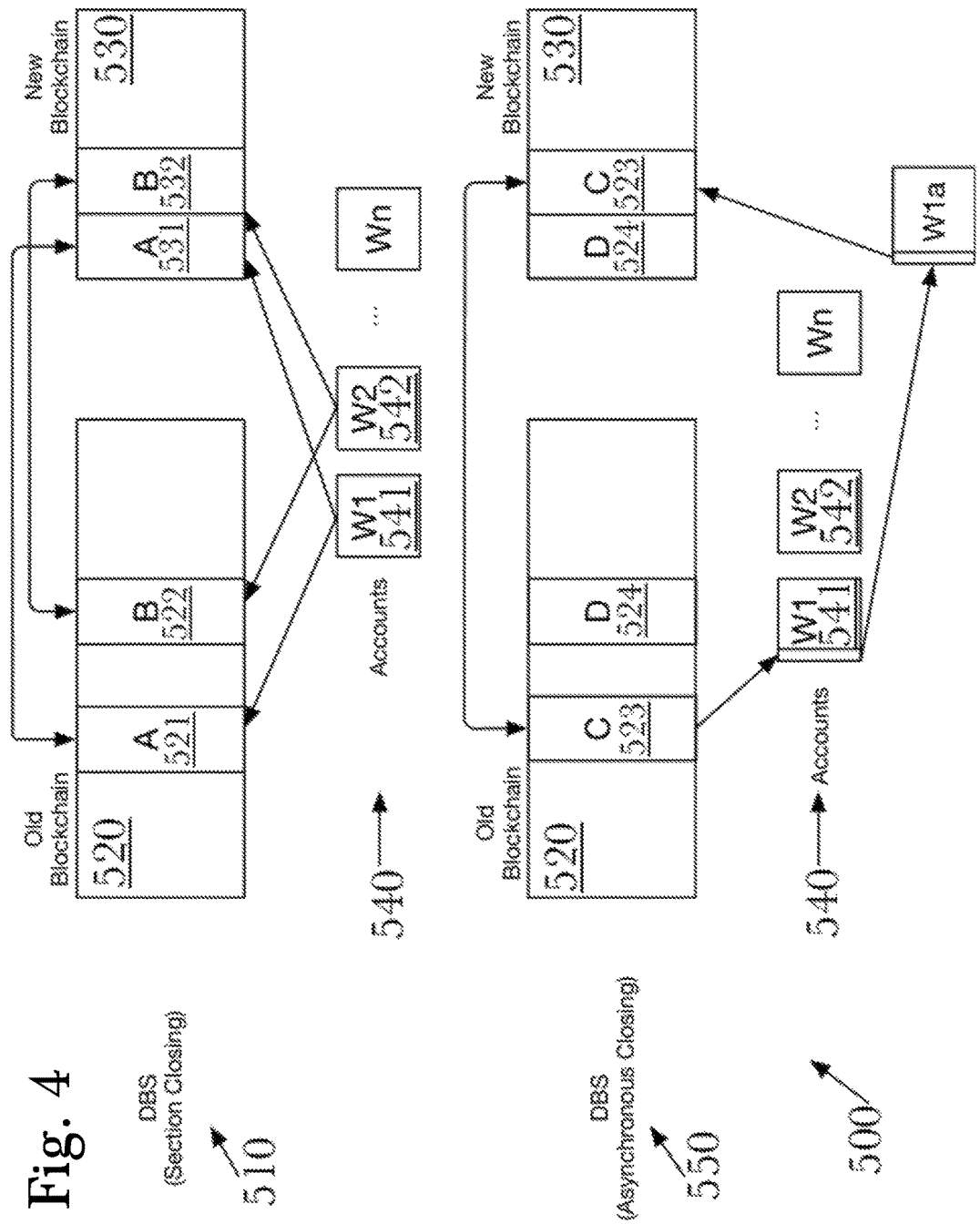
FIG. 4 is a diagram showing an exemplary technical improvement to blockchain databases: demarcated block sections.

FIG. 4 is a diagram showing an exemplary method for improvement to blockchain databases: demarcated block sections 500, in which account reconciliation may be used to retire or archive older portions of the blockchain, leaving a shorter blockchain as the active portion, and reducing latency times. In the section closing method 510 the old blockchain 520 is reconciled all at once, and the balances of each account 540 are moved to a new, shorter blockchain 530, and the old blockchain 520 is archived. For example, when the old blockchain 520 is reconciled, account balance A 521 associated with account W1 541 and account balance B 522 associated with account W2 542 are moved to the new blockchain 530 simultaneously as account balance A 531 and account balance B 532, and the old blockchain 520 is archived. In the asynchronous closing method 550, the old blockchain 520 is kept open, but archived. A new blockchain 530 is created, but account balances are not automatically transferred. Whenever an activity involves an entry in the old blockchain 520, that entry is consolidated and closed out, and is transferred to the new blockchain 530. For example, entry D 524 has already been accessed, closed out, and transferred to the new blockchain 530. When entry C 523 associated with account W1 541 is accessed in the old blockchain 520, it will be closed out and transferred to the new blockchain 530. In this manner, the old blockchain 520 will gradually be fully consolidated and closed out.

Figure 5:
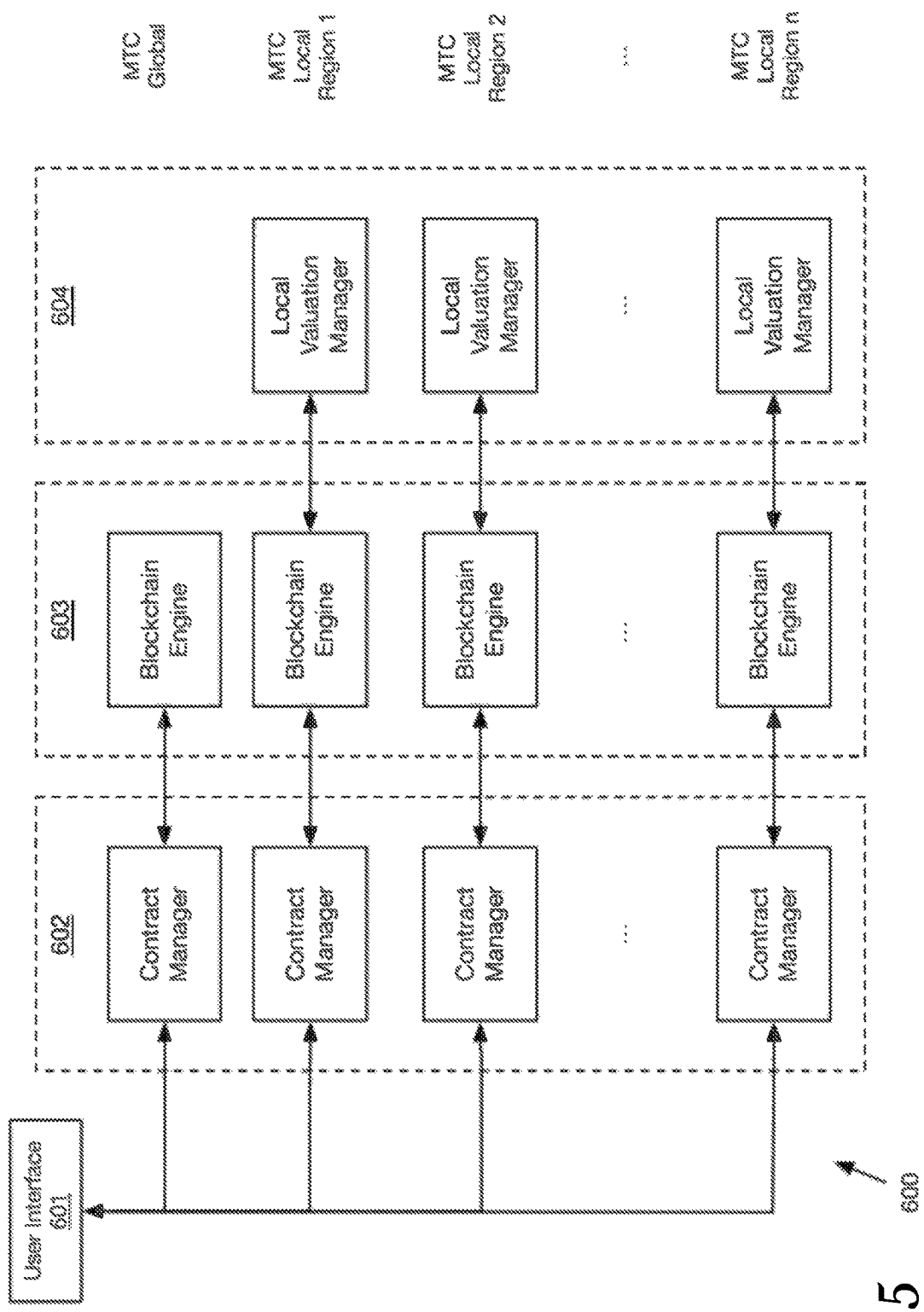
FIG. 5 shows an exemplary multi-tiered blockchain database software architecture overview, according to an aspect of the invention.

FIG. 5 shows an exemplary multi-tiered blockchain database software architecture overview, according to an aspect of the invention. The basic system 600 would comprise a plurality of user interfaces 601 through which users could manage their accounts, a series of contract managers 602, one for the global database, and one for each lower tier database, a series of blockchain engines 603, one for each database, and a series of local valuation managers 604 at the lower tiers only, which serve to fix the exchange rate of tokens within each region within the lower tier databases relative to another valuation in that region.

Two-Tier Coinage

Figure 6:
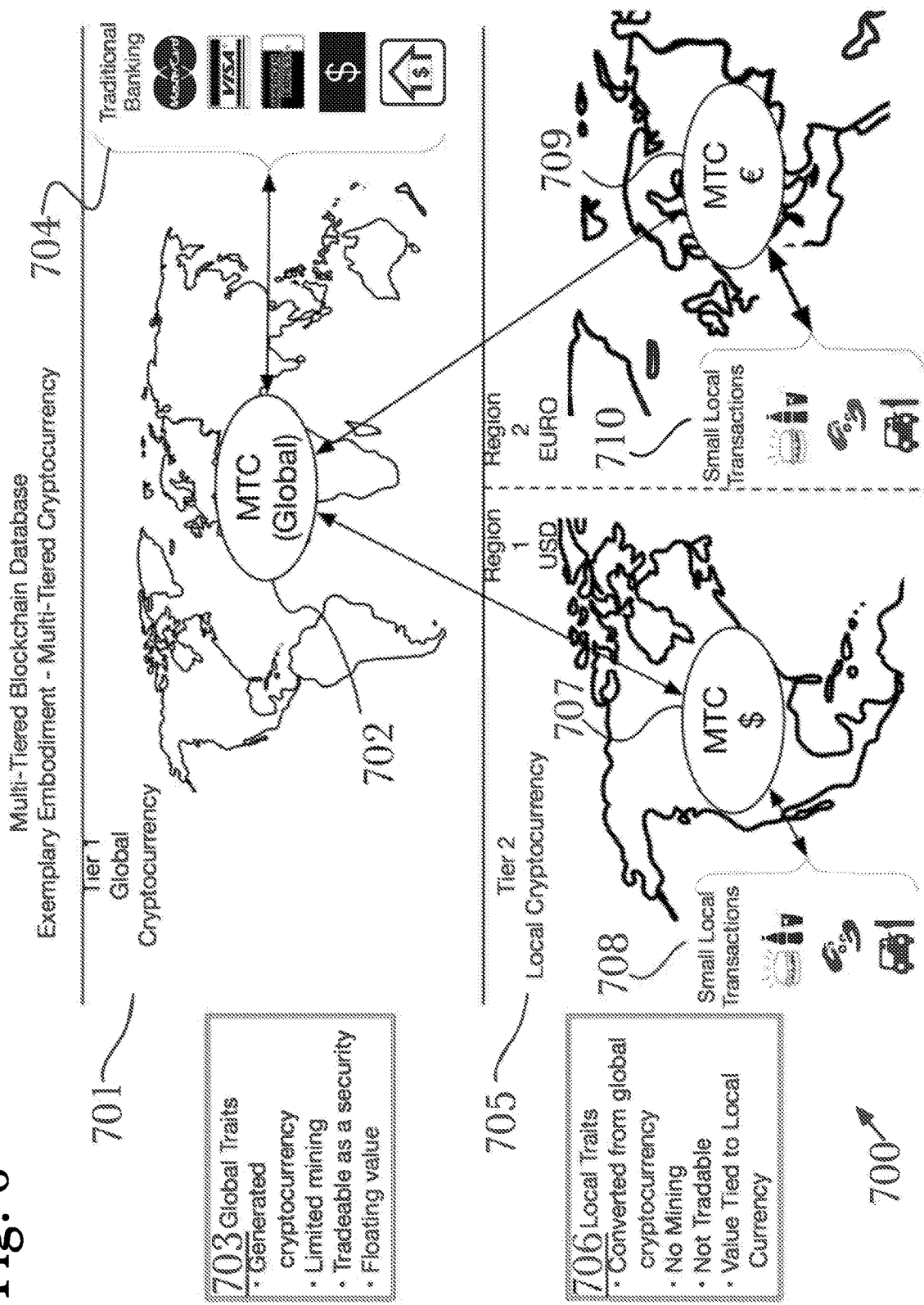
FIG. 6 shows an exemplary conceptual framework for a multi-tiered cryptocurrency.

FIG. 6 is a diagram showing an exemplary conceptual framework for a multi-tiered cryptocurrency 700. Tier 1 701 of the multi-tiered cryptocurrency would consist of a global cryptocurrency 702 with traits similar to existing cryptocurrencies 703 such as having currency generated over time, allowing mining, allowing the cryptocurrency to be traded as a security, and having a floating value. Other currencies could be exchanged for the global cryptocurrency through traditional banking means 704. Tier 2 705 would likely be regional or national in scope. The cryptocurrency at this tier would be converted from the global cryptocurrency 702, and would have traits different from existing cryptocurrencies 706 that facilitate small value transactions, such as no mining ability, not tradable as securities, and value tied to a local real currency. In one embodiment, one Tier 2 705 cryptocurrency could be restricted to use in the United States with the value tied to value the USD 707 with transactions limited in value and optimized for small local transactions such as fast food or gas purchases 708, while another Tier 2 705 tier cryptocurrency could be restricted to use in Europe with the value tied to the Euro 709, with transactions limited in value and optimized for small local transactions such as fast food or gas purchases 710. For clarity and simplicity, only two exemplary regions are shown, but there could well exist many more. The 1st or "top tier" coin 701 is a generated coin—there will only be a limited number ever minted. It is the primary vehicle for monetary exchange and these coins contain all of the value in the system, except what is contained in the locally-valued 2nd Tier coins 705. These 2nd Tier coins 705 are also generated and are created when money moves into a local currency and are "destroyed" or invalidated when the money exits the system to the 1st Tier 701 or is cashed out of the system. The 2nd Tier coin 705 is also backed by a local agency or bank to stabilize the value of the 2nd Tier country-specific currency. In order to incentivize the local agencies, they will be allowed (under strict guidelines) to hold a portion of the funds in 1st Tier coinage 701 or utilize a portion of the funds for other activities. They will also have the option of insuring the value of the currency tied to 2nd Tier coin 705 and charge a fee to the users for that insurance.

Fees and Revenue

Figure 7:
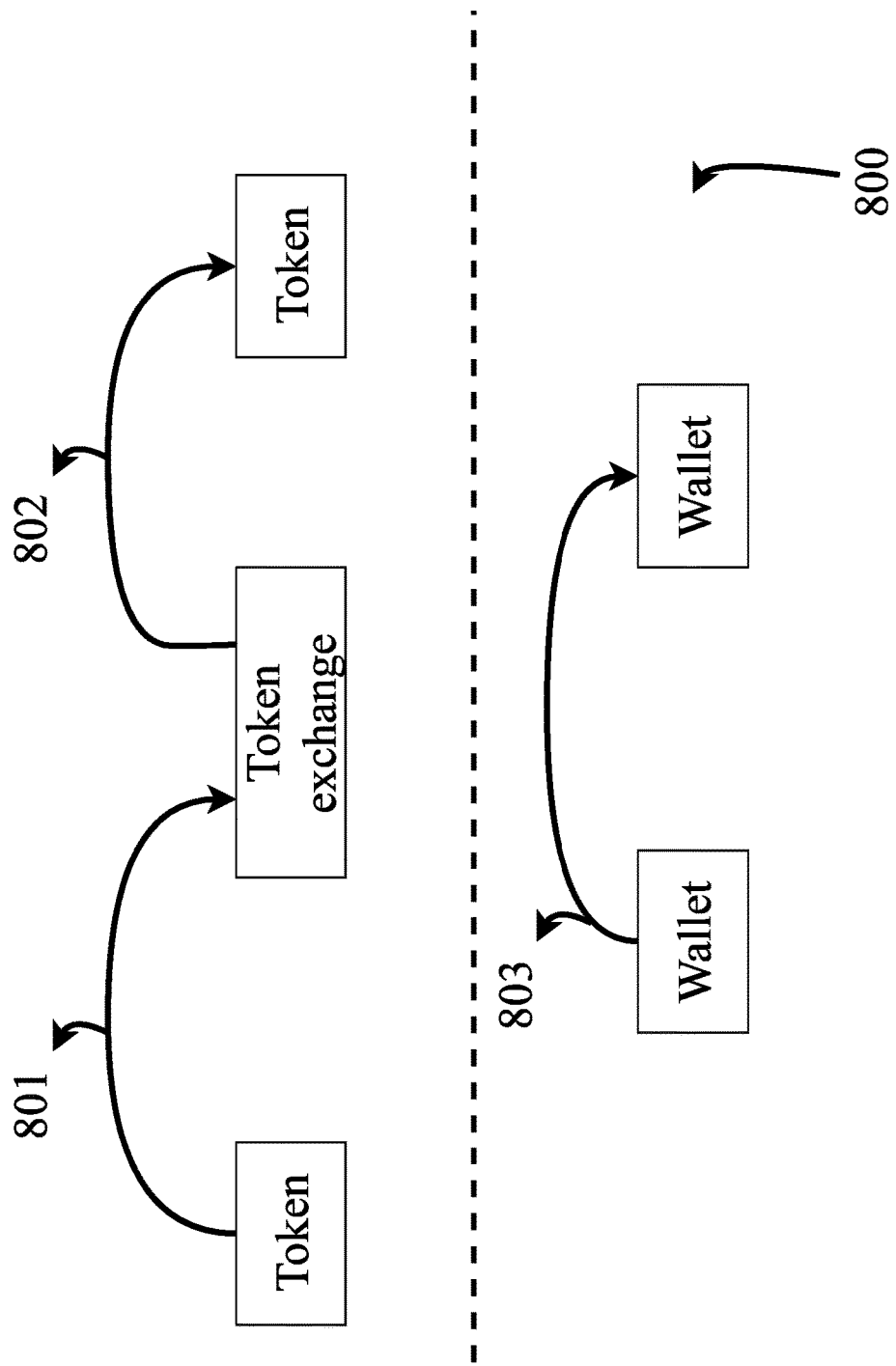
FIG. 7 is a flow diagram of an exemplary exchange process, according to an aspect.
Figure 8:
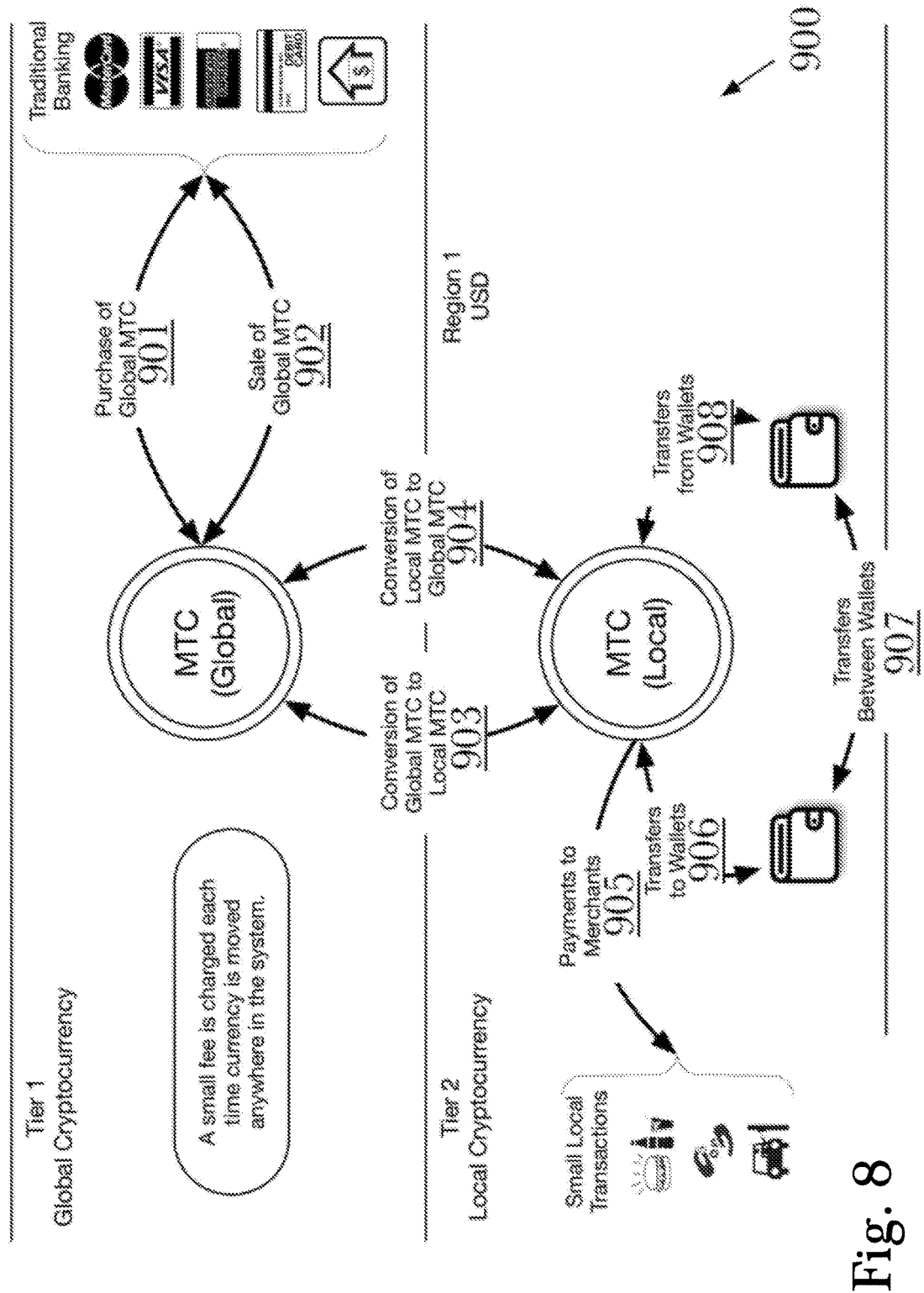
FIG. 8 is a diagram showing an exemplary fee and revenue structure for a multi-tiered cryptocurrency.

The present invention may charge a small fee every time a coin is moved. FIGS. 7 and 8 are an exchange flow diagrams 800, 900 indicating where fees may be charged. Referring to FIG. 7, fees may be incurred during purchase of 1st Tier coin 801, sale of 1st tier coin 802, and transferring funds from one wallet to another 803.

FIG. 8 is a diagram showing an exemplary fee and revenue structure 900 for a multi-tiered cryptocurrency. Operating revenue for the multi-tiered cryptocurrency would be provided by charging a small fee each time currency is moved anywhere in the system, including, for example, purchase of the global cryptocurrency 901 using traditional currencies, sale of the global cryptocurrency 902 back to traditional currencies, conversion of the global cryptocurrency to lower tier cryptocurrencies 903, conversion of a lower tier cryptocurrency back to the global cryptocurrency 904, payments to merchants using a lower tier cryptocurrency 905, transfers to wallets 906, transfers between wallets 907, and transfers from wallets 908.

Single-Use Cryptocurrency

Single-use coin in the 2nd Tier coins enables the control and tracking of currency in a public blockchain with no storage of value. These single use coins are created then destroyed after redemption, unlike classic cryptocurrency where coins have an infinite lifespan. They are also used for other one-time transactions or other applications where value is held on a one time basis or time-limited. For example, a company may provide "expiring cash offers", where a specific amount of currency is credited to a specific individual but expires at a specific time or because of a specific event. No equivalent of this function exists within current cryptocurrency solutions. Destruction of these coins via Smart Contracts and directly via the blockchain yields significantly enhanced security to this cryptocurrency solution.

Single-Use Cryptocurrency

To provide single-use cryptocurrency capability, the present invention includes an expanded address space so it is effectively infinite, which allows this functionality to work for hundreds of years without running out of capacity.

Figure 9:
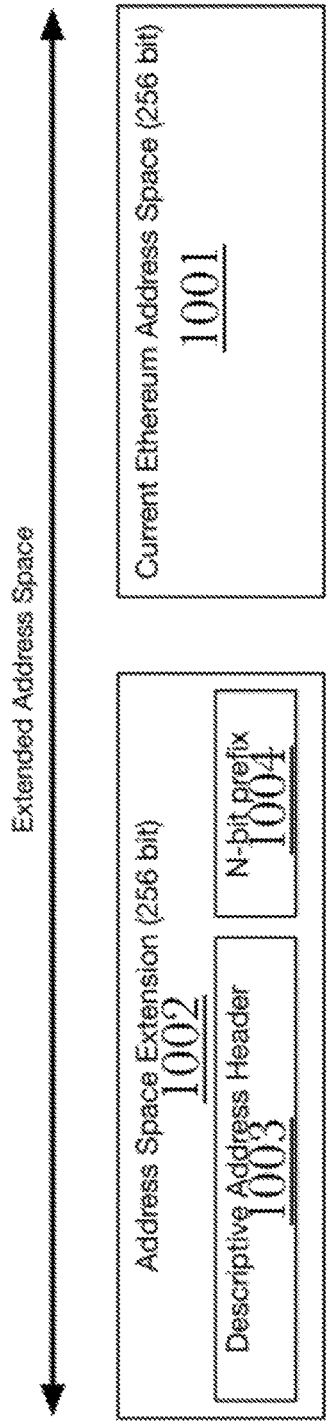
FIG. 9 is a diagram showing an exemplary technical improvement to blockchain databases: extended address space.

FIG. 9 is a diagram showing an exemplary technical improvement to blockchain databases: extended address space 1000. Current blockchains use a 256 bit address space 1001. While this is sufficient for existing blockchains with infinite token lifespan (e.g. Bitcoin, ETHEREUM®), 256 bits insufficient for use of single use token technology where the creation and destruction of each coin must be recorded. This would saturate the existing 256-bit address space, degrading performance and eventually rendering the blockchain and cryptocurrrency useless. The solution is to use an address space extension 1002, comprised of a descriptive address header 1003, and an n-bit prefix 1004, which effectively provides unlimited address space.

Leveraging Standardized Contracts

The present invention includes support for what is known as "Smart Contract" functionality, which may be found in core ETHEREUM®, but will also be released with a number of standardized contract to provide baseline support of some key functionality including coupons, timed escrow (pay after N days), key-based escrow, and other related functions.

Providing a set of standardized contracts will mitigate the problem of an exploding world of poorly-written Smart Contracts in the same way careful design and engineering is required to effectively use stored procedures in modern databases.

In-Transaction Messaging

The present invention includes support for carefully limited anonymous messaging in the block chain. It is used to send basic messages between both parties as well as messages to Smart Contracts. It exists only as a text field and cannot be executed directly. This is done in order to eliminate a potential security hole where links and code (such as JavaScript) can be incorporated in messages for nefarious purposes.

Wallet Integrations and Ease-of-Use

The present invention may integrate 1st Tier and 2nd Tier coin within many coin wallets, and included an enhanced wallet that allows coin value to be moved from 1st Tier and various denominations of 2nd Tier coins. In addition, the enhanced will allow users to see the value of their stored coinage in their native coin value or normalized to the wallet's default currency based on current market prices for coin.

Figure 14:
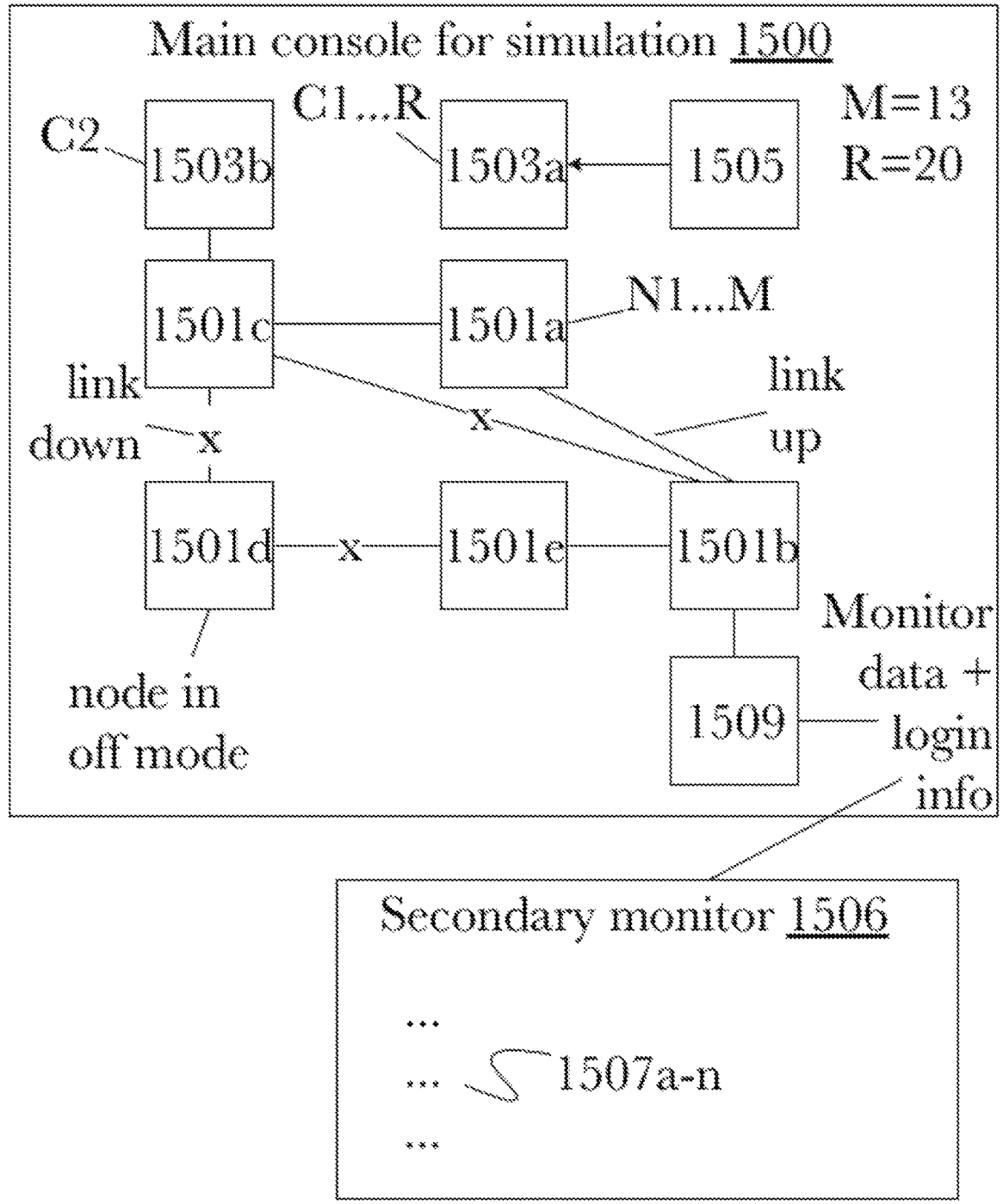
FIG. 14 shows an overview of an exemplary high-performance scalability test configuration, according to an aspect.

FIG. 14 shows an overview of an exemplary high-performance scalability test configuration, according to one aspect of the system and method disclosed herein. Typically, a cluster would run on a cloud system, for example Amazon Web Service (AWS), so the effort is minimal. By launching a command, all the instances are automatically created. Next, the user gets access to a control console, such as window 1500. There he can set the number of nodes 1501a N(m) by setting value M in the box B (top right)—the system then adjusts the number of nodes appearing on the screen accordingly. Value M is limited to a "reasonable, feasible" range (cost, performance) in this example. Also, the number of clients 1503a C(r)may, for a typical test, range from 5-13, but that number can be adjusted by changing value R in the box (top right) within a range beyond that. Each client 1503b adds a certain demand on the network, resulting in a system total transaction throughput that may be measured, for example, by a performance gauge (not shown here), which gauge could be like a speedometer showing millions of transactions per second (MTPS). If a node 1501d is taken off line by a user, or connections are shut off, clients on that node are moved to other nodes 1501e, 1501b to keep the system load the same. Users can mouse over a node such as, for example, node 1509 and see a panel with details, allowing a user or tester to shut down a node or turn it back on. The same approach may be applied for clients 1505 and links in the network, or nodes deeper in the network 1501c.

Further, while looking at details of a node, such as node 1509, a user can click a login information link and open a new window 1506 to see what is happening in detail inside the node, for example on the blockchain 1507a-n. An analogous approach for clients 1505 would result in multiple additional terminal windows.

Figure 15:
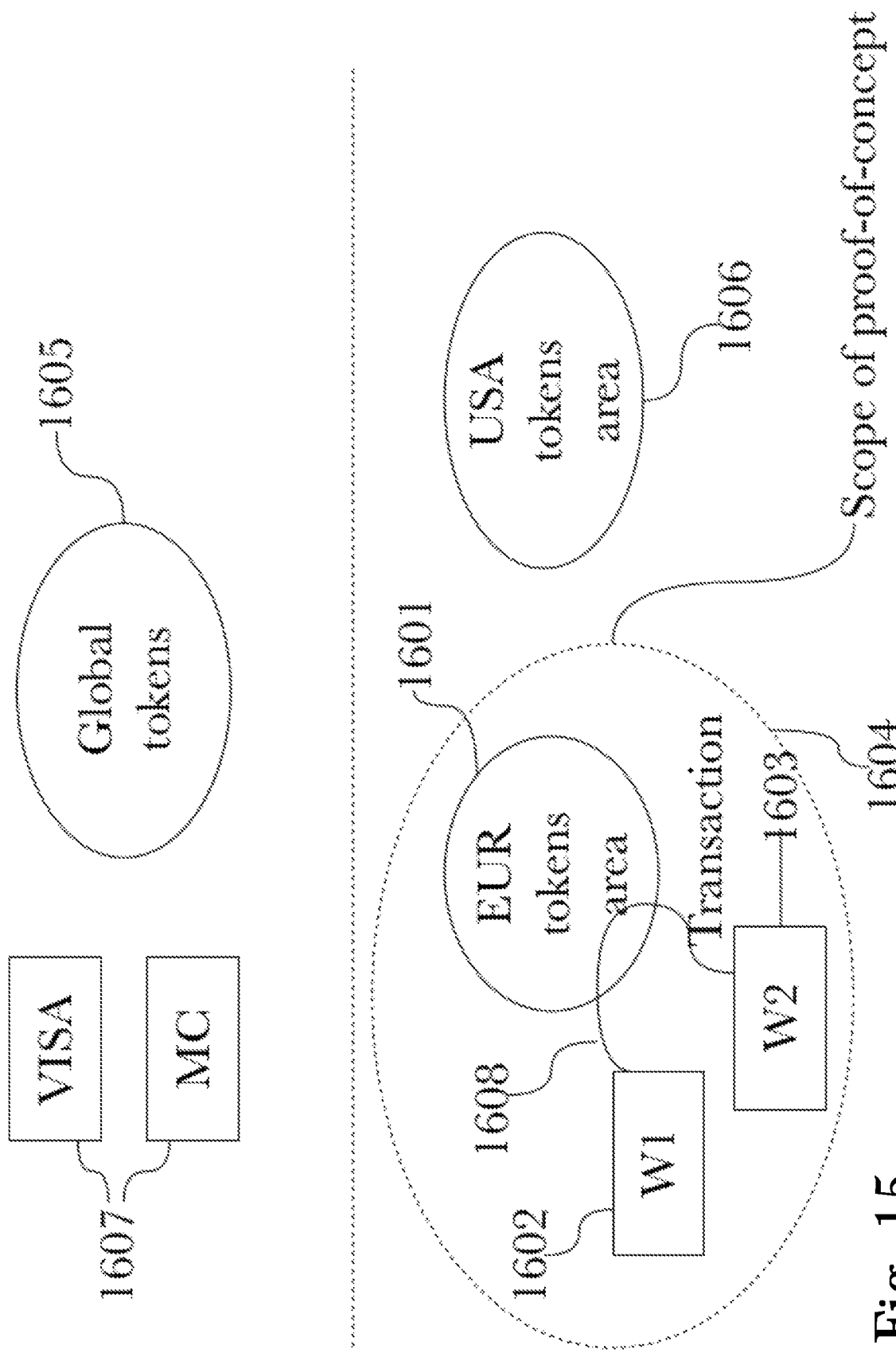
FIG. 15 shows an exemplary testing system, according to an aspect.

FIG. 15 shows an exemplary testing system 1600, according to one aspect of the system and method disclosed herein. System 1600, in this case, encompasses a single local token area 1601, using, in this example, Euro tokens 1604. Further, system 1600 is based on pre-generated accounts (wallets) W1 1602 and W2 1603, and is has a set of pre-generated transactions (not shown) to operate on. According to the article "Cryptocurrency Wallet Guide: A Step-By-Step Tutorial," at https://blockgeeks.com/guides/cryptocurrency-wallet-guide/, "A cryptocurrency wallet is a software program that stores private and public keys and interacts with various blockchain to enable users to send and receive digital currency and monitor their balance. If you want to use Bitcoin or any other cryptocurrency, you will need to have a digital wallet."

For the infrastructure and pre-generated datasets, there would be, for example, five nodes, at a minimum, in a private ETHEREUM®-based network in the AWS cloud. Pre-generated ad re-usable datasets could comprise 10,000 accounts (wallets), where each wallet holds a random number of tokens between 10 and 1000. In a simplified view such as FIG. 16, for example, several wallets such as, for example, exemplary wallets W1 1602 and W2 1603 are shown in a region 1601 that contains EUR type tokens 1604. The proof of scope concept border 1601 is limited to that area, and would, in this example, not include Global tokens 1605, USD tokens 1606 or other instrument tokens such as VISA or MC tokens 1607, etc. Wallet A (for example W1) could have N tokens. For each set of 1,000,000 transactions, the system would transfer N tokens from wallet A (W1) to wallet B W2 or similar via arrow 1608, but not amongst different token areas initially.

In the implementation phases, the goal for each phase is to measure performance. Performance may be defined as N transactions/seconds (TPS), with the TPS stable after M seconds.

In phase one of building such a system, a minimum five-node ETHEREUM® network is established on AWS. Then datasets are pregenerated in a database, such as, for example, Mongo database. Programs to generate accounts and wallets with tokens in ETHEREUM® and to pre-load transactions in ETHEREUM® queues without executing them are created. Transaction in out-of-box ETHEREUM® are executed, and performance is measured. The test run may be stopped after the TPS becomes stable. Then the test run and measurements are repeated using a 15-node ETHEREUM® network.

In phase two, users would decrease the ETHEREUM® block time to six seconds, run transactions, and measure performance. Testing would be repeated, decreasing the ETHEREUM® block time further, running transactions, and measuring performance, until we the minimum viable block time is established.

It is expected that Phase 1 and 2 should be completed in 2 weeks from start.

Phase three runs in parallel to phases one and two. In phase three, the crypto puzzle is replaced with alternative puzzles such as a trust puzzle that is much simple and faster, enabling the TPS to increase dramatically. Transactions are run in iterations, and performance is measured.

Phase four requires additional implementation of demarcated blockchains. Again, this phase runs in parallel to phases one and two. Transactions are run in iterations, and performance is measured.

Phase five comprises establishment of shared blockchains. Again, this phase runs in parallel to phases one, two, and three. Transactions are run in iterations, and performance is measured.

Figure 16:
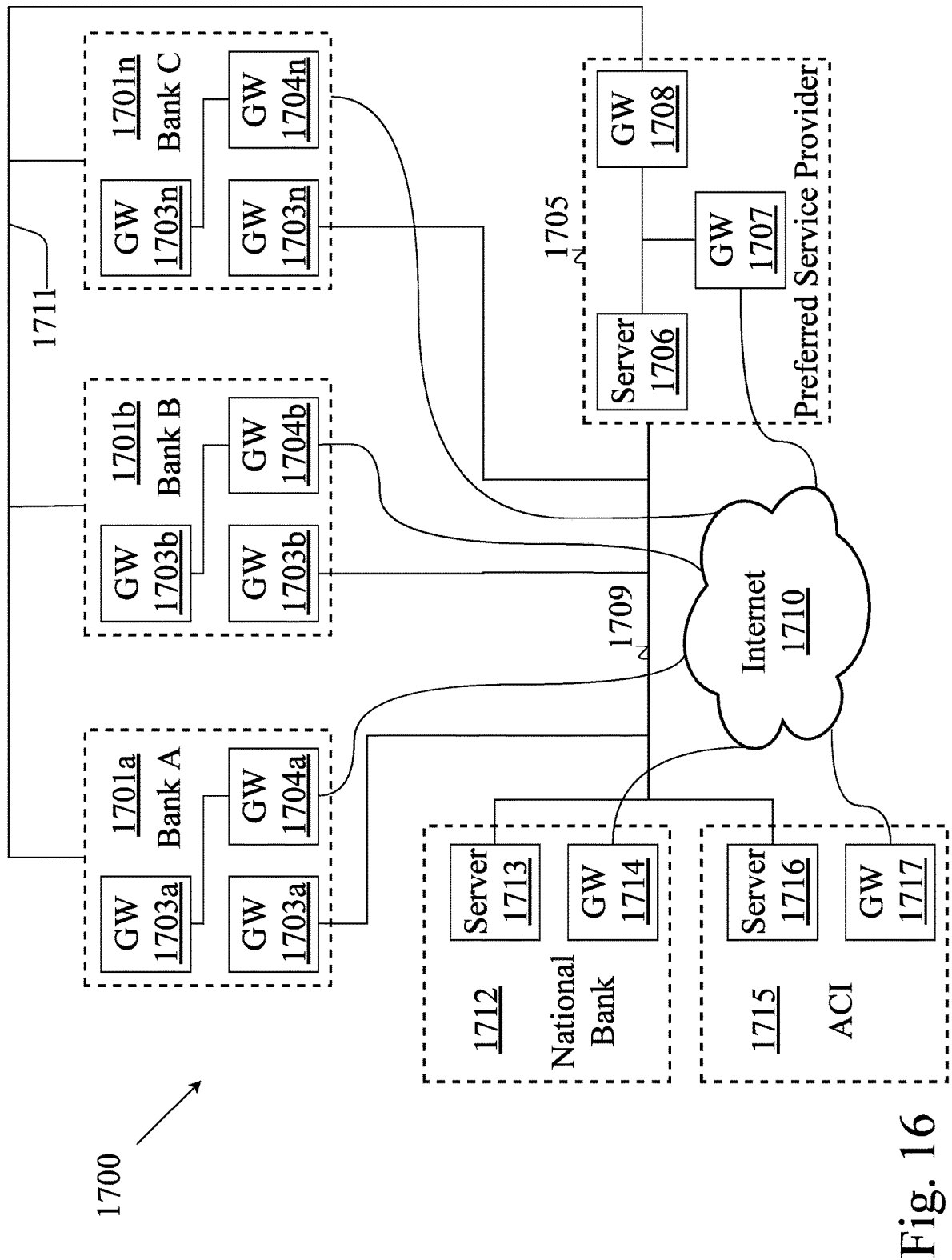
FIG. 16 shows a simplified version of an exemplary typical in-country network, according to an aspect.

FIG. 16 shows a simplified version of an exemplary typical in-country network 1700, according to one aspect of the system and method known to inventors. Network 1700 includes in-country (or regional) private blockchain network 1709, which is connected to multiple banks 1701a-n. Network 1709 may, in some cases, be a virtual network. It also shows an exemplary national bank (NB) 1712 (or regional lead bank), at least one (in some cases more) auditor company or institution (ACI) 1715, and a preferred system provider (PSP) 1705. In some cases, the owner of the master key can give different auditors different rights, such as limited-read only rights, limited sections, limited scope or time audits, etc. In the example shown in FIG. 17, each bank has at least one primary server 1702a-n. Similarly, PSP 1705 has server 1706, NB 1712 has server 1713, and ACI 1715 has server 1716. All these servers are connected to private blockchain network 1709. Gateways, such as 1717, 1714, and 1704a-n, connect to public Internet 1710, as does gateway 1707, which enables the general public to interact with the banks and auditor ACI. Not shown in detail are all the internal firewalls, backups, and additional servers that typically exist. Also, often a bank may have facilities in multiple locations, and in larger countries or regions banks may have multiple servers in different areas connected in separate locations to the network for redundancy (also not shown for simplicity). In some cases, the NB may not want initially to start to become active in the currency system, so the PSP may initially hold the master key for security of the network. In other cases, for legal reasons, the ACI may hold this key, as a legal, local entity. Once the NB feels comfortable taking on a leading role, it can request or legally demand the master key and house it on their servers henceforth. Additionally, upper network 1711 is for international transactions. It has separate gateways 1703a-n in each bank, as well as gateway 1708 for preferred provider 1705. In this example, national bank 1712 and auditor 1715 do not have a connection to upper network 1711, since they don't engage in international transactions on network 1711 for the upper level token. In other cases, they may participate as well.

Figure 17:
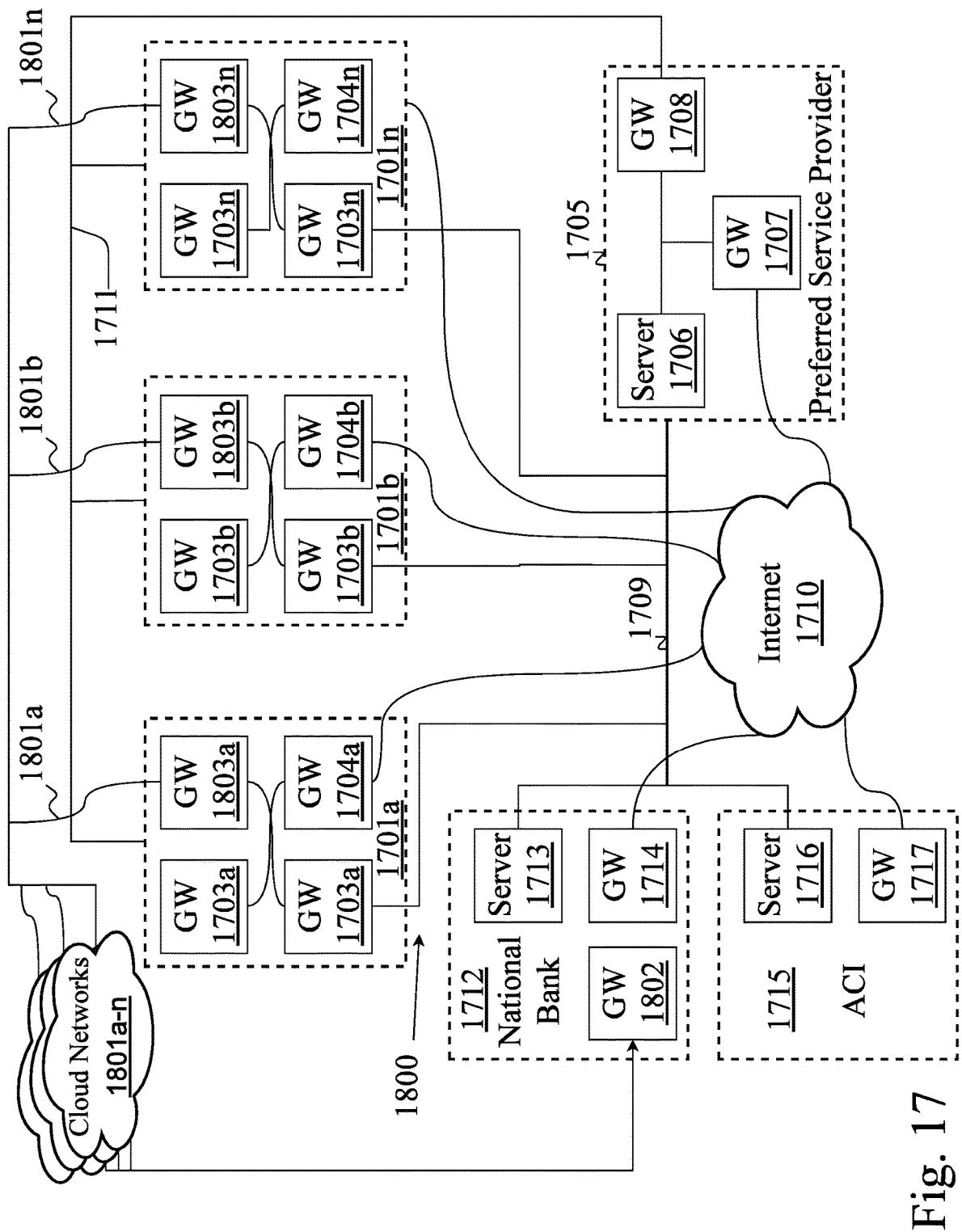
FIG. 17 shows an exemplary network, according to an aspect.

FIG. 17 shows an exemplary network 1800, according to one aspect of the system and method disclosed herein. In addition to the national and international networks shown in FIG. 17, described above, an exemplary classic network is present, comprising clouds 1801a-n, such as existing IBAN, ACH, SWIFT, and other existing international transfer networks for interbank transfers, both national and international, typically so called real time gross settlement (RTGS) networks. These RTGS networks 1804a-n can be integrated into such a system with gateways in each separate bank 1803a, 1803b, 1803n, including one gateway for a national or regional lead bank 1802, so they can complement the money flow.

Further, digital (token) wallets for this multi-bank retail blockchain (not shown) can enable, via API, integration of existing banking apps and wallet apps, so a user can operate all his accounts and transactions from one location.

Figure 18:
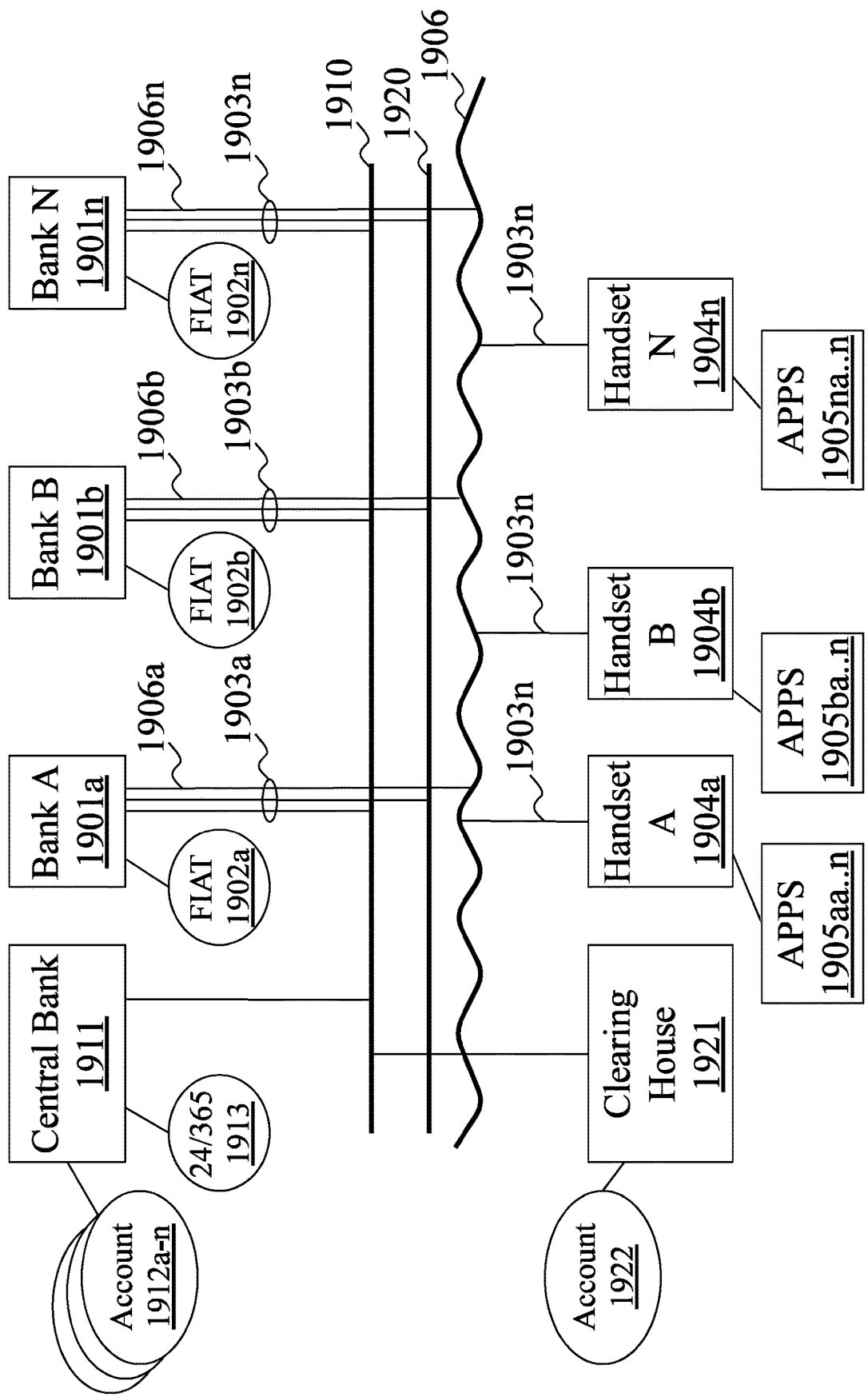
FIG. 18 shows an exemplary system connecting banks, customers, and clearing houses, according to an aspect.

FIG. 18 shows an exemplary system 1900 connecting banks, customers, and clearing houses, according to one aspect of the system and method disclosed herein. Banks 1901a through 1901n are connected to a Real Time Gross Settlement (RTGS) network 1910 that is connected, in this example, to central bank 1911 but other RTGS systems may also exist and may be connected to those and other banks. Central bank 1911 may have attached nostro/vostro accounts 1912a-n. Each bank may have a connection 1906a-n to blockchain 1906, to which may be attached to customer handsets 1904a through 1904n via connections 1903a through 1903n. Further, each handset may contain software 1905aa-n through 1905na-n. In this example, this software includes an operating system, other applications, and the application to operate the bank account on the blockchain, for the purpose of making transfers and other money-management operations.

As money is moved among various different banks on the blockchain, typically by users transacting on the above-mentioned handsets acting as mobile wallets, money between the FIAT pools 1902a through 1902n needs to be moved between banks periodically to reflect the motion of tokens on the blockchain, either because the difference between tokens and FIAT between banks has grown too large, during or at the end of the day. Such moves are typically done through the RTGS network 1910. However, currently in the United States, the federal reserve shuts down such activities at night, during the weekend, and on holidays. In many other countries RTGS systems shut down in similar manner as in the United States. Thus, during such periods of enforced inactivity, a large imbalance may occur, and there is even the theoretical possibility of a bank becoming illiquid because more money has gone out than the bank owns. As an alternative solution, central bank 1911 may keep an account, such as account 1913, open at all times, 24/7/365, as well as operate at least part of RTGS 1910 accordingly. Or, if the bank is unwilling to operate around the clock, the central bank may hold the FIAT money in accounts such as account 1913, during hours of inactivity, and update the FIAT pools correctly at the next instance of activity based on the status reported from blockchain. Alternatively, at least one clearing house, such as clearing house 1921 (only one shown), may keep a special account, such as account 1922 (only one shown), open during the hours when banks are not open, that is, nights, weekends, holidays, or as a normal transaction vehicle for FIAT transactions among banks. In that case, banks would transfer, for example, all their balances every 10 or 15 minutes, or even every 5 minutes, depending on their volume, frequency of transactions, imbalances, and other triggers as desired or required, into or from the clearing house. Thus the clearing house plays the role of a trusted third party, similar to the central bank, as the clearing house has relationships 1920 with most, if not all, banks, and is a trusted, licensed player in the banking system. A clearing house can take over this role easily, and most clearing houses today operate 24/7/365, because they have this transaction capability for the stock exchanges. Hence, they can offer, for a small fee, to do FIAT transactions for the banks. These transactions can be done in a single account or they could be done as subaccounts for each bank, in which case the clearing could happen locally. Thus, the balances could be always reflected correctly, 24/7, and FIAT balances could be operated correctly, no matter whether the central bank is available or not. In places where there is no central bank and no clearing houses, a third party could be used to provide clearing bank services. In some cases, these FIAT transactions could be operated over the blockchain network rather than over the regular RTGS network.

In some cases, banks linked in a private network, which in some cases may be a virtual private network, may participate in transactions made on behalf of their retail customers on a retail-oriented blockchain. In addition, a supervisory bank or agency may participate in this private network, so that in certain cases this supervisory party may exert its supervisory power under a contractual agreement. These banks may also participate in a second private network for blockchain transactions, which network may be used for interbank and international transactions. Furthermore, a preferred Internet provider may be connected to the banks' private network. This provider may hold the master security certificate for operating the private network, or it may transfer the master security certificate to the supervisory bank or agency, thus making the recipient of the master certificate the future provider of the master security certificate. In other cases, a non-transacting auditor may also be connected to the private network. The holder of the master key may be located in the private network, linked with its own computing device on the blockchain, enabling auditors to have various levels of access rights, including but not limited to section-limited, read-only limited, time- or time-period limited, etc. access to the blockchain via certificate and network access for audit and review purposes under a contractual agreement.

In a system where payments are done using tokens representing a currency, these tokens may be transacted on a blockchain and sometimes moved among banks, possibly resulting in an imbalance of bank FIAT accounts. In such cases, from time to time one or more banks may require a transfer on an RTGS system to correct a such an imbalance. In those cases where said RTGS system is not available during hours of non-operation, banks may move the RTGS transfer to a clearing house that is operational non-stop without any breaks, thus enabling settlements at any time of any day of the year. In some cases, to avoid complicated transfers of operations, such operations may always run via a clearing house. Further, the transfers to the clearing house are operated using the block chain network, to avoid any limitation of the RTGS time of operation. Additionally, should a particular bank's available balance on its FIAT account drop below a preset threshold, either the central bank or another pre-agreed partner will automatically launch an infusion of additional FIAT funds into the bank's account to maintain sufficient liquidity. Alternatively, rather than depending on a preset threshold, an AI system may be used to calculate the level upon which such an infusion is made, and also to calculate the required size of the infusion to stabilize the bank. In all such cases, one or more persons or institutions are notified at or shortly before such an event.

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

Figure 19:
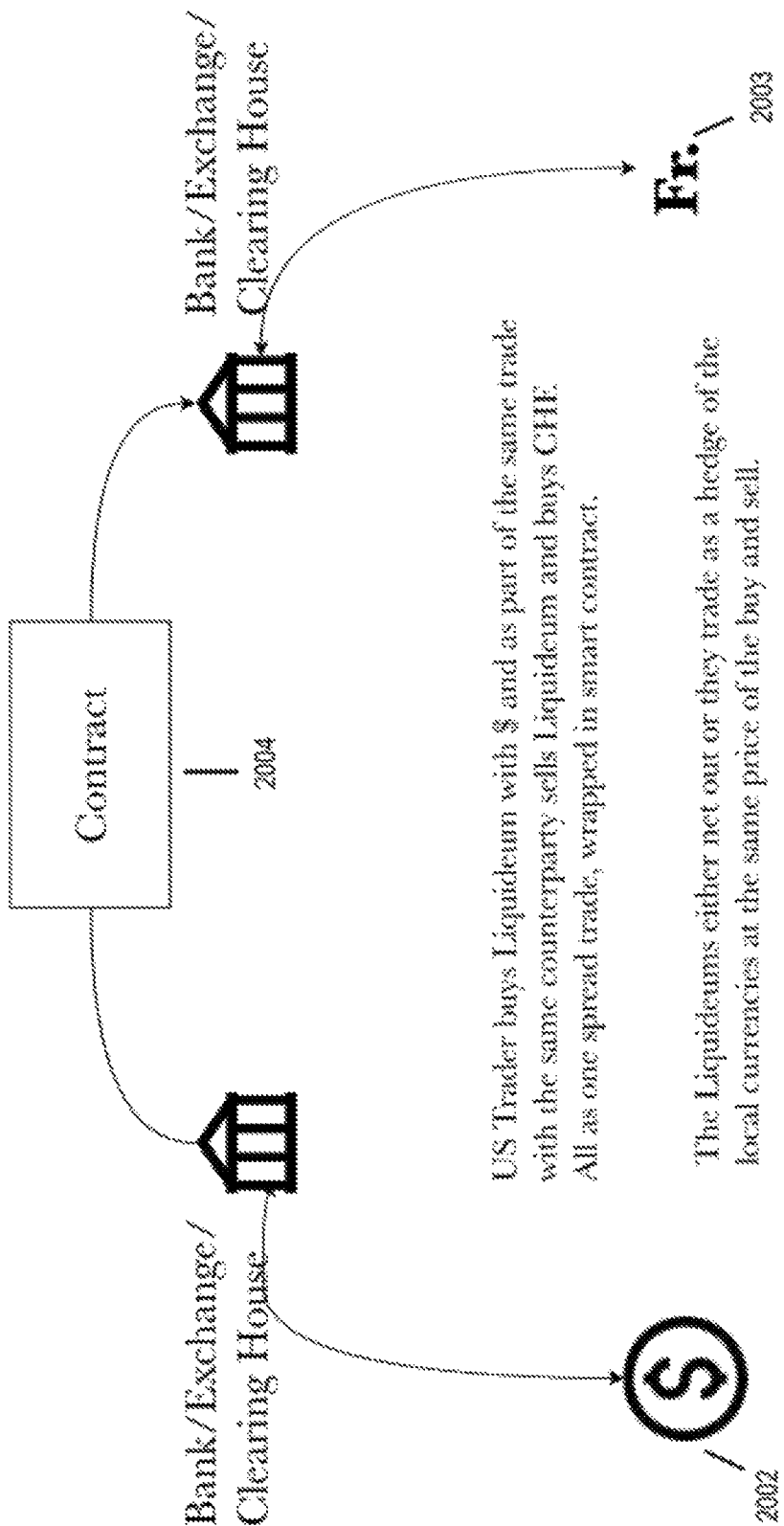
FIG. 19 shows an exemplary overview of a transaction according to the novel approach.

Referring generally to FIG. 19, in which an enhanced system and method of conducting international trading transactions is shown and comparing to the example described in the Background section, a new example analogous to example 1 will illustrate the benefits of a novel aspect. In this case, the issue is trading spot US$ and Liquineq Global tokens (LG; note this is exemplary, and other crypto tokens could be traded according to the aspect) to euros (€), as a spread with only 1 bid/ask:

1—Trader A 2001 sells US$ 2002 and buys L-US$ 2004 1 to 1 no bid/ask crossed

2&3—Trader A Sells L-US$ & buys LG 2003 and as part of the same trade with the same counterparty sells LG and buys L-euro (L€), all as one spread trade.

In the example, The LGs either net out as they trade, or they act as a hedge of the L currencies at the same price for the buy and sell. Any "know your customer" (KYC) or other regulatory certificates are added as necessary into the transaction.

In those cases where there are regulatory issues with the LGs needing to be actually transferred rather than netted, traders would need to inventory a small amount of LG to facilitate these spread trades.

In this system for transacting multiple payment tokens on a blockchain, it has at least one processor, but typically many more, often in the cloud, or in different location for redundancy and security. Application software running on that system (meaning on at least one of the processors) allows one to perform the steps of a transaction consisting of listing a first trader buying an intermediary token with a first currency with the intent to buy a second currency, finding at least one second trader willing to sell a matching amount of said second currency sought by first trader against said intermediary token, and once a price has been agreed upon, a transaction is closed. Further, in some cases, the step of the intermediary token is explicit. Furthermore, in other cases the step of the intermediary token is eliminated after the regulatory needs have been met. In yet other cases after the transaction closes the intermediary token in immediately re-used in a new transaction thereafter.

Figure 20:
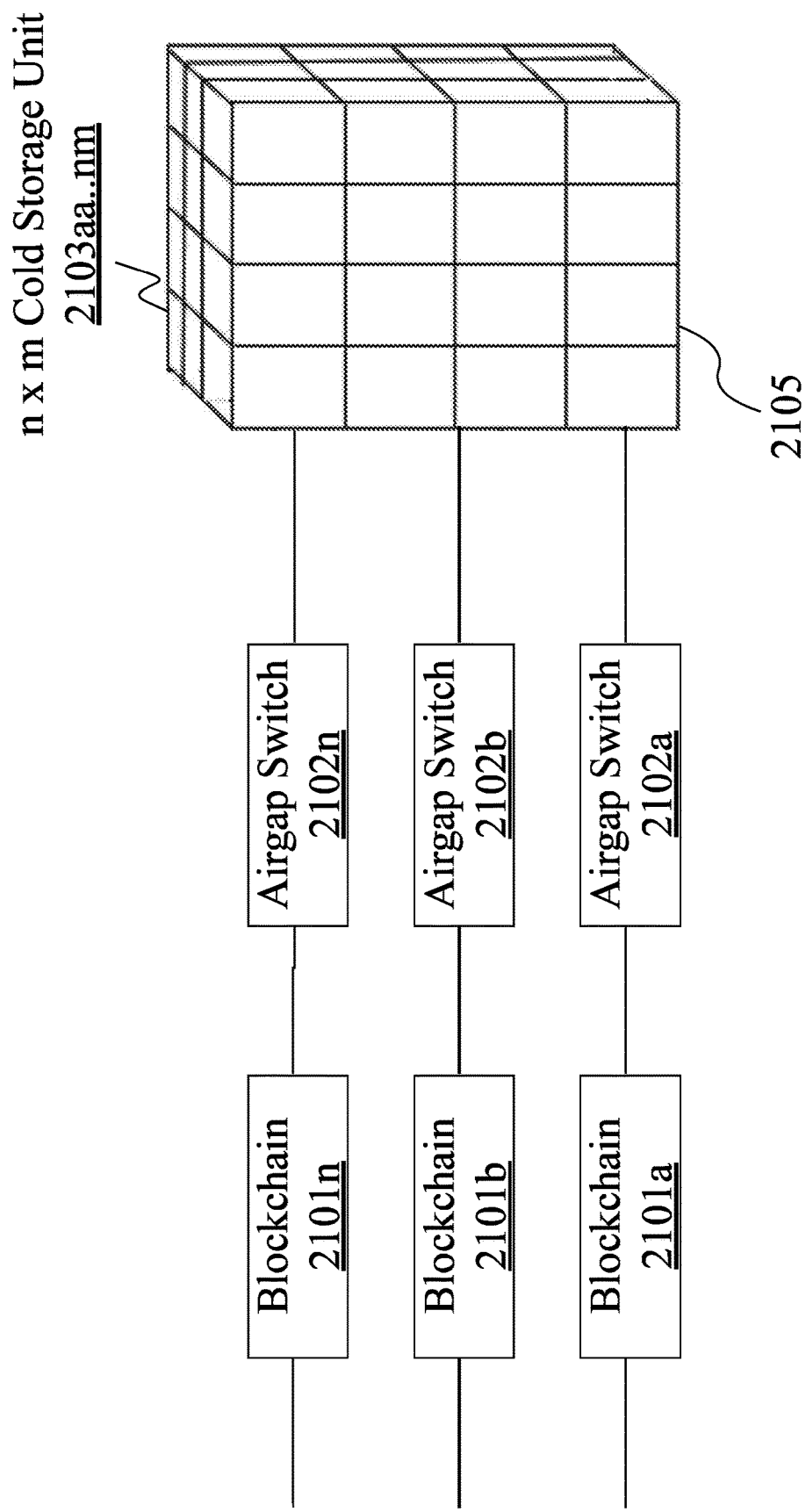
FIG. 20 shows a simplified diagram of a more traditional type cold storage facility or bank that can be used to store crypto currencies to make quick raids more difficult.

FIG. 20 shows a simplified diagram of a cold storage facility or bank that can be used to store crypto currencies to make quick raids more difficult, according to an aspect. According to the aspect, 2101a . . . n are at least one, often many un-permissioned blockchains of the different cryptocurrencies; 2102a . . . n for example are airgap switches with buffers (other equivalent systems and methods of insulation can be used), that can be used to allow selectively content from a wallet to be transferred via a buffer into cold storage unit 2103aa . . . nn, which has many addressable compartments at least one for each customer 2105.

Figure 21:
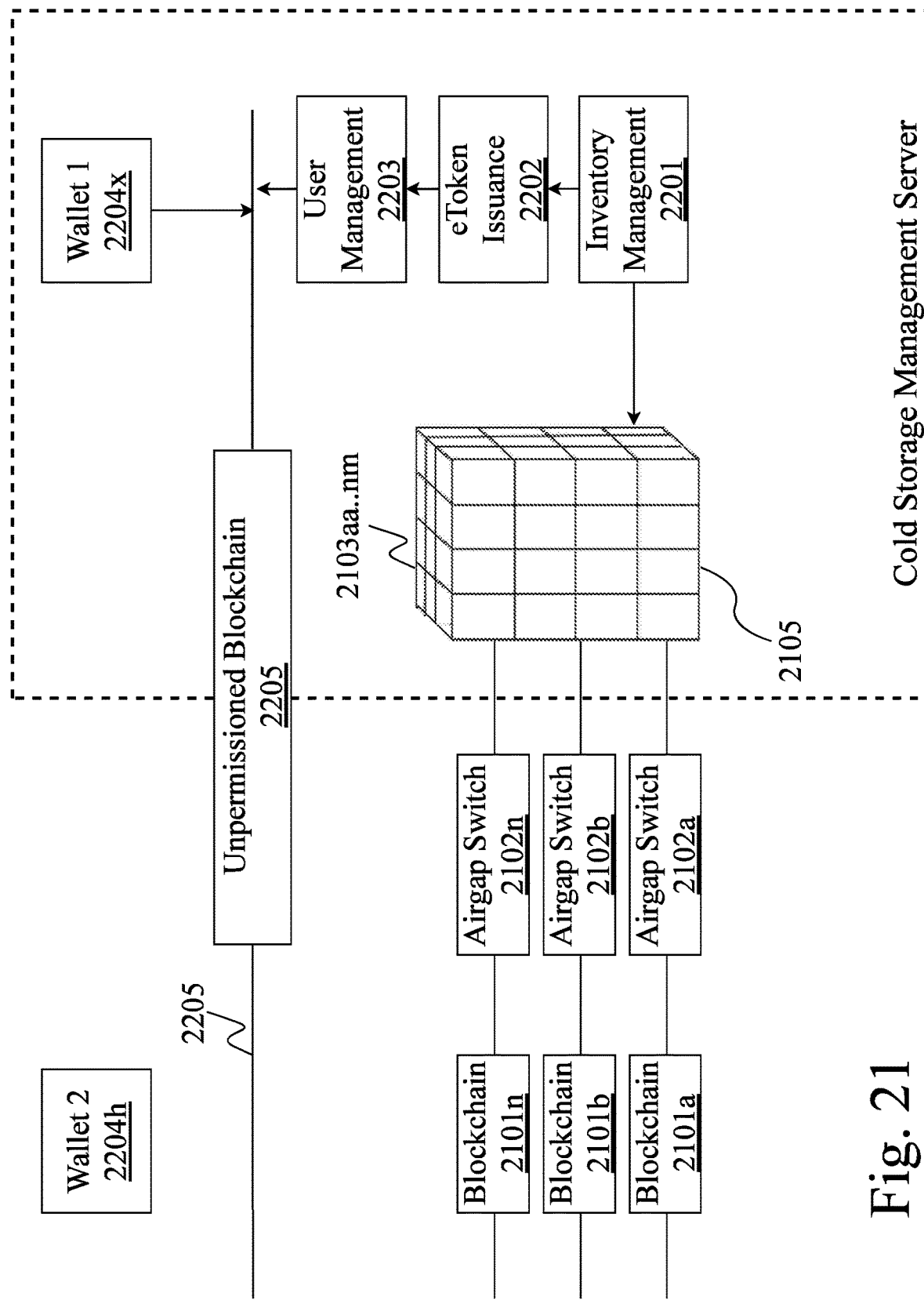
FIG. 21 shows a simplified diagram of a novel approach how to enable usage while crypto currencies are in cold storage.

FIG. 21 shows a simplified diagram of a novel approach how to enable usage while crypto currencies are in cold storage, according to an embodiment. It shows an inventory management section 2201, which helps review and manage the content of cold storage 2103aa . . . nn. That information can be used by eToken issuance section 2202 to issue for those cryptocoins that the users have allowed eTokens, that can be used for all practical purposes like real cryptocurrencies, but much faster and more securely. To do that, user management section 2203 allows those tokens to be sent to the correct user wallets such as exemplary user wallet 2204x, which shares connection to the unpermissioned blockchain 2205 along with possible other wallets 2204h and allows them to be used like regular eMoney in real time, with fast settlement; but, rather than being backed by fiat money, this one is back by cryptocurrency. After the transactions are completed, the cryptos can be settled cold storage to cold storage, without putting the real cryptos at any peril or delays for settlement.

Figure 22:
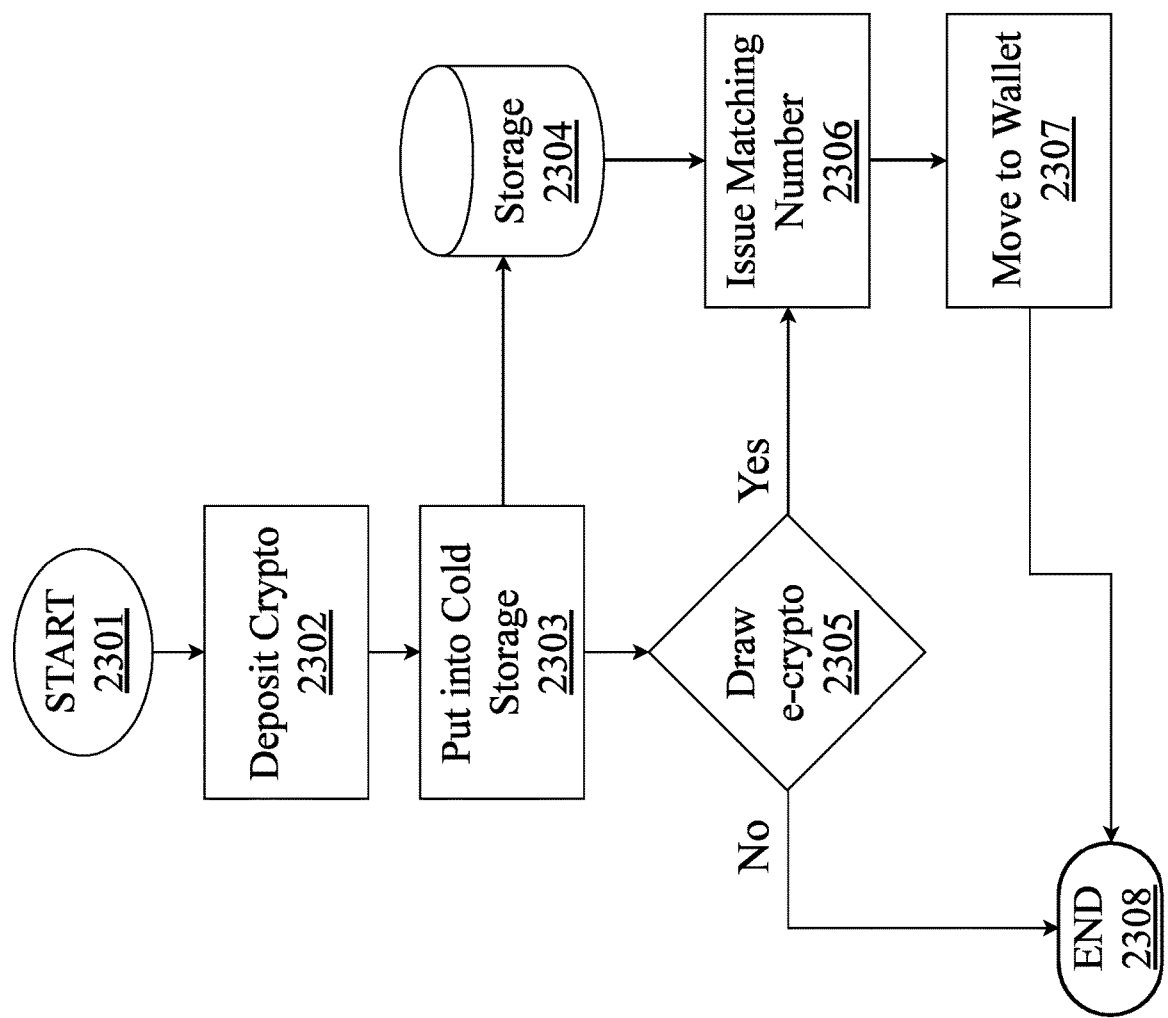
FIG. 22 shows a simplified diagram of a software used to take cryptos into a novel type cold storage that allows for continued use of stored crypto currencies.

FIG. 22 shows a simplified diagram of a software used to take cryptos into a novel type cold storage that allows for continued use of stored crypto currencies. After initiating the process 2301, as part of a first operational step 2302 the wallet is selected from which the crypto is deposited. In step 2303 the process of passing through the airgap switch into cold storage is performed, and the information is noted in general storage 2304, which is part of inventory management 2201 described earlier. The user now can choose if to just store (draw e-crypto) in step 2305 (no) or use e-crypto (yes). In first case the flow continues to 2308 to end. In latter case it continues to 2306 to issue a matching number of e-cryptos (or in some cases only partial amount). In step 2307 those cryptos are then moved via user management 2203 to the users wallet. It then ends in step 2308.

Once the user spends his e-cryptos, full or fractional crypto tokens are settled via the non-permissioned blockchains with the respective parties. Since the user had to use his more secure wallet, only authorized transactions will be enabled and cleared.

Figure 25:
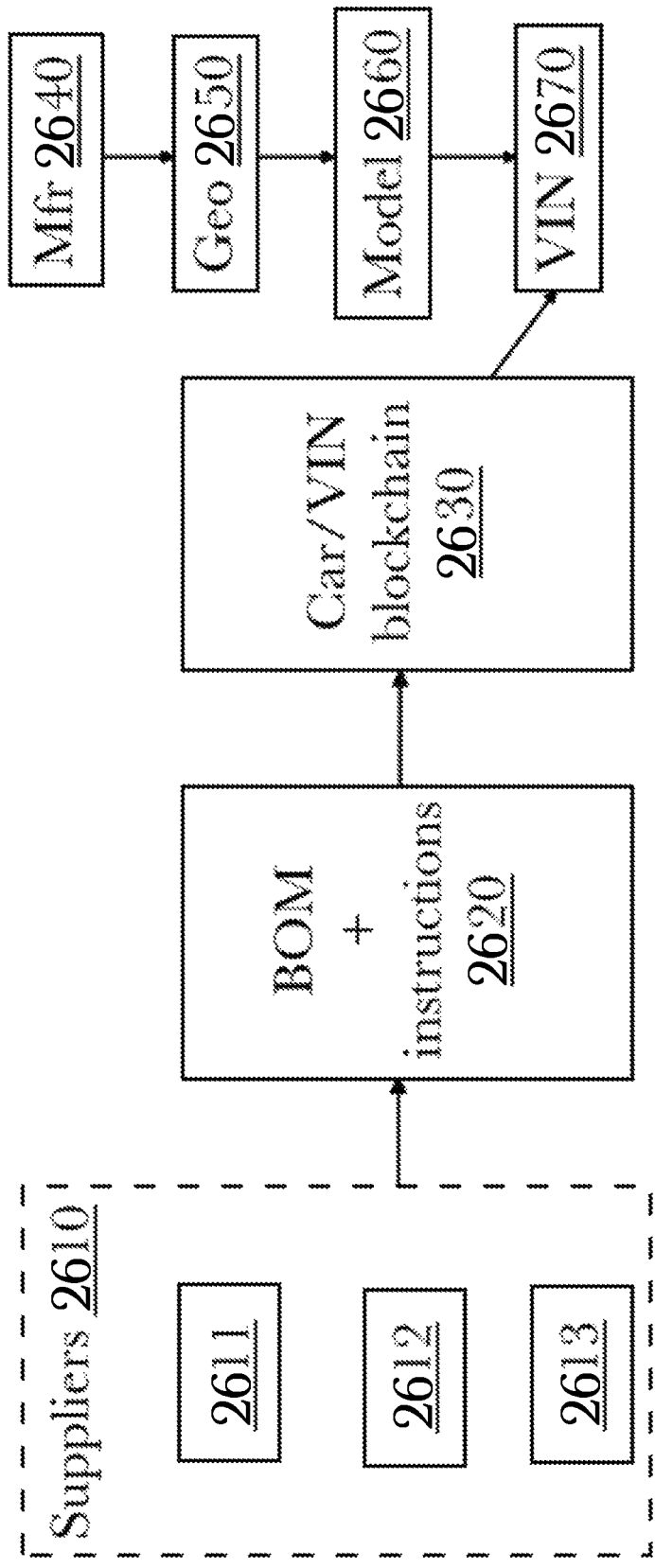
FIG. 25 is a diagram illustrating an automotive inventory management and recordkeeping process flow for car manufacturing.

FIG. 25 is a diagram illustrating an automotive inventory management and recordkeeping process flow for car manufacturing. During manufacture of an automobile by any of a number of suppliers 2610, either by a single supplier or by a plurality of such suppliers 2611, 2612, 2613, each partial software revision is assigned a unique token by BOM 2620. These tokens, representing the parts, processes, and entities involved in the vehicle's production, are logged to a blockchain 2630 that may contain tens of thousands of items to adequately document the vehicle's record in an immutable wallet. This blockchain is then associated with the vehicle's assigned vehicle identification number (VIN) 2670, which incorporated the vehicle's manufacturer 2640, geographical 2650, and model 2660 information into an encoded string. This produces a uniquely-identifiable VIN for each vehicle that is now paired with a unique blockchain that describes the vehicle's manufacture in detail and cannot be altered, which provides the basis for a number of blockchain-based new methods such as for validating and recording vehicle repairs or maintenance (as described below, in FIG. 26).

Conceptual Architecture

Figure 26:
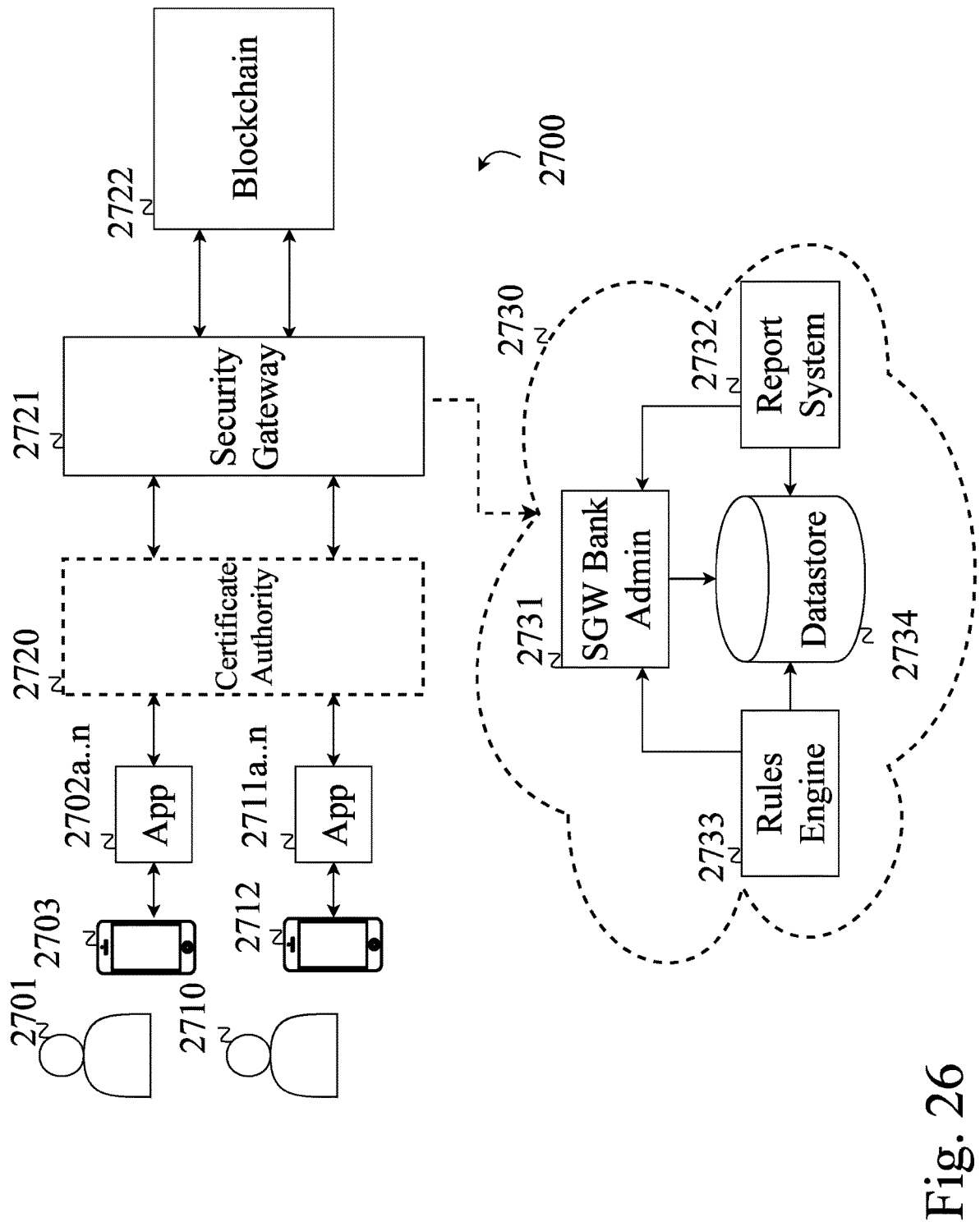
FIG. 26 is a system diagram illustrating an overview of an exemplary security gateway integration schema.

FIG. 26 is a system diagram illustrating an overview of an exemplary security gateway ("SGW") integration schema. This integration schema may be between a user and for example, one or a plurality or combination of banks, insurance companies, utilities companies, governments, or other public or private institutions, to name just few examples of possible organizations which may be involved in the interaction with a user. In an exemplary overview 2700, user 2701 may wish to access information from an organization or organization manager 2710, but must first request access to the organization's information via blockchain 2722 (the main data store for all money transfers), going through a possible plurality of steps and services such as a certificate authority 2720 and security gateway 2721 rather than directly accessing the blockchain network 2722. Alternative arrangements of such elements or the addition of further elements to increase security and scrutiny in the system may be possible, and this exemplary overview is not limiting on the number of other elements which may be present in an overall completed system of this type.

A user 2701 and exemplary organization or organization manager 2710 may use their applications 2702a . . . n and 2711a . . . n, which may be singular applications designed to interface with such a firewalled blockchain network, or may be a plurality of applications for this purpose, to request and send information on their devices 2703 and 2712, respectively. These devices 2703, 2712 may be mobile cellular devices, personal digital assistants ("PDA"), laptop or desktop or other personal computing devices, tablets, or other computing devices capable of operating applications and communicating over a network. User application 2702a . . . n may be a web application such as a browser-enabled application, or an application from an application marketplace such as those on modern smartphones including ANDROID™ and IPHONE™ devices, which allows the user to have several accounts in different organizations/currencies, stores money, and sends transactions to other accounts. Organization manager application 2711a . . . n may be a web application such as a browser-enabled application, or an application from an application marketplace such as those on modern smartphones including ANDROID™ and IPHONE™ devices, which acts as an interface for the organization's SGW.

In a potential first step, a user application 2702a . . . n may request a digital certificate from a certificate authority ("CA") service 2720, which is a separate container responsible for basic security and identity verification, such as for example the hypertext transfer protocol secure ("HTTPS"). A user application 2702a . . . n may then send an access request to SGW 2721, a separate container which manages the organization's business rules, users, data access, and transactions; and provides local cache mechanisms. After the SGW 2721 validates the application parameters and checks access, user application or applications 2702a . . . n may access blockchain 2722 (the main data store for all money transfers). Blockchain 2722 then sends a success response back to user application 2702a . . . n via SGW 2721.

Such communications may take place with communications protocols over networks including the Internet or a PSTN using dial-tones. User 2702a . . . n and organization manager applications 2711a . . . n can only access the SGW, and only the SGW 2721 can access the blockchain. This restricted access is critical because it creates the firewall.

SGW 2721 may contain at least four elements 2730 including a rules engine 2733 which may inspect requests to make sure requests comply with a set of rules, allowing only select, compliant requests to be passed on to the blockchain. Further, an SGW may include an organization admin 2731 or generic admin module, a report system 2732, and local database (DB) 2734. In this example the datastore 2734 may contain only one organization's data, for instance data pertaining to the users and rulesets for a particular bank's operation. An organizational administration module 2731 may allow qualifying administrators in the system, as specified in the local database 2734, to make changes to the system as required of administrators, including potentially adding other administrators or changing the rules encompassed in the rules engine 2733, or viewing and acting on reports from the report system 2732 which may include reports on unauthorized access attempts, or even a log of authorized SGW usage. However, a database 2734, rules engine 2733, and a security gateway 2721 could potentially be configured to operate for multiple organizations or groups or administrators (or some combination thereof), allowing a centralized system to operate as a blockchain firewall for multiple organizations and users rather than only one.

In addition to deciding whether or not a user application request may continue on to the blockchain, the SGW in this example may manage users at least by creating new accounts, setting account balances, managing rules by checking black and white lists, processing the accounts' limitations, managing data access which guarantees that the user can see only his/her transactions and the organization can manage only its own users, managing transactions which guarantees that the user's transitions are atomic, and provides local cache mechanisms to ensure fast searching and provide rules management.

Figure 27:
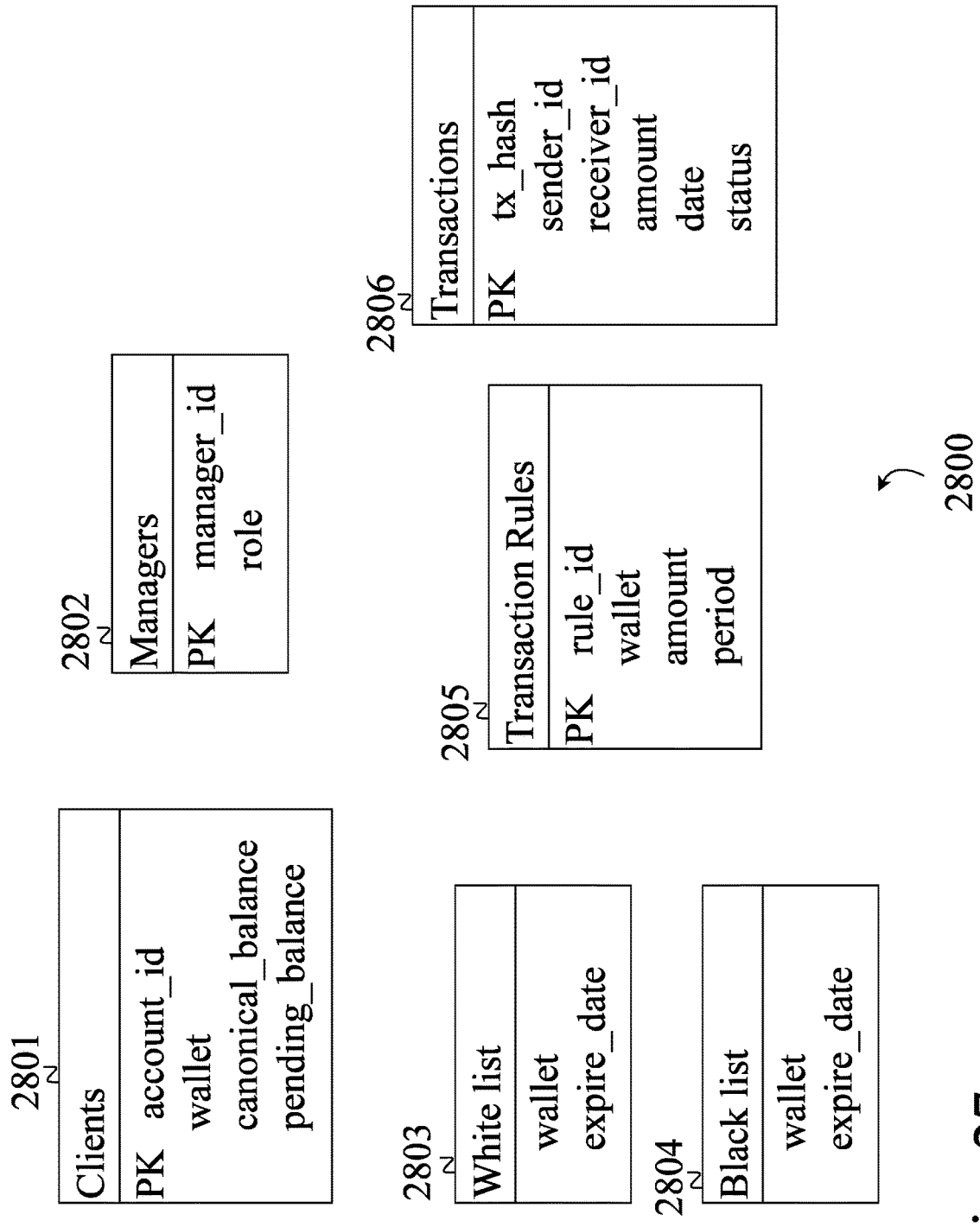
FIG. 27 is a diagram showing possible exemplary database tables for a security gateway in a system with only one organization.

FIG. 27 is a diagram showing possible exemplary database tables for a security gateway in a system with only one organization. The SGW database structure example 2800 contains 6 elements, including a table for clients 2801, managers 2802, a white list 2803, a blacklist 2804, transaction rules 2805, and transactions 2806. This SGW database structure 2800 skips the user's and manager's private information, access control system, and version control system, all of which might be included in some implementations of the system, as well as other information. Notably, several tables include having access tied to private/public key pairs, including the tables for clients 2801, managers 2802, transaction rules 2805, and transactions history 2806. In this way, only users with the proper keys and therefore authorizations are able to view (or both) the appropriate table information. With a clients table 2801, it is possible to keep account of a client's account ID internal to the organization that works with the client, their wallet identification and contents, their "canonical" or "current" balance, and their pending balance which may include transactions that have been initiated but not finalized yet. A manager table 2802 may include at least information including the manager's ID and their role in the organization, as well as being locked by a public/private key encryption to ensure only authorized personnel may attain access to the database or the system with the manager credentials. A white list 2803 and black list 2804 both may maintain lists of wallet ID's and their expiration date, which may be either the expiration date of the wallet or the expiration date of that wallet's entry in the relevant database table, the white list being a list of wallets which are explicitly permitted to be used in the system, whilst the black list is the opposite, a list of explicitly denied wallets not permitted to be used in the system, depending on the rules system in place for the system with the given organization or organizations. It is important to note that "table" in this context does not refer to a specific, rigid implementation of database structure, but that multiple database forms may be utilized, including structured query language ("SQL") databases, no-SQL databases, and others. A "table" may be a traditionally understood database table, or it may be some other variation, including a "view" which is a technique utilized in some database systems to form a virtual table that does not actually exist in the database itself, but is an abstraction of connections between data elsewhere in the database. Transaction rules 2805 may include a rule ID corresponding to individual rules or groups of rules depending on a specific implementation, a wallet ID field along with an amount and period field to represent rules relating to what manner of transactions a given wallet is allowed to take part in, and for how long the rule is in effect, in this exemplary database schema. Lastly, a transactions table 2806 contains data pertaining to transactions in the blockchain that have passed through the SGW system, including fields for transaction hash or "tx_hash," the sender ID and receiver ID for the respective parties in a transaction, the amount the transaction was for, the date it took place on, and the status of the transaction, for instance either "SUCCESS," "FAILED," "INSUFFICIENT FUNDS," or some other status that might be useful depending on the implementation. This database schema is only one of many possible database schemas, and should not be taken to be limiting on the invention but rather exemplary of the invention's possible conceptual architecture.

Figure 28:
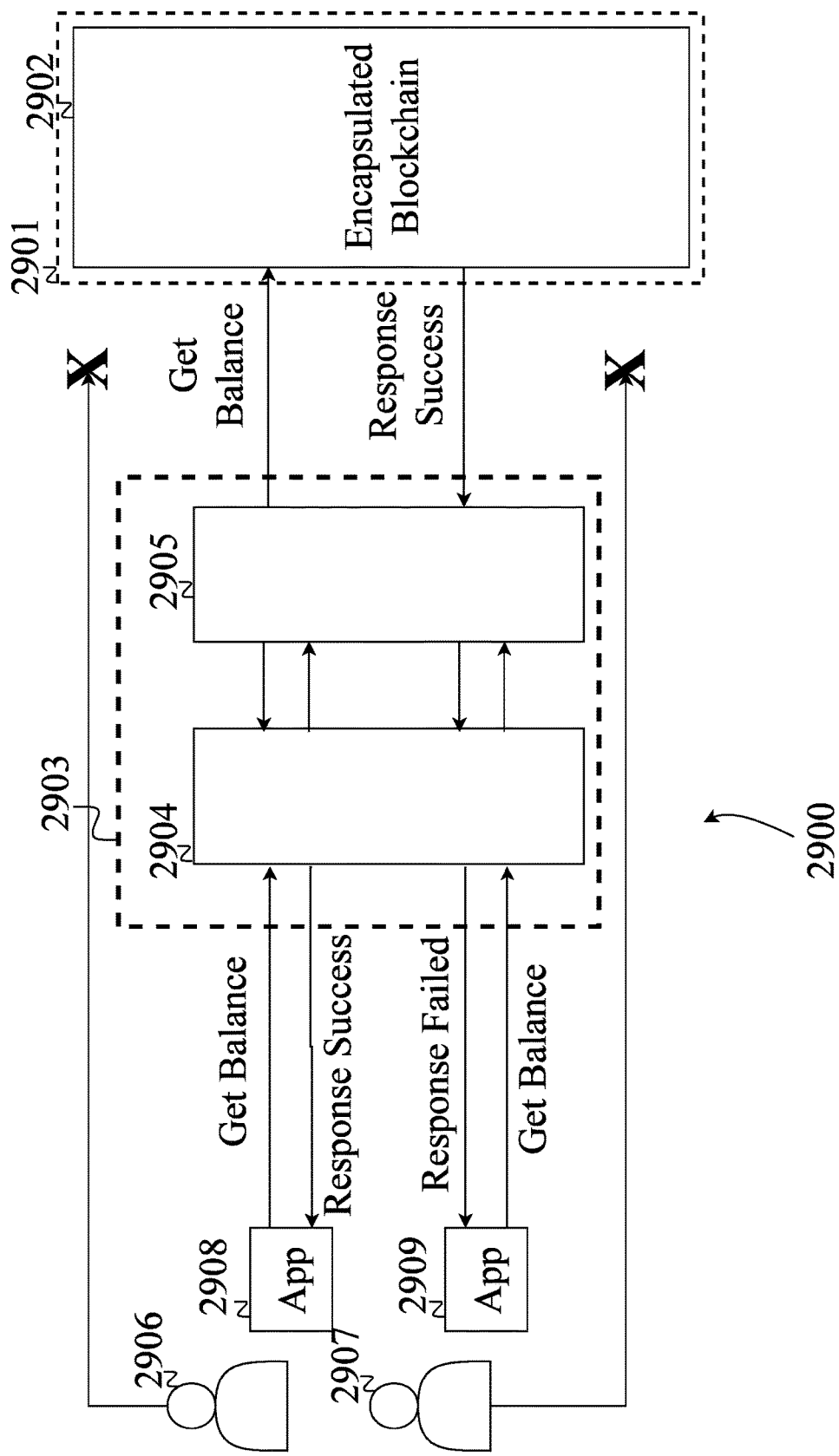
FIG. 28 is a diagram showing an overview of an exemplary security gateway workflow for a blockchain.

FIG. 28 is a diagram showing an overview of an exemplary security gateway workflow 2900 for a standard ETHEREUM® blockchain. When considering a standard ETHEREUM® wallet application, users connect via standard wallets and applications, and a custom connection to the SGW is needed. A main goal of a SGW 2903 is to encapsulate 2901 blockchain 2902 so only the SGW has access to the blockchain via wallets (or other applications), thereby providing the firewall effect desired in order to make the blockchain secure.

An exemplary SGW workflow for a user 2906 may begin with a user 2906 sending a request to the SGW 2903, for instance to see their balance, the request being sent via their user application or applications 2908. Such requests may be sent over the Internet, over a wide area or local area network, over the PSTN, or over some other network, and the application or applications may be operating on a device including but not limited to a cellular phone, personal digital assistant, tablet computer, personal computer or laptop, or other computing device capable of the requisite connections and application execution. After an initial request or requests are sent from a user, the SGW 2903 would receive these requests and may check if the request type is allowed 2904 such as with a ruleset or with any of the checks in a database schema such as described earlier, including verifying or having another service verify the identity and authorization of the user making the request. The SGW might determine if the user 2906 is provisioned to make the request to 2905 based on the database entries including ruleset values, before the SGW 2903 may forward the request to the encapsulated 2901 blockchain 2902, whereupon the encapsulated 2901 blockchain 2902 may process the request. The encapsulated 2901 blockchain 2902 may then send a success response to SGW 2903, and the SGW 2903 may pass the success response to user 2906. The SGW workflow for a blacklisted user 2907 may follow a similar succession, except the SGW 2903 may not forward the user request (sent via blacklisted user application 2909) to the blockchain, and instead may send a standard ETHEREUM® error response back to blacklisted user 2907 after step 3.

It is important to note that the specific steps in the use of the SGW system to produce a secure, firewalled blockchain are not specific only to the ETHEREUM® blockchain implementation, and this system may be used with other forms of blockchain networks, including those used for purposes other than currency transfers. Smart contracts are capable of being executed through the blockchain firewall and security gateway system if the ruleset for permitted transactions and network connections through the SGW includes smart contract executions, and further, a ruleset and SGW could be configured to allow only specific kinds of smart contracts, or only smart contracts for specific users, to be executed. The system offers highly modular functionality which may work across numerous network types and in numerous possible situations, and the methodology described merely describes exemplary implementations.

The SGW is crucial to ensure that only select users (those not blacklisted) request the balance of a wallet. In a workflow without an SGW, any user can request the balance of any wallet. In a workflow with an SGW, the standard wallet will send the same request as if there was no SGW, but the SGW will only allow the user request to pass on if the wallet is not blacklisted. If the wallet is blacklisted, the user will receive a standard error message. Therefore, with a SGW, only select users can request the balance of any wallet.

After the blockchain grants the user access, the user can log in to the SGW online and manage the blacklist and list of users. Managing these lists gives the user control of which users can send requests to the blockchain and gain access to the balance of a wallet.

In other cases, rather than organizations, this SGW could be used for online shopping, supply chain management, software management etc. or any other suitable situation in which insecure devices need to access a secure blockchain section.

In some cases, where users with insecure devices need to access a system with a secure blockchain, a security gateway may be employed. In the systems, the SGW may have at least two sets of communication ports, a rules engine, an admin module, a reporting system, and a local database. The SGW rules engine is responsible for checking the credentials of the requestor; inspecting access requests (which may include a TPSC); inspecting the TPSC to ensure compliance with a rule set; and either rejecting or passing on these requests to the blockchain. In cases where a TPSC transfer is accepted, the transfer may only be completed after the TPSC is wrapped in a safety wrapper so it is partially or fully disabled. In some cases, a SGW with at least two sets of communication ports, one connected to the secure blockchain, with several modules including at least one rules engine, admin module, reporting system, and local database, will have a rules engine that is learning and creating new rules based on inspection of previous transactions on the blockchain. In yet another case, between a secure blockchain, users on a not secure network, a SGW with at least two sets of communication ports, one connected to the secure blockchain, and that SGW having several modules including at least one rules engine, admin module, reporting system, and local database, that rules engine inspects transactions for compliance with a set of rules, and only fully compliant transactions are passed on. Further, such compliance includes checking of credentials of the transaction initiator. Furthermore, the request or transaction may include a TPSC. In yet some cases, the TPSC is inspected for its behavior according to a rule set, and in response to the outcome of the inspection a transfer may be rejected. Further, that TPSC is inspected for its behavior according to a rule set, and in response to the outcome of the inspection a transfer may be completed only after wrapping the token in a safety wrapper disabling at least part of its active functionality. Moreover, some TPSC are inspected for their behavior according to a rule set, and in response to the outcome of the inspection a transfer may be completed only after placing those tokens in a safety container disabling all of its active functionality. In some cases, in a system with a secure blockchain, users on a not secure network, a SGW with at least two sets of communication ports, one connected to the secure blockchain, the SGW having several modules including at least one rules engine, admin module, reporting system, and local database, that gateway enforcing secure access between endpoints to a blockchain domain that comprises a ledger. In some other cases, in a system with a secure blockchain, users on a not secure network, an SGW with at least two sets of communication ports, one connected to the secure blockchain, that SGW having several modules including at least one rules engine, admin module, reporting system, and local database, that gateway enforcing communication filtering, hardening and Distributed Denial of Service ("DDoS") protection. In yet other cases, in a system with a secure blockchain, users on a not secure network, an SGW with at least two sets of communication ports, one connected to the secure blockchain, that SGW having several modules including at least one rules engine, admin module, reporting system, and local database, wherein the gateway enforces blockchain protocol filtering based on organizational policy. In some cases, in a system with a secure blockchain, users on a not secure network, a SGW with at least two sets of communication ports, one connected to the secure blockchain, the SGW having several modules including at least one rules engine, admin module, reporting system, and local database, wherein the gateway enforces blockchain protocol filtering based on user identification and adjust to the user permissions.

Figure 29:
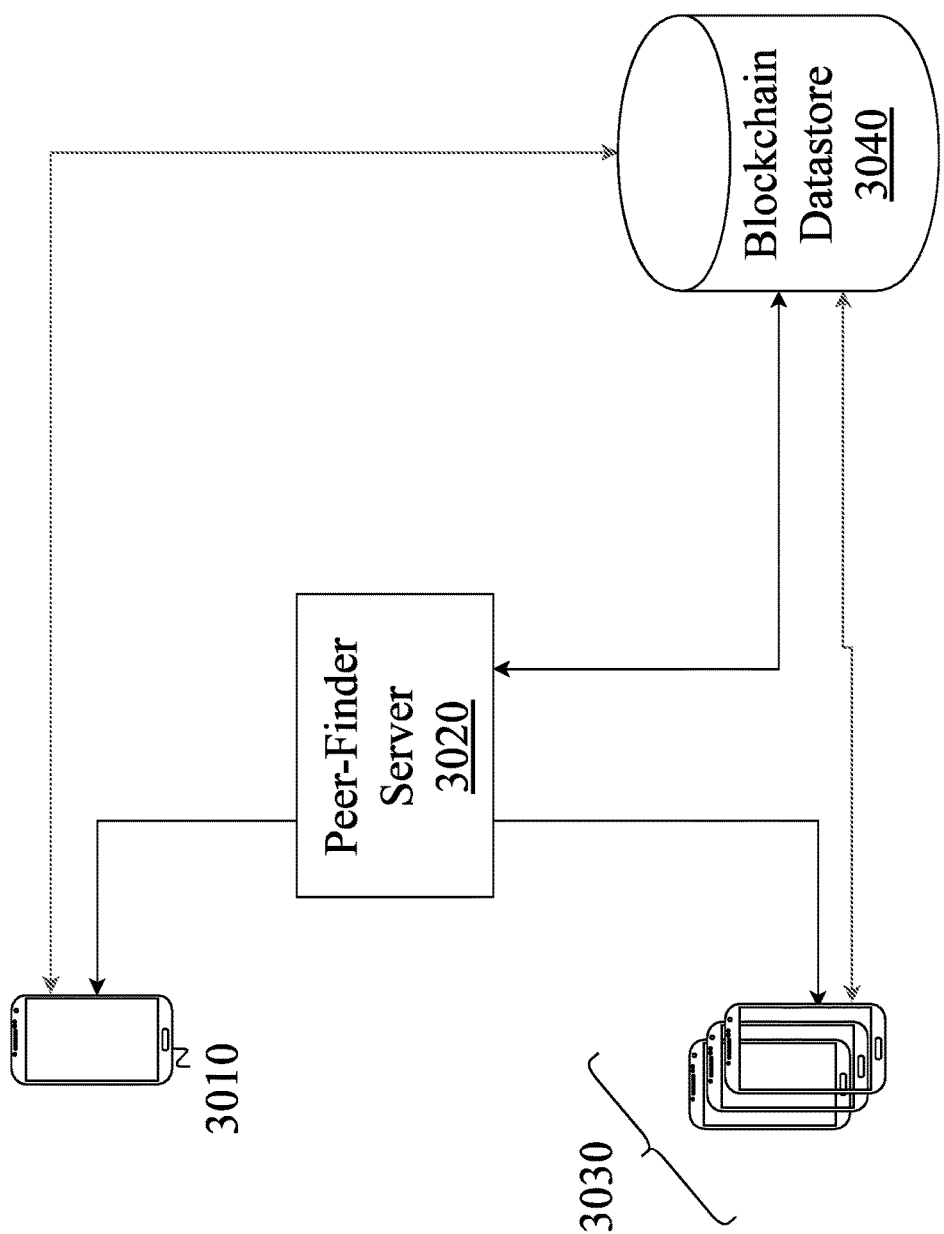
FIG. 29 is a diagram showing a plurality of user phones connected to a peer finding server and blockchain datastore, according to an aspect of the invention.

FIG. 29 is a diagram showing a plurality of user phones connected to a peer finding server and blockchain datastore, according to an aspect of the invention. A user phone 3010 may operate an application or set of applications designed specifically to communicate with GPS satellites and cellular towers to locate a nearby fellow user of a peer-to-peer ATM network, using a peer-finder server 3020. Such a server may facilitate communication between the cellular devices of the initial requesting user 3010 and a singular or plurality of potential peers to interact with 3030, or may perform the actual filtering of users based on location and settings such as how much money they are willing or able to transact with, for a requesting user 3010. A blockchain datastore 3040 maintains cryptographic storage of all transactions and user data as required by a peer finding service 3020, and may receive requests to read or write from peer devices 3010, 3030, or from the peer finding server 3020, for the purpose of keeping a record of each user's personal transactions and data on the service, and for the peer-finder to locate possible matching users to facilitate the service.

A further embodiment may enable the use of tokens or a balance kept on the blockchain in a datastore 3040 for each user, much like a cryptographic currency, which represents denominations of a user's chosen currency (for instance, users in the United States may deposit money into the service using United States Dollars or "USD"), and may be redeemed for a digital transfer of money to the user's financial institution such as a bank account. In this way, it provides for a protection against interest rate variance, bank fees, and provides for a privatized token of transfer between users, before the tokens may then be redeemed back for digital currency in their financial institution.

Figure 30:
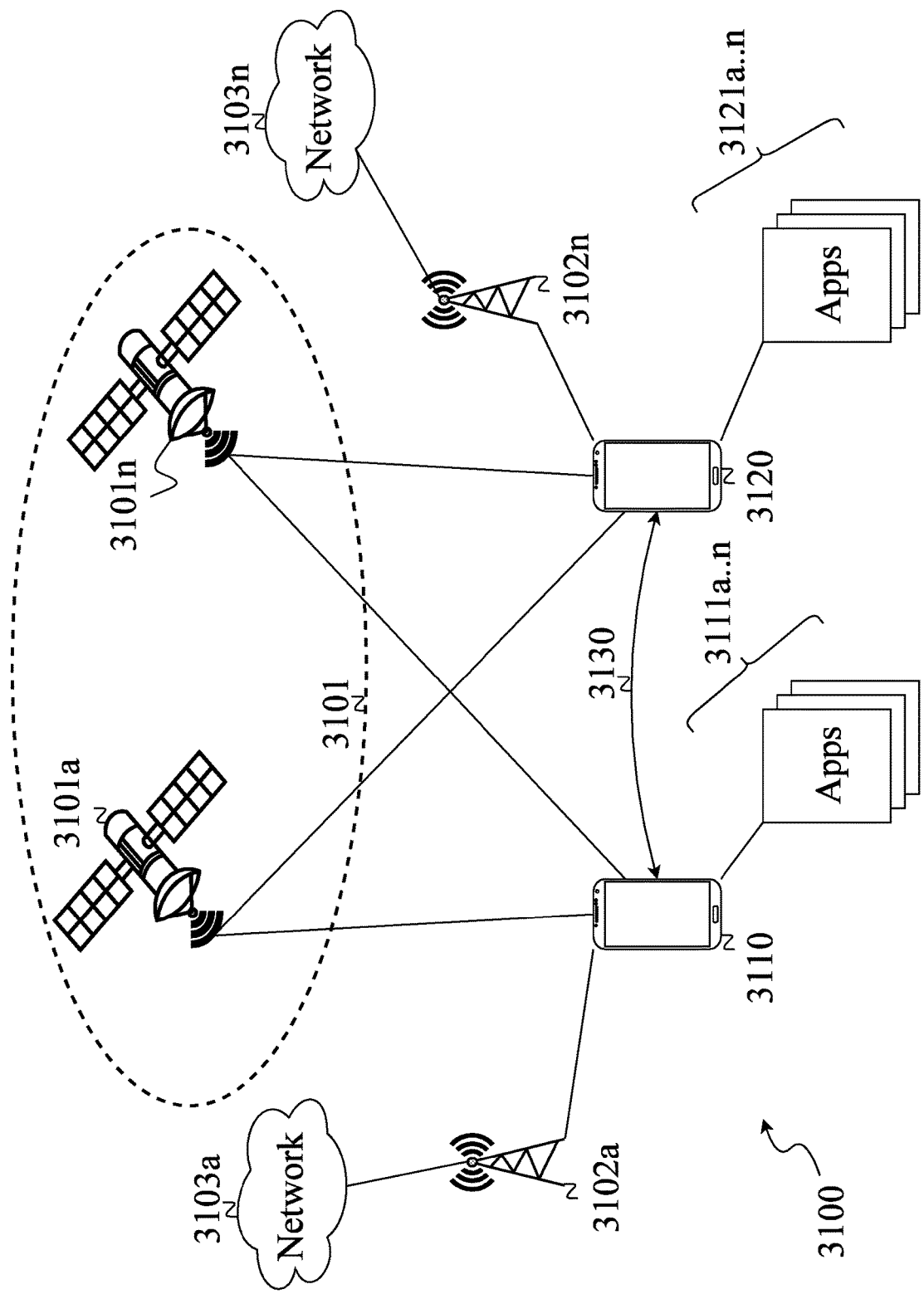
FIG. 30 is a block diagram showing an overview of a peer-to-peer ATM system using GPS locating to find nearby peers to transact with, according to an aspect.

FIG. 30 is a block diagram showing an overview of a peer-to-peer ATM system using GPS locating to find nearby peers to transact with 3100, according to an aspect. In this example there are two smart phones or other mobile devices such as tablets or personal digital assistants 3110, 3120, each with a possible plurality of programs 3111a . . . n, 3121a . . . n. One of the applications shown is a smart wallet client application that may communicate with a central server or blockchain host, or both, for the purposes of tracking and maintaining record of user digital balances and providing advanced features for the use and security of their digital funds. Only members that have had a full, valid, current, and in-good standing KYC will be allowed to participate, which may take the form of users who have answered many questions about personal identity and financial account standing when signing up for the smart wallet service.

Verified members can figure out the distance between the each other using methods including but not limited to a Global Positioning System (GPS) satellite 3101 or satellites 3101a, 3101n. Typically more than two satellites 3101a and 3101n and towers 3102a and 3102n are used, but any number may be used if the implementation succeeds in estimating user locations and distances. The satellites and towers may be connected to cloud networks 3103a and 3103n, which may be the Internet, a cellular network, or some other wide area network ("WAN"). These methods allow two phones to find each other and estimate their distances 3130, which may be cartographical or a time-to-travel distance as discussed further below, for the purposes of facilitating physical cash transactions between users.

Initiating factors that may cause people to find each other include, but are not limited to, when someone has too much cash on hand and wants to get rid of it, or when someone needs cash and is looking for a person who is willing to part with some of their cash, in exchange for equivalent or near-equivalent amounts (in case there are fees involved by their financial institutions) of digital currency, allowing the two peers to treat one another as opposing sides of an ATM transaction.

Such a transaction may take place with digital currency being a digital token that is tracked in a user's smart wallet, rather than currency directly moved into their financial account with their bank or credit union or other institution. Such a token may then be redeemed at a time of the user's choosing to deposit the specified amount of currency into their account at their financial institution.

Figure 31:
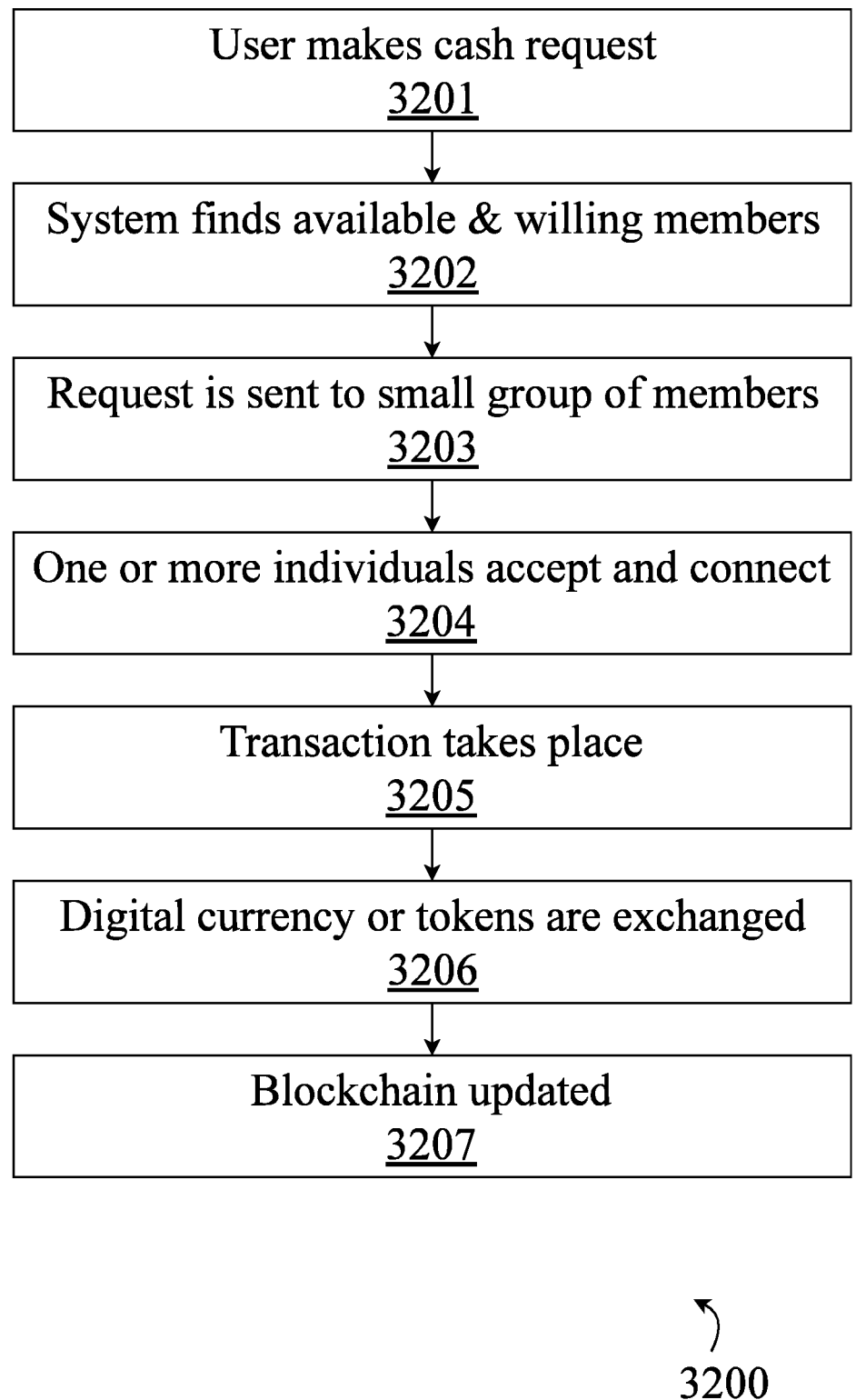
FIG. 31 is a method diagram showing steps taken in the use of a system for peer-to-peer ATM transactions with smartphones, according to an aspect.

FIG. 31 is a method diagram showing steps taken 3200 in the use of a system for peer-to-peer ATM transactions with smartphones, according to an aspect. The main database is not in an actual database, but is instead in a blockchain, more generally also called immutable distributed ledger technology (IDLT), which is shown as 3201 instead. In this example, a user makes a cash request into the cloud. In step 3202 the system determines available and willing members who are nearby and that have cash available. "Nearby" could be measured by physical distance a user may have to travel, physical distance "as the crow flies" or linearly without regard to travel restrictions such as roads, or by the time it takes to meet up, for example if someone is an UBER™ driver, they may not be physically nearby, but they might be able to meet up in just a few minutes. Alternatively, someone may have their own virtual ATM business on a scooter and may be willing to travel and therefore is mobile.

The request is then sent to the potential cash provider 3203. One or more members may accept the transaction 3204 with their smart wallet application, and then the transactions may be set up accordingly. Depending on the amount requested and the amount a donor is willing and able to provide, more than one transaction may be necessary to meet the full amount. For instance, a small group of possible cash providers may be identified, for a user who requests $500 in cash in exchange for an equivalent digital reimbursement. No single user with $500 in cash can be identified, but three people with $200 each may be identified, and each accept a transaction with the requesting user for a portion of the $500, such as one user accepting a transaction for $200, one for $100, and another for $200. These four people—three providers and one requestor—may then meet physically to proceed with the transaction, after they have all accepted the transaction on their wallets initially.

When two (or more) users have agreed on a transaction, each party is identified with a picture to another before the transaction takes place, but after both users agree, in order to reduce the risk of criminal activity. Further, in some situations, the system may offer to record the transaction between the users with video by both transacting parties and the recording is transmitted in real time to the cloud for storage, as yet a further way of reducing risk. Alternatively, the transaction could be recorded with series of still photos by both transacting parties and the stills are transmitted in real time to the cloud for storage as another way to reduce risk.

The transaction then may take place 3205 after users have verified themselves and each other to the system, and digital currency or tokens may be exchanged digitally 3206 when users verify that the transaction is ready to take place. In this way the cash provider is compensated for the cash provided to the requestor. The blockchain used by the smart wallet applications may then be updated 3207 for each user's records, the blockchain host managing the multiple requests to write new blocks to the chain, ending the transaction and updating users' transaction histories and digital balances, and allowing them to go their separate ways with cash and digital currency or tokens having been exchanged.

Regarding ATM fees, if any are present for a user's financial institution who is involved with the transaction, the user or users who pay the fee or fees might depend on the situation. In some situations, it may be an advantage to get rid of hard cash and therefore the person getting rid of the cash may pay the transaction fee, as decided in their initial request, which would be made apparent to any potential users before accepting the transaction. At this time, in most cases, the person obtaining the hard cash will be paying the fee. Fees may be assessed later and added, or may be displayed in real time (not shown here for clarity). In some cases there may also be a fee negotiation offered, within certain limits set by the users of the application and engaged in the possible transaction.

The limit on ATM fees may be flexible, depending on the network and social standing of the person in the network. People with a low rating or reliability in an associated network, such as being marked as not having paid their fees properly or back-charging the system, or not providing enough cash for the agreed transaction, may not be allowed to transact because of the risk they could present to other people. The people with low reliability may have a very low limit and may be marked as a high-risk individual which may make other people not want to connect with these individuals, which may be displayed on the smart wallet application for users on either end of the transaction to be aware of, before accepting the transaction.

In some cases, a system for representing values on a mobile device may be needed. This system may allow a first user to send or receive value to or from another user. The first user will make an anonymous request, stating a need for immediate hard cash, and the system will find a number of close by users that have hard cash and are willing to give said cash in exchange for a transfer of value on the system. This system will require vetting for all users to ensure that users are suitable and reliable to complete transactions. User suitability may be determined based on distance or time to travel. Vetting may include one or more of known KYC methods, Anti-Money Laundering (AML) techniques for analyzing transactions and histories, current living address, listed phone number, and more.

In some cases, the user receiving hard cash will pay a fee for the service, and part of that fee will go to the user giving the hard cash. In other cases, the fees will be reversed.

In yet other cases, there can be a plurality of hard cash involved in a transaction, the plurality being defined as cash belonging to one or more separate fiat currency systems (e.g. Dollar/Euro/Peso/Swiss Franc/Pound, etc.). In yet other cases, cryptocurrencies (e.g., BITCOIN™, ETHEREUM™, etc.) may be exchanged/transacted using the peer-to-peer ATM systems and methods of the invention. It will be understood that, according to an aspect, a mix of fiat currencies and cryptocurrencies may be exchanged within single transactions or chained transactions. In some other cases, the suitability may be determined based on past instances of successful transaction by either member.

In some cases, each party is identified with a picture to another before the transaction takes place, but after both users agree, in order to reduce the risk of criminal activity. In other cases, the transaction between the users is recorded with video by both transacting parties and the recording is transmitted in real time to the cloud for storage, as yet a further way of reducing risk. In further cases, the transaction is recorded with series of still photos by both transacting parties and the stills are transmitted in real time to the cloud for storage as another way to reduce risk.

Additional features that may be included in the software of the handset include (but are not limited to) a find me feature that allows one person to find another person in a location (e.g. like a beacon that allows one person to find another in a busy plaza). It is clear that many changes can be made without departing from the spirit of the invention.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 10:
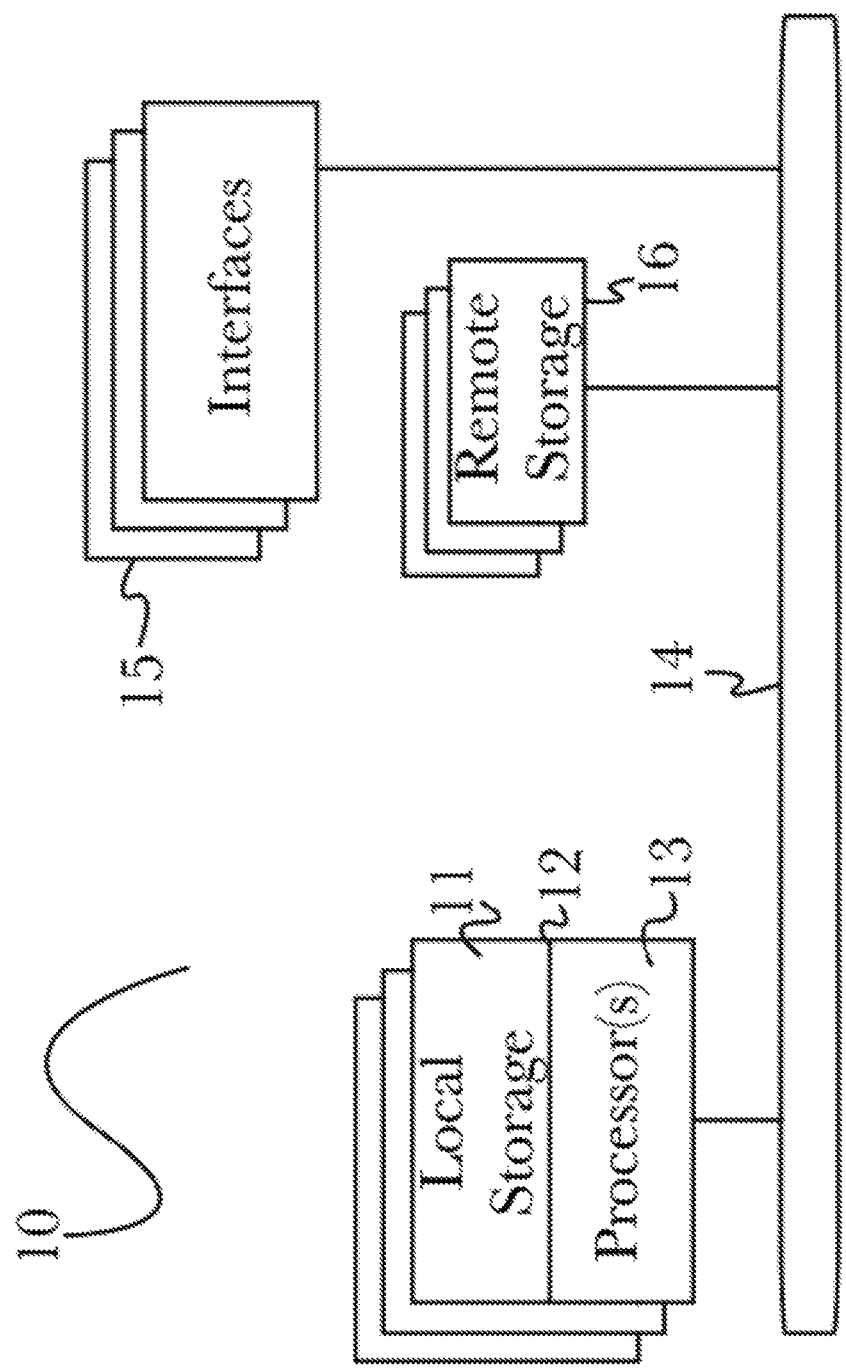
FIG. 10 is a block diagram illustrating an exemplary hardware architecture of a computing device.

Referring now to FIG. 10, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 10 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 11:
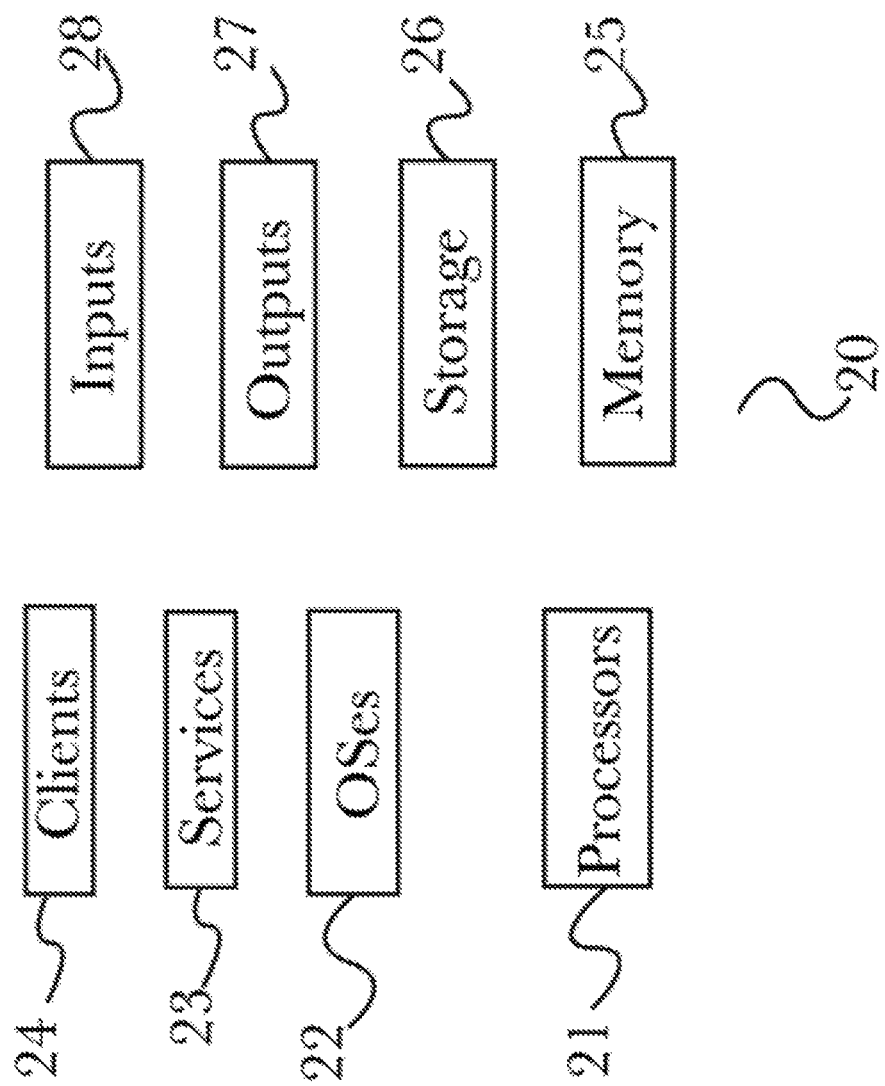
FIG. 11 is a block diagram illustrating an exemplary logical architecture for a client device.

In some aspects, systems may be implemented on a standalone computing system. Referring now to FIG. 11, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 10). Examples of storage devices 26 include flash memory, magnetic hard drive, CD-ROM, and/or the like.

Figure 12:
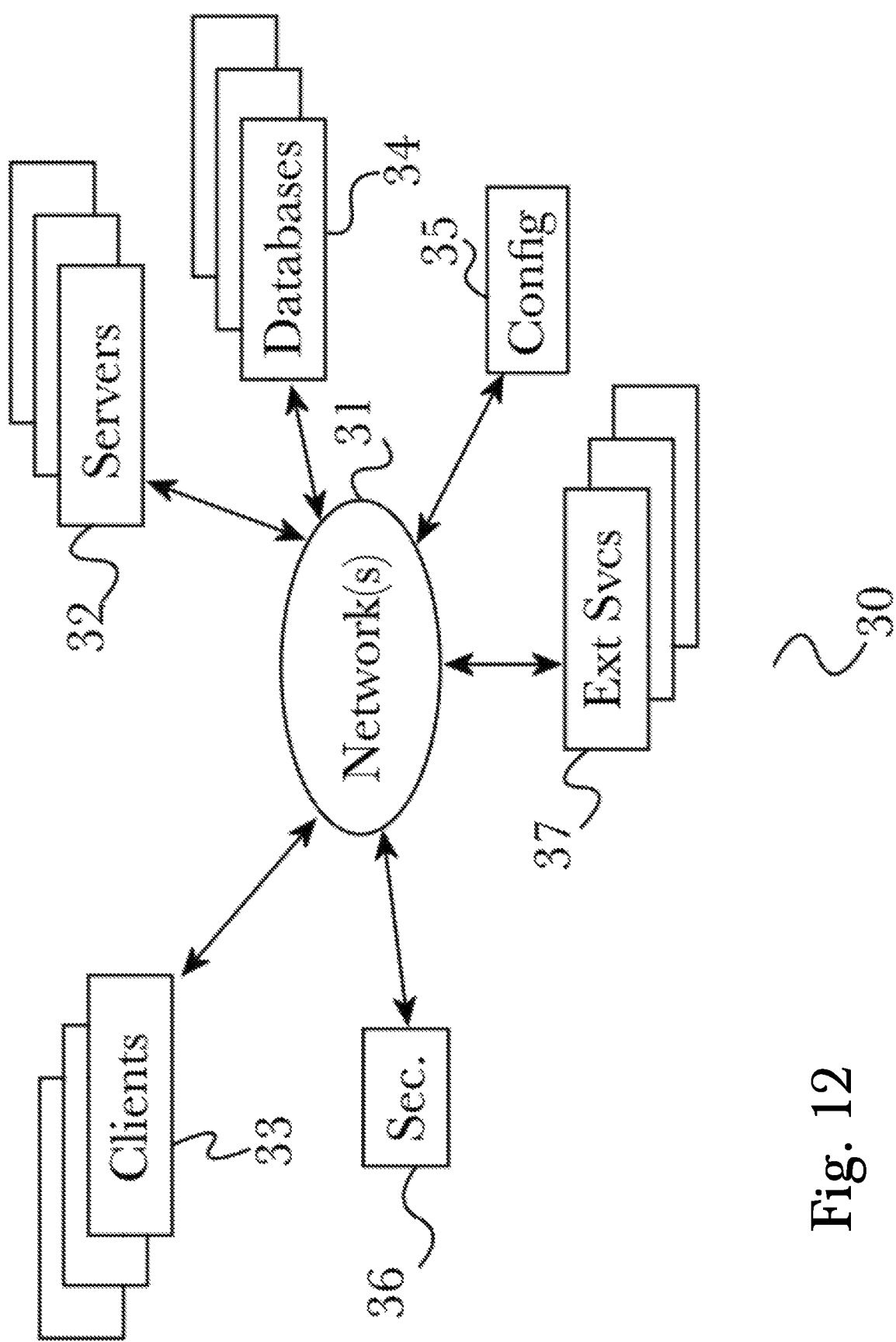
FIG. 12 is a block diagram showing an exemplary architectural arrangement of clients, servers, and external services.

In some aspects, systems may be implemented on a distributed computing network, such as one having any number of clients and/or servers. Referring now to FIG. 12, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 11. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other).

Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises. In addition to local storage on servers 32, remote storage 38 may be accessible through the network(s) 31.

In some aspects, clients 33 or servers 32 (or both) may make use of one or more specialized services or appliances that may be deployed locally or remotely across one or more networks 31. For example, one or more databases 34 in either local or remote storage 38 may be used or referred to by one or more aspects. It should be understood by one having ordinary skill in the art that databases in storage 34 may be arranged in a wide variety of architectures and using a wide variety of data access and manipulation means. For example, in various aspects one or more databases in storage 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

Figure 13:
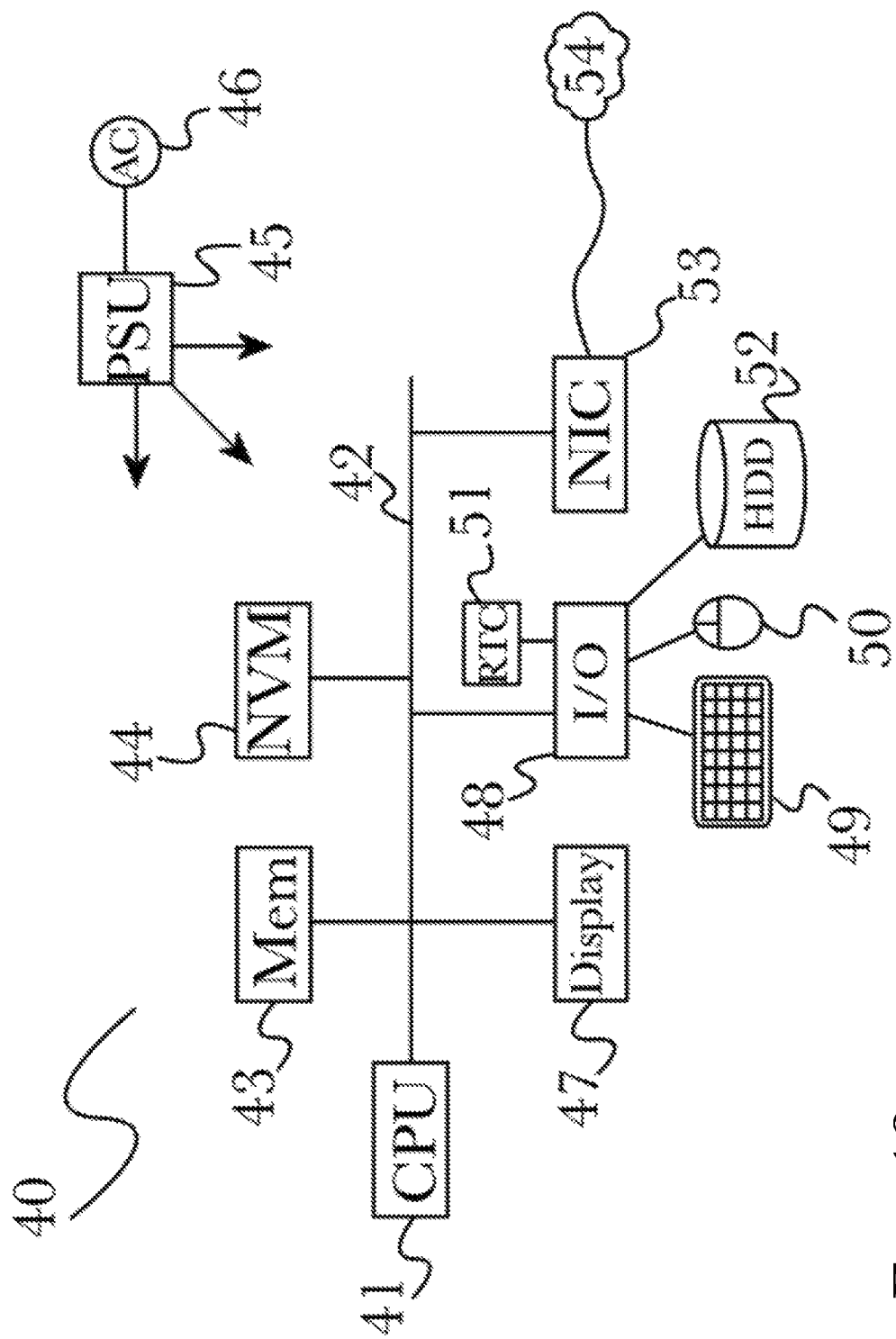
FIG. 13 is another block diagram illustrating an exemplary hardware architecture of a computing device.

FIG. 13 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to peripherals such as a keyboard 49, pointing device 50, hard disk 52, real-time clock 51, a camera 57, and other peripheral devices. NIC 53 connects to network 54, which may be the Internet or a local network, which local network may or may not have connections to the Internet. The system may be connected to other computing devices through the network via a router 55, wireless local area network 56, or any other network connection. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

Figure 2:
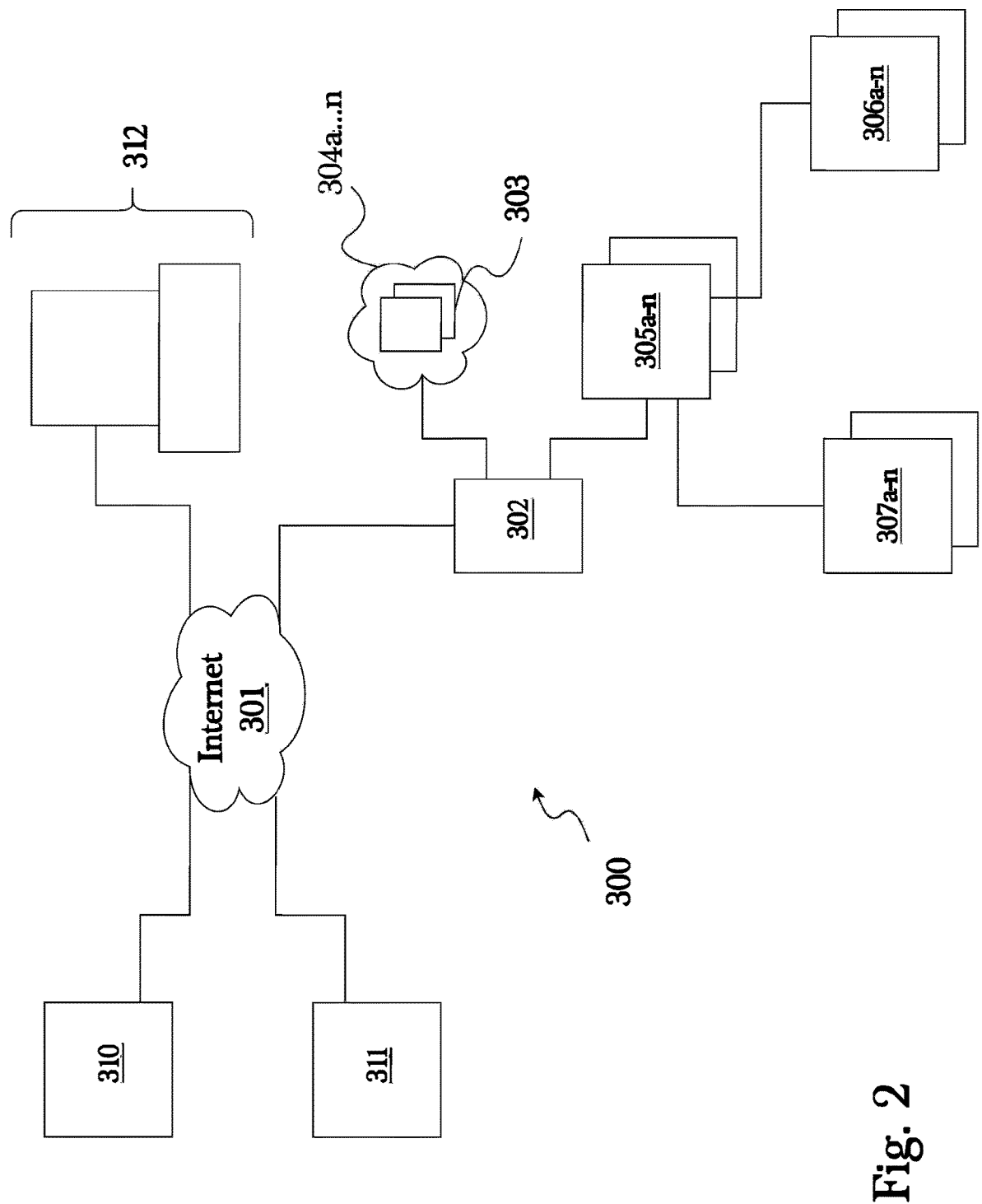
FIG. 2 shows an exemplary overview of a standard cloud computing infrastructure, according to an aspect.

FIG. 2 shows an exemplary overview of a standard cloud computing infrastructure, according to an aspect. Server 302 may be a single physical server, or it may be a cluster 303 of many smaller servers 304*a-n*. These servers can contain multiple sets of codes 305*a-n*, including multiple operating systems, on top of which may be multiple applications 306*a-n* and additional multiple data sets for storage 307*a-n*. Client computing devices 310 and 311, as well as desktop device 312, connect to server 302 via Internet 301. Functionally a desktop computer is very similar to a smart phone, except that the relationship between performance and display and operating system, etc. is different, and a desktop computer has typically a much larger display. Also, in server 302, whether a single server or a cluster, each node is just a specialized version of generic computing device 200. Cloud computer arrangement 300 enables applications to cooperate between one or more of the client devices and the cloud, where some functionality is performed in the cloud and some is on the device. Further, it may not always be clear what operations are being done where, and operation locations vary from situation to situation, as well as varying according the capabilities of the computing device used.

In some embodiments, lower tier valuations may be in the form of digital checks (for example, cashier's checks issued by a bank or similar institution), which can be retired at the end of a redemption cycle. The advantage of this particular approach is that in most jurisdictions checks can be used without additional approvals, as checks are already permitted, and a digital, encrypted form should be recognized as valid. Further, as they are submitted in real-time on the blockchain, the risk of falsified checks is much reduced, and as they are only retired and not destroyed, an already cashed check can be immediately be identified (respectively its token on the blockchain). Such checks could be denominated in multiple currencies or asset types, as is allowable today.

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

In some use cases, certain countries may have export industries, often but not exclusively related to mineral commodities that overshadow the rest of the economy, which can cause undesired appreciation of the domestic currency. This appreciation of the domestic currency can make it difficult to export other goods and services, as they are often not related to those commodities but cannot be competitively priced due to the currency issues. By isolating the commodity business with a separate, internationally trade-able crytocurrency, in some cases also mineable, the effect of the commodity on the rest of the economy can be minimized, as only a part of the profits need to be repatriated, where as the rest can be invested globally without negatively affecting the local economy. In some instances of this use case, an exporter country may create an additional currency as a weighted basket targeting its two or three primary export market countries' currencies as the main weight, thus stabilizing the prize of its commodity for its customers, and maybe adding the currency of a main supplier country or two for capital equipment for extraction or processing that export item as well.

In another use case, the system could be used by automobile manufacturers to securely track the thousands of parts and hundreds of software updates associated with each individual car manufactured. Modern cars have on the order of 100 different embedded computer systems, each of which can be updated with different versions, updates, and patches. In addition, parts are often updated or replaced by the manufacturer over time for certain models (a particular case of this is recalls of certain parts), and the current version of such parts for each individual car can be tracked.

In another use case, the system could be used to securely track voting. Tracking voting in distributed immutable system assures highest voting integrity and provides each individual an immutable voting receipt.

In another use case, food could be securely tracked from grower to supermarket for all packaged goods. In the case of food poisoning, all sources of the food could be immediately identified.

In another use case, pharmaceuticals could be securely tracked from manufacturing to end user. This would have tremendous benefits in avoiding theft, inappropriate use, and counterfeit drugs.

In another use case, prescriptions could be securely tracked from prescribing doctor to patient. Today, patient information is totally exposed to any pharmacy technician. HIPPA violations are common. Using private certificates and immutable distributed ledgers would protect pharmacies from HIPPA violations and reduce or eliminate the possibility of prescription drug abuse.

In another use case, car parts could be securely tracked from originator to installer, reducing or eliminating the possibility of used parts being sold as new.

In another use case, the effectiveness of advertisements could be securely tracked, especially on internet-connected devices such as computers, smartphones, smart TVs, and set top boxes.

In another use case, intellectual property of all kinds (songs, movies, pictures, patents, trademarks, copyrights, etc.) could be securely tracked and infringing use immediately identified, as well as the identity of the infringer.

In another use case, product scheduled maintenance and maintenance correctness could be securely tracked for each and every part of every individual piece of equipment. This is important for consumer goods (cars, refrigerators, lawn-mowers, etc.), and is critical for commercial equipment (airplanes, trains, construction equipment, elevators, etc.).

In another use case, the system could be used to replace government-issued identification cards and numbers such as driver's licenses, social security numbers, etc.

In another use case, the system could be used to issue and track insurance policies with incident tracking and payout tracking.

In another use case, the system could be used to securely submit and track documents such as tax returns, real estate recordings, court documents, and other government records.

In another use case, the system could be used to securely track payments from large scale programs such as Social Security payments, Social Security Disability payments, food stamps, etc.

The skilled person will be aware of a range of possible modifications of the various aspects described above. Accordingly, the present invention is defined by the claims and their equivalents.

What is claimed is:

1. A system for true peer-to-peer automatic teller machine transactions using mobile device payment systems, comprising:
 a blockchain datastore;
 a mobile device comprising at least a first processor, a first memory, a mobile telephone, and a global positioning satellite (GPS) receiver system; and
 a first smart wallet application, comprising a first set programming instructions stored in the first memory and operable on the first processor, wherein the first set of programming instructions, when executed by the first processor, causes the first processor to perform the steps of:
  establishing a connection between a mobile telephony network and to at least one GPS satellite;
  determining the mobile device's approximate location;
  providing first smart wallet features including storage of user information, communication with devices for the transfer of digital payments, and biometric authentication; and
  communicating with a peer-finding server for the purposes of locating a peer device operating a second smart wallet application for the purposes of transferring funds; and
 a peer-finding server, comprising at least a second processor, a second memory, and a second set programming instructions stored in the second memory and operable on the second processor, wherein the second set programming instructions, when executed by the second processor, causes the second processor to perform the steps of:
  receiving requests for peer filtering and location from the first smart wallet application;
  filtering a list of known smart wallet application users based on a received request for peer filtering, including location and transaction type and amount;
  locating and selecting a user that satisfies the filtering;
  returning to the requesting application a location and other information pertinent for the purposes of meeting and transferring funds with the located and selected user;
   wherein the transferring of funds may take the place of a physical transfer of physical currency between the users, while an equivalent digital transfer between their smart wallet applications occurs in the opposite direction, resulting in no or minimal net transfer of wealth, and proving, by the peer-finding server, physical currency being made available to the initial requesting user.

2. The system of claim 1, wherein the peer-finding server is the host of the blockchain datastore.

3. The system of claim 1, wherein the cellular phone is instead a different type of mobile computing device capable of communicating with GPS satellites and wide area networks, such as a personal digital assistant or computer tablet.

4. A method for true peer-to-peer automatic teller machine transactions using mobile device payment systems, comprising the steps of:

establishing, by the mobile device, a connection between a mobile telephony network and to at least one GPS satellite;

determining, by the mobile device, the mobile device's approximate location;

providing, by the mobile device, a first smart wallet application on the mobile device with smart wallet features including storage of user information, communication with other mobile devices for the transfer of digital payments, and biometric authentication;

communicating, by the mobile device, from the first smart wallet application with a peer-finding server for the purposes of locating a peer device operating a second smart wallet application for the purposes of transferring funds;

receiving, by the peer-finding server, requests for peer filtering and locating from the first smart wallet application;

filtering, by the peer-finding server, a list of known smart wallet application users based on a received request for peer filtering, including location and transaction type and amount;

locating and selecting, by the peer-finding server, a user that satisfies the filtering;

returning, by the peer-finding server, to the requesting application a location and other pertinent information for the purposes of meeting and transferring funds with the located and selected user or users for transferring of funds;

wherein the transferring of funds may take the place of a physical transfer of physical currency between the users, while an equivalent digital transfer between their smart wallet applications occurs in the opposite direction, resulting in no or minimal net transfer of wealth, and proving, by the peer-finding server, physical currency being made available to the initial requesting user.

5. The method of claim 4, wherein the peer-finding server is the host of the blockchain datastore.

6. The method of claim 4, wherein the cellular phone is instead a different type of mobile computing device capable of communicating with GPS satellites and wide area networks, such as a personal digital assistant or computer tablet.

* * * * *